United States Patent
Shin et al.

(10) Patent No.: US 11,561,912 B2
(45) Date of Patent: Jan. 24, 2023

(54) HOST CONTROLLER INTERFACE USING MULTIPLE CIRCULAR QUEUE, AND OPERATING METHOD THEREOF

(71) Applicant: Samsung Electronics Co., Ltd., Suwon-si (KR)

(72) Inventors: Myungsub Shin, Suwon-si (KR); Sungho Seo, Suwon-si (KR); Kwanwoo Noh, Seoul (KR); Seongyong Jang, Seoul (KR); Haesung Jung, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/321,916

(22) Filed: May 17, 2021

(65) Prior Publication Data

US 2021/0374079 A1   Dec. 2, 2021

(30) Foreign Application Priority Data

Jun. 1, 2020 (KR) .................. 10-2020-0066076
Jan. 21, 2021 (KR) .................. 10-2021-0008898

(51) Int. Cl.
*G06F 13/16* (2006.01)
*G06F 13/18* (2006.01)

(52) U.S. Cl.
CPC .......... *G06F 13/1673* (2013.01); *G06F 13/18* (2013.01)

(58) Field of Classification Search
None
See application file for complete search history.

(56) References Cited

U.S. PATENT DOCUMENTS

| | | | |
|---|---|---|---|
| 7,543,290 B2 | 6/2009 | Kagan et al. | |
| 7,679,133 B2 | 3/2010 | Son et al. | |
| 8,375,145 B2 * | 2/2013 | Kagan | G06F 13/1605 709/216 |
| 8,553,466 B2 | 10/2013 | Han et al. | |
| 8,559,235 B2 | 10/2013 | Yoon et al. | |
| 8,654,587 B2 | 2/2014 | Yoon et al. | |
| 9,431,077 B2 | 8/2016 | Shacham et al. | |
| 9,697,219 B1 * | 7/2017 | Wang | G06F 16/1734 |
| 9,769,274 B2 * | 9/2017 | Mapp | H04L 67/568 |
| 9,877,353 B2 | 1/2018 | Lee et al. | |
| 10,572,180 B1 * | 2/2020 | Nemawarkar | G06F 3/0659 |

(Continued)

FOREIGN PATENT DOCUMENTS

KR   10-2015-0128346 A   11/2015
KR   10-2019-0106228 A   9/2019

*Primary Examiner* — Michael Sun
(74) *Attorney, Agent, or Firm* — Harness, Dickey & Pierce, P.L.C.

(57) ABSTRACT

A host controller interface configured to provide interfacing between a host device and a storage device includes processing circuitry; a doorbell register configured to store a head pointer and a tail pointer of one or more first queues; and an entry buffer configured to store a first command from one of the one or more first queues in the entry buffer, wherein the processing circuitry is configured to, determine an order in which the commands of the one or more first queues are to be processed, route the first command to be stored in the entry buffer according to the determined order, and route a first response to be stored in one of one or more second queues.

19 Claims, 31 Drawing Sheets

(56) References Cited

U.S. PATENT DOCUMENTS

| | | |
|---|---|---|
| 10,664,420 B2 * | 5/2020 | Wu .................... G06F 13/4282 |
| 2011/0233648 A1 | 9/2011 | Seol et al. |
| 2015/0186068 A1 | 7/2015 | Benisty et al. |
| 2018/0321844 A1 | 11/2018 | Benisty |
| 2019/0087359 A1 | 3/2019 | Litichever et al. |
| 2019/0278514 A1 | 9/2019 | Chaturvedi et al. |
| 2019/0278518 A1 | 9/2019 | Byun et al. |
| 2020/0333975 A1 * | 10/2020 | Benisty ................ G06F 3/0659 |

* cited by examiner

FIG. 14A

| | 0 | 1 | 2 | 3 |
|---|---|---|---|---|
| 0 | xx00 0001b | Flags | | Task Tag |
| 4 | IID \| Commnad Type | SQ_ID | CQ_ID | Reserved |
| 8 | Total EHS Length(00h) | Reserved | (MSB) Data Segment Length | (LSB) |
| 12 | (MSB) | Expected Data Transfer Length | | (LSB) |
| 16 | CDB[0] | CDB[1] | CDB[2] | CDB[3] |
| 20 | CDB[4] | CDB[5] | CDB[6] | CDB[7] |
| 24 | CDB[8] | CDB[9] | CDB[10] | CDB[11] |
| 28 | CDB[12] | CDB[13] | CDB[14] | CDB[15] |

PACKET_C

FIG. 14B

PACKET_R

| 0 | 1 | 2 | 3 |
|---|---|---|---|
| xx00 0001b | Flags | | Task Tag |
| 4 | 5 | 6 | 7 |
| IID \| Commnad Type | Reserved | LUN | STATUS |
| 8 | 9 | 10 | 11 |
| Total EHS Length(00h) | Device Information | RESPONSE | (LSB) |
| 12 | 13 | 14 | 15 |
| (MSB) Data Segment Length | | | |
| | Residual Transfer Count | | |
| 16 | 17 | 18 | 19 |
| Reserved | | | |
| 20 | 21 | 22 | 23 |
| Reserved | | | |
| 24 | 25 | 26 | 27 |
| Reserved | | | |
| 28 | 29 | 30 | 31 |
| SQ_ID | CQ_ID | Reserved | Reserved |
| | | Header E2ECRC (omit if HD=0) | |
| k | k+1 | k+2 | k+3 |
| (MSB) Sense Data Length | Sense Data[0] | Sense Data[1] | |
| k+16 | k+17 | k+18 | k+19 |
| Sense Data[14] | Sense Data[15] | Sense Data[16] | Sense Data[17] |
| | | Data E2ECRC (omit if HD=0) | |

NOTE 1 k=32 if HD=0.

HOST CONTROLLER INTERFACE USING MULTIPLE CIRCULAR QUEUE, AND OPERATING METHOD THEREOF

CROSS-REFERENCE TO RELATED APPLICATIONS

This application is based on and claims priority under 35 U.S.C. § 119 to Korean Patent Applications No. 10-2020-0066076, filed on Jun. 1, 2020, and No. 10-2021-0008898, filed on Jan. 21, 2021, in the Korean Intellectual Property Office, the disclosures of which are incorporated by reference herein in their entirety.

BACKGROUND

At least some example embodiments of the inventive concepts relate to a host controller interface configured to transfer a command to a storage device, and more particularly, to a host controller interface that has a bitmap-based doorbell structure and may use a multiple circular queue.

Serial ATA (SATA), Peripheral Component Interconnect Express (PCIe), Serial Attached SCSI (SAS), embedded MMC (eMMC), Universal Flash Storage (UFS), and the like are used as interfaces in a storage system based on a storage device (for example, a solid state drive (SSD)). Storage devices are being gradually developed, and an amount of simultaneously processed data also gradually increases. However, an interface such as SATA is not an interface specialized for a storage device such as an SSD, and therefore has fundamental limitations.

Recently, as a part of efforts to make a standardized interface applicable to a data storage device, a non-volatile memory express (NVMe) interface and a UFS interface have been made. An NVMe interface may provide a direct memory access function to storage devices (or nonvolatile memories) connected through a PCIe bus, and a UFS is a structure adopting M-PHY and a mobile industry processor interface (MIPI) and UniPro.

When a bitmap doorbell is shared by a plurality of cores, the performance of the entire system may be degraded due to resource occupation overhead. For example, in a UFS protocol, when any one of the plurality of cores approaches a bitmap doorbell, other cores may not access the bitmap doorbell.

SUMMARY

The inventive concept provides a host controller that has a bitmap-based doorbell structure and may use a multiple circular queue, and an operation method thereof.

According to at least some example embodiments of the inventive concepts, a host controller interface configured to provide interfacing between a host device and a storage device includes processing circuitry; a doorbell register configured to store a head pointer and a tail pointer of one or more first queues; and an entry buffer configured to store a first command from one of the one or more first queues in the entry buffer, wherein the processing circuitry is configured to, determine an order in which the commands of the one or more first queues are to be processed, route the first command to be stored in the entry buffer according to the determined order, and route a first response to be stored in one of one or more second queues.

According to at least some example embodiments of the inventive concepts, a storage system includes a host device; and a storage device, wherein the host device is configured to transfer a first command to the storage device, wherein the host device includes, a host memory configured to store at least one queue, at least one core configured to process the at least one queue, a first processing circuitry configured to provide interfacing with the host memory, and a doorbell register configured to store a head pointer and a tail pointer for the at least one queue, and wherein the storage device includes second processing circuitry configured to provide, to the host device, a first response which is a result of performing a memory operation based on the first command.

According to at least some example embodiments of the inventive concepts, there is provided an operation method of a host controller interface configured to providing interfacing between a host device and a storage device using at least one queue which includes at least one command, the operation method including arbitrating orders of a plurality of commands including a first command included in a first queue, storing a first command into the an entry buffer, updating a first head pointer of the first queue, storing a second command into the entry buffer, updating a second head pointer of a second queue including the second command, and sequentially providing the first command and the second command to the storage device.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

FIGS. 14A and 14B are a diagram of a structure of a packet according to at least some example embodiments of the inventive concepts;

DETAILED DESCRIPTION OF THE EMBODIMENTS

Figure 1:
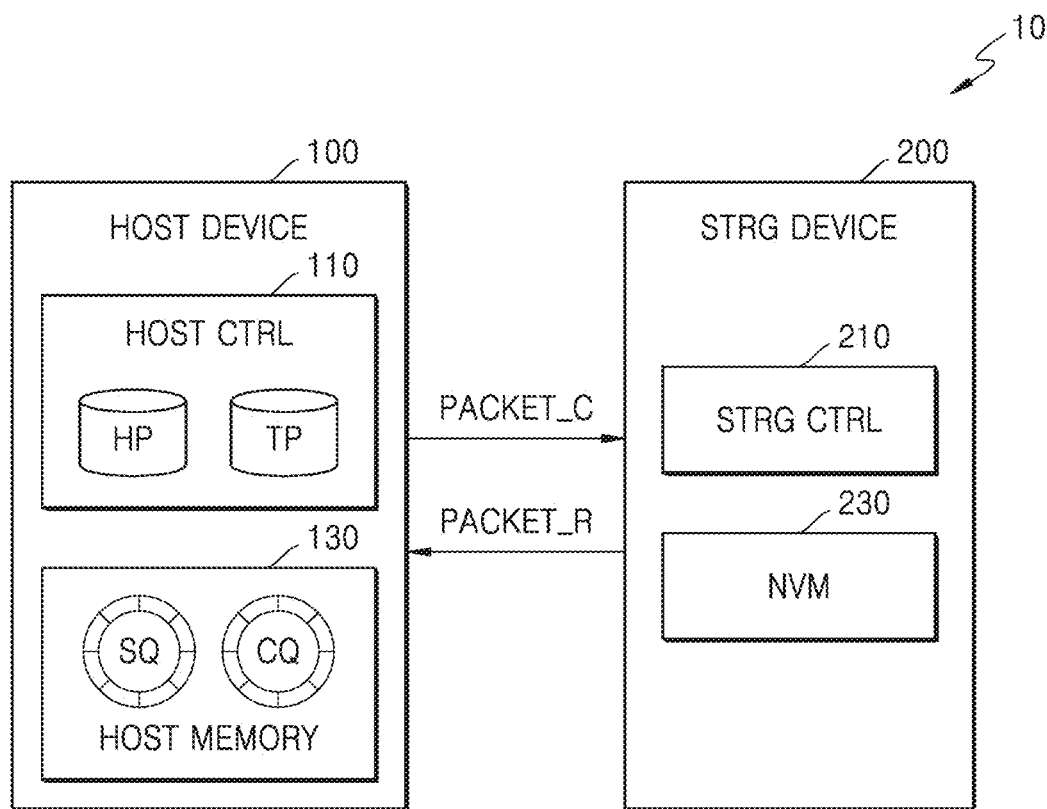
FIG. 1 is block diagram of a storage system according to at least some example embodiments of the inventive concepts.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

FIG. 1 is a block diagram of a storage system 10 according to at least some example embodiments of the inventive concepts.

The storage system 10, which may also be referred to as host storage system 10, may include a host device 100 and a storage device 200. The host 100 may also be referred to as host device 100.

For smooth data transmission between the host device 100 and the storage device 200, various standard protocols have been developed or are currently in development. As one of the standard protocols, for a flash memory device such as smartphones and tablet computers, a Universal Flash Storage (UFS) has been developed by the Joint Electron Device Engineering Council (JEDEC). UFS adopts a command protocol, which supports multiple commands having characteristics of command queue procession, and a Small Computer System Interface (SCSI) architecture model, thereby enabling a multi thread programming paradigm.

Another standard protocol developed by JEDEC is an embedded Multi Media Card (eMMC) standard protocol. The eMMC may provide a simplified application interface design, a small package size, and low power consumption. eMMC flash memory-based storage devices are one of the main forms of storage in current mobile devices.

The storage system 10 according to at least one example embodiment of the inventive concept may include a flash memory-based storage device standard protocol such as UFS and eMMC. However, the present embodiment is not limited thereto.

The storage system 10 may be embodied as, for example, a personal computer (PC) including a desktop computer and a laptop computer, a data server, a network-attached storage (NAS), an Internet of Things (IoT) device, a workstation, a server, an electric car, or a handheld electronic device. A handheld electronic device may include a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an electronic book (e-book), and/or a wearable device.

The storage system 10 may store data in the storage device 200 or retrieve the data from the storage device 200 according to a command CMD of the host device 100. In an example embodiment, the host device 100 may provide data to be written in the storage device 200, and may read the data by receiving a response RESP from the storage device 200. According to an example embodiment, the host device 100 may issue the command CMD and transfer the command CMD to the storage device 200, and the storage device 200 may read, clear, or write the data in response to the command, and may generate the response RESP as a result and provide the response RESP to the host device 100.

The command CMD may be included in a command packet PACKET_C and managed therein, and the response RESP may be included in a response packet PACKET_R and managed therein. Configurations of packets will be described in detail with reference to FIGS. 14A and 14B.

The host device 100 may include a host controller 110 and a host memory 130.

The host device 100 may provide various services to a user of the host device according to operations of one or more electronic circuits, chips, or devices. According to an example embodiment, the host device 100 may perform various operations to process a command received from the user of the host device 100, and may provide an operation result to the user of the host device 100. The host device 100 according to an example embodiment may include an operation system, an application, and the like. The host device 100 according to at least some example embodiments of the inventive concepts may include a universal flash storage (UFS) host control driver to support a UFS protocol. However, the inventive concept is not limited thereto, and the host device 100 may include a driver to support an eMMC protocol or a non-volatile memory express (NVMe) protocol.

The host controller 110 may control all operations of the host device 100, and more particularly, operations of other components included in the host device 100. In an example embodiment, the host controller 110 may be embodied as a processor, an application processor, or the like. In addition, the host controller 110 may be embodied as an operation processor (for example, a central processor unit (CPU), a graphics processing unit (GPU), an application processor (AP), and the like) including a dedicated logical circuit (for example, a field programmable gate array (FPGA), application specific integrated circuits (ASICs), and the like), but is not limited thereto. According to at least some example embodiments of the inventive concepts, the host controller 110 may be, or include, processing circuitry such as hardware including logic circuits; a hardware/software combination executing software; or a combination thereof. For example, the processing circuitry more specifically may include, but is not limited to, one or more of a central processing unit (CPU), a processor core, an arithmetic logic unit (ALU), a digital signal processor, a microcomputer, a field programmable gate array (FPGA), a programmable logic unit, a microprocessor, an application-specific integrated circuit (ASIC), etc. According to at least some example embodiments of the inventive concepts, the processing circuitry of the host controller 110 may be specifically structured and/or programmed (e.g., via computer-executable program code) to carry out and/or control some or all of the operations described in the present specification as being performed by a host (e.g., host 100), a host controller, (e.g., host controller 110), or an element of a host or host controller (e.g., the host controller interface (HCI) 190 which is discussed in greater detail below with reference to FIG. 5).

The host controller 110 may execute various kinds of software loaded in the host memory 130. For example, the host controller 110 may execute an operation system (OS) and application programs.

The host controller 110 may generate the command CMD in response to a request of a user and determine whether to transfer the command CMD to the storage device 200. In addition, the host controller 110 may receive the response RESP. In an example embodiment, the host controller 110 may write the command CMD and/or the response RESP to a queue, which is a process waiting row, or remove the command CMD and/or the response RESP from the queue.

The host controller 110 may include one or more cores, and may further include another intellectual property (IP) configured to control a memory and/or the storage device 200. According to an example embodiment, the core may execute a queue that is a process waiting row of the command CMD and the response RESP processed by the host device 100. According to an example embodiment, the host controller 110 may further include an accelerator, which is a dedicated circuit for a high-speed data operation such as an artificial intelligence (AI) data operation, and the accelerator may include a graphics processing unit (GPU), a neural processing unit (NPU), and/or a data processing unit (DPU), and may also be embodied as a separate chip that is physically independent of other components of the host controller 110.

The host controller 110 may include a host controller interface (hereinafter referred to as HCI), and the HCI may manage an operation of storing data (for example, write data) of the host memory 130 into a nonvolatile memory 230 or storing data (for example, read data) of the nonvolatile memory 230 into the host memory 130. In addition, the storage controller 210 may include a device controller interface (not shown) for interface with the host controller 110.

A submission queue (SQ) may refer to a row waiting for process of various kinds of events such as a request or the command CMD from the host device 100. The command CMD stored in the SQ may be transferred to the storage device 200 by being fetched by the host controller 110. A completion queue (CQ) may indicate a row for processing various kinds of events including a request or the response RESP from the storage device 200. The response RESP stored in the CQ, by being fetched by the host controller 110, may instruct update of meta data to be processed by a host after a memory operation (for example, writing, reading, or clearing the data) is finished. The SQ and the CQ may be generated in the host memory 130 of the host device 100. Although implementation of the SQ and the CQ as circular queues is shown According to at least one example embodiment of the inventive concept, implementations are not limited thereto.

According to at least some example embodiments of the inventive concepts, the host controller 110 may include a doorbell register. The doorbell register is a register assigned to manage the SQ and the CQ. For example, the host controller 110 may perform an interface operation with respect to the SQ and the CQ with the host memory 130 by accessing the SQ and the CQ through the doorbell register. According to an example embodiment, the doorbell register may be included in a host controller interface.

The doorbell register according to an example embodiment may manage or control queue pairs generated by the host device 100. The doorbell register may correspond to a queue pair. For example, the doorbell register may store a head pointer (HP) and a tail pointer (TP) of a queue. For example, the doorbell register may store a tail pointer pointing to a tail of the SQ and a head pointer pointing to a head of the CQ.

According to at least one example embodiment of the inventive concept, a doorbell register related to the SQ is referred to as an SQ doorbell register, and a doorbell register related to the CQ is referred to as a CQ doorbell register. In addition, a structure in which a doorbell corresponding to one queue pair is expressed as a bitmap, which is a group of 1-bit data spaces, is referred to as a bitmap doorbell. According to at least some example embodiments of the inventive concepts, the SQ doorbell register, the CQ doorbell register, the bitmap doorbell, and the like may be managed by the HCI 190. The HCI 190 will be described in further detail with reference to FIG. 5.

The host memory 130 may be used as a main memory or a cache memory. Alternatively, the host memory 130 may be used as a driving memory configured to drive software, applications, or firmware. Programs or data to be processed by the host controller 110 may be loaded in the host memory 130. For example, a file system, an application, a device driver, and the like may be loaded in the host memory 130. The file system may provide a logical address according to a command (for example, a write command or a read command) to the storage device 200. The file system may be used according to a specific operation system executed by the host device 100. The file system may be embodied by software, applications, or firmware. For example, the host device 100 may execute Window, Linux, Unix, and the like.

The host memory 130 may load the SQ and the CQ used for an interfacing operation between the host device 100 and the storage device 200. The SQ may store the command CMD to be provided to the storage device 200, and the CQ may store the response RESP that is completion information regarding the operations completed in the storage device 200.

According to an example embodiment, the SQ and the CQ loaded by the host memory 130 may be referred by the host controller 110. For example, the host controller 110 may write the command CMD or the response RESP to the SQ by referring to the tail pointer TP, and may read the command CMD or the response RESP from the CQ by referring to the head pointer HP. For example, the host controller 110 may increase a value of the tail TAIL to indicate a next empty space after the command CMD or the response RESP is written to the SQ or the CQ. An operation of writing the command CMD or the response RESP to the queue or reading the command CMD or the response RESP from the queue will be described in further detail with reference to FIG. 9.

According to an example embodiment, the host controller 110 and the host memory 130 may be embodied as separate semiconductor chips. Alternatively, in some embodiments, the host controller 110 and the host memory 130 may be integrated in a same semiconductor chip. For example, the host controller 110 may include any one of a plurality of modules provided in the AP, and the AP may be embodied as a system on chip (SoC). Furthermore, the host memory 130 may be an embedded memory provided in the AP, or a memory device or a memory module at the outside of the AP.

The host device 100 may further include various kinds of devices related to driving of the storage device 200. For example, a software module (not shown) such as a host application and a device driver may be further provided, and the software module may be loaded in the host memory 130 and executed by a processor (not shown).

The storage device 200 may include a storage controller 210 and a non-volatile memory device (NVM) 230. The NVM 230 may include an NVM core.

The storage device 200 may include storage devices configured to store data in response to a request from the host device 100. For example, the storage device 200 may include one or more solid state drives (SSDs). When the storage device 200 includes an SSD, the storage device 200 may include a plurality of flash memory chips (for example, NAND memory chips) configured to store the data in a non-volatile manner.

According to an example embodiment, the storage device 200 may correspond to a flash memory device including one or more flash memory chips. The flash memory device may be a non-volatile data storage medium to/from which the data may be electrically written/erased. In an example embodiment, the storage device 200 may be an embedded memory embedded in the storage system. For example, the storage device 200 may be an embedded Multi-Media Card (eMMC) or an embedded UFS memory device. In an example embodiment, the storage device 200 may be an external memory that may be attached to/detached from the storage system 10. For example, the storage device 200 may include various flash memory-based storage devices, including a UFS memory card, a compact flash (CF) card, a secure digital (SD) card, a micro secure digital (Micro-SD) card, a mini secure digital (Mini-SD) card, an extreme digital (xD) card or a memory stick, a solid state drive (SSD), a universal serial bus (USB), and a flash drive.

When the storage device 200 includes a flash memory, the flash memory may include a two-dimensional NAND memory array or a three-dimensional (or vertical) NAND (VNAND) memory array. The 3D memory array, which is a circuit related to arrays of memory cells having an active region on a silicon substrate, or an operation of the memory cells, is formed in a monolithic manner on the substrate or at least one physical level of a circuit that is formed in the substrate. The term "monolithic" indicates that layers of levels constructing the array are stacked directly on layers of lower levels in the array.

In an example embodiment, the 3D memory array includes VNAND strings arranged in a vertical direction such that at least one memory cell is over another memory cell. The at least one memory cell may include a charge trap layer.

U.S. Pat. Nos. 7,679,133, 8,533,456, 8,654,587, 8,559,235, and U.S. Patent Application Publication 2011/0233648, the disclosures of which are incorporated by reference herein in their entireties, each disclose suitable configurations regarding a 3D memory configured in a plurality of levels, in which word lines and/or bit lines are shared between the plurality of levels.

As another example, the storage device 200 may also include other various kinds of nonvolatile memories. For example, magnetic RAM (MRAM), spin-transfer torque MRAM, conductive bridging RAM (CBRAM), ferroelectric RAM (FeRAM), phase RAM (PRAM), resistive RAM, and other various kinds of memories may be applied to the storage device 200.

The storage controller 210 may control all operations of the storage device 200. For example, the storage controller 210 may schedule operations of the NVM 230, or may encode and decode signal/data processed by the storage device 200. In an example embodiment, the storage controller 210 may control the NVM to write, read, or erase the data. According to at least some example embodiments of the inventive concepts, the storage controller 210 may be, or include, processing circuitry such as hardware including logic circuits; a hardware/software combination executing software; or a combination thereof. For example, the processing circuitry more specifically may include, but is not limited to, one or more of a central processing unit (CPU), a processor core, an arithmetic logic unit (ALU), a digital signal processor, a microcomputer, a field programmable gate array (FPGA), a programmable logic unit, a microprocessor, an application-specific integrated circuit (ASIC), etc. According to at least some example embodiments of the inventive concepts, the processing circuitry of the storage controller 210 may be specifically structured and/or programmed (e.g., via computer-executable program code) to carry out and/or control some or all of the operations described in the present specification as being performed by a storage device (e.g., storage device 200), a storage controller (e.g., storage controller 210), or an element of a storage device or storage controller.

The NVM 230 may include storage mediums for storing data in response to a request from the host device 100. In an example embodiment, as described above, the NVM 230 may include at least one flash memory chip configured to store the data in a nonvolatile manner, and may include a NAND or VNAND memory array.

The host device 100 and the storage device 200 may communicate with each other through various kinds of interfaces. For example, the host device 100 and the storage device 200 may be connected to each other through standard interfaces such as universal flash storage (UFS), serial ATA (SATA), small computer small interface (SCSI), serial attached SCSI (SAS), and eMMC. The host device 100 and the storage device 200 may respectively generate packets according to protocols of adopted interfaces and transfer the packets. An example in FIG. 1 illustrates a command packet PACKET_C that is generated in the host device 100 and transferred to the storage device 200 and a response packet PACKET_R that is generated in the storage device 200 and transferred to the host device 100.

According to at least one example embodiment of the inventive concept, the host device 100 may directly control the SQ doorbell register, the CQ doorbell register, the bitmap doorbell, and arbitration and routing of the SQ and the CQ, thereby solving an occupation problem of computing resources of the host device 100 and significantly increasing the performance thereof.

Figure 2:
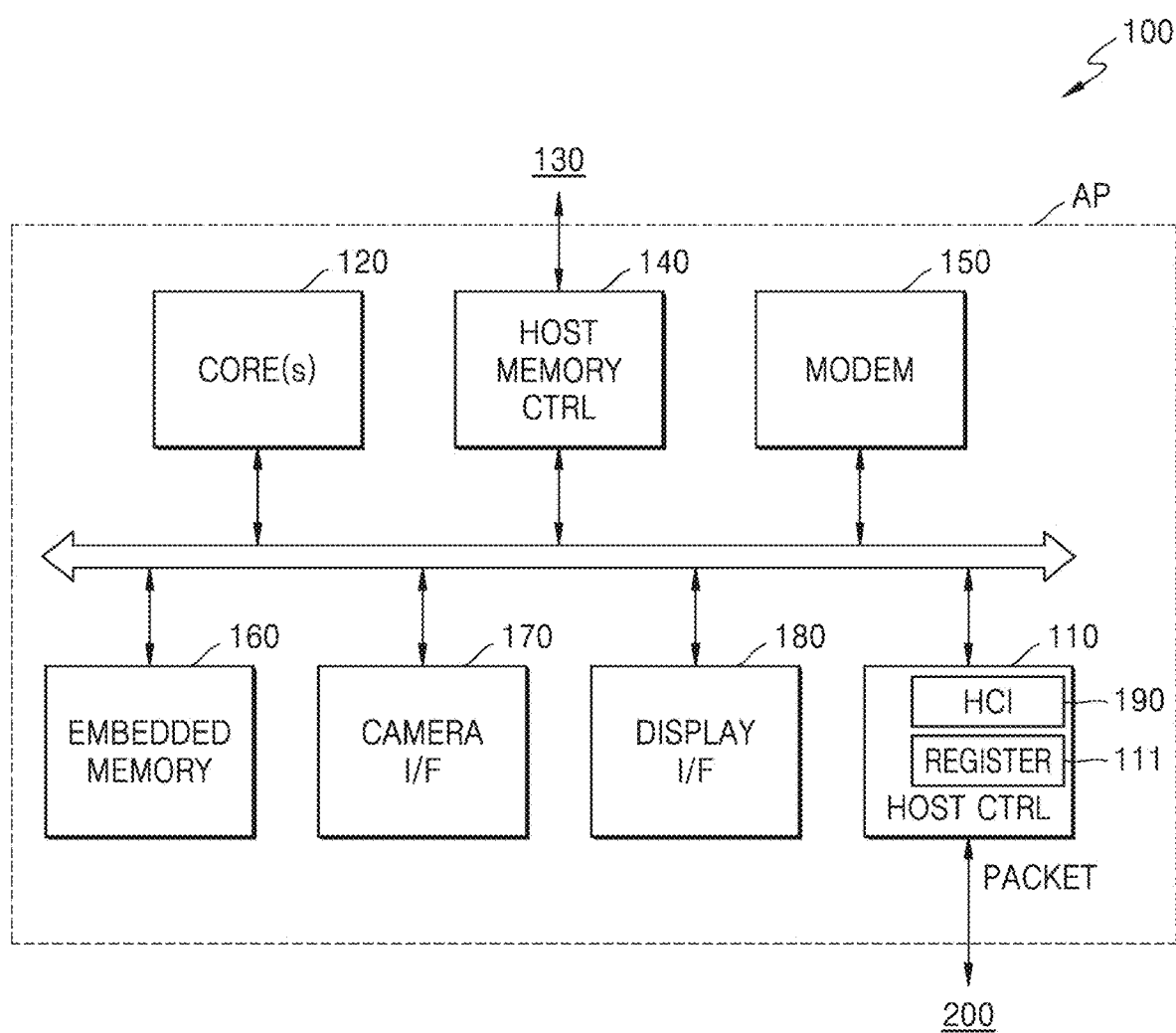
FIG. 2 is a block diagram of an embodiment of a host device shown in FIG. 1.

FIG. 2 is a block diagram of an embodiment of the host device 100 shown in FIG. 1. The example in FIG. 2 shows an AP including the host controller 110. Hereinafter, the host device 100 will be described by using the AP. However, it will be understood that the inventive concept is not limited to being embodied as the AP and may be applied to various kinds of host devices which may provide a host-slave function.

Referring to FIG. 2 in conjunction with FIG. 1, the host device 100 may include the AP and the host memory 130, and the AP may include one or more modules as IPs. In an example embodiment, the AP may include the host controller 110, at least one core 120, a host memory controller 140, a modem 150, an embedded memory 160, a camera interface 170, and a display interface 180. The host controller 110, the at least one core 120, the host memory controller 140, the modem 150, the embedded memory 160, the camera interface 170, and the display interface 180 may transfer and receive signals with one another through an internal bus. The host controller 110 may include a register 111 and the HCI 190.

Although it is shown in FIG. 2 that the host memory 130 corresponds to a memory outside the AP, embodiments of the inventive concept are not necessarily limited thereto. For example, the embedded memory 160 in the AP may also be used as the host memory 130 in the embodiments described above. As configurations shown in FIG. 2 are merely in an embodiment, the AP may further include other configurations in addition to the configurations shown in FIG. 2, or alternatively, some of the configurations shown in FIG. 2 may be not provided in the AP.

The at least one core 120 may control all operations of the AP. For example, software (for example, the AP and the device driver) configured to manage data write/read operations with respect to the storage system 10 may be loaded in the host memory 130 or the embedded memory 160, and the at least one core 120 may manage the data write/read operations by executing the software. The host memory 130 may be embodied as a volatile memory or a nonvolatile memory, and according to an embodiment, the host memory 130 may include a nonvolatile memory such as dynamic random access memory (DRAM) and/or a static random access memory (SRAM).

The at least one core 120 may be a homogeneous multi-core processor or a heterogeneous multi-core processor.

According to at least some example embodiments of the inventive concepts, when the at least one core 120 includes a plurality of cores, different cores may each perform a task, which is a processing unit of an operation, by executing different software. For example, a first core may perform a first task, and a second core that is homogeneous or heterogeneous with the first core may perform a second task. Each of the plurality of cores may include dedicated queues. For example, the first core may use a first SQ and a second SQ, the second core may use a second SQ and a second CQ, and by doing so, different tasks may be performed in parallel.

According to an example embodiment, the AP may perform a camera control operation, a display control operation, a modem operation, and the like. As the modem 150 is included in the AP, the AP may be referred to as a ModAP.

The host controller 110 may transfer/receive a packet PACKET including the command CMD or the response RESP to/from the storage device 200, according to the above-described embodiment. The host controller 110 may include a register configured to store one or more transfer requests.

According to an example embodiment, based on control of the at least one core 120, transfer requests regarding write and/or read with respect to the storage device 200 may be stored in the register 111. In addition, various kinds of information for generating packets corresponding to the transfer requests based on control of the at least one core 120 may be stored in the host memory 130, and for example, information regarding the type of the packet and table information including an address may be stored in the host memory 130. Furthermore, in the case of a data write request, write data may be stored in a plurality of data buffers of the host memory 130 based on the control of the at least one core 120. The host controller 110 may confirm the transfer requests stored in the register 111 in the host controller 110, and may perform interfacing with the storage device 200 based on the transfer requests.

Like in the above-described embodiment, the host controller 110 may receive a response packet PACKET_R including the response RESP from the storage device 200 (see FIG. 1), parse the response RESP from the received packet PACKET, and confirm whether a memory operation is processed according to the parsed response RESP.

The HCI 190 may connect the host device 100 to the storage device 200 by transforming formats of data such as a command (for example, a read command, a write command, and the like), a logical address, and data corresponding to various access requests issued by the host device 100 or transforming formats of exchanged instructions. In addition to the UFS and eMMC described above, protocols applied to the host controller interface 190 may include universal serial bus (USB), small computer system interface (SCSI), peripheral component interconnect express (PCIe), advanced technology attachment (ATA), parallel ATA (PATA), serial ATA (SATA), and serial attached SCSI (SAS). However, the protocols are not limited thereto, and various standard protocols supporting interfacing between different devices may be applied.

According to at least some example embodiments of the inventive concepts, the HCI 190 may include an SQ doorbell register, an SQ arbitrator, a bitmap doorbell router, a bitmap doorbell entry, a CQ router, and a CQ doorbell register. Detailed configurations included in the HCI 190 will be described in further detail with reference to FIG. 5.

Figure 3:
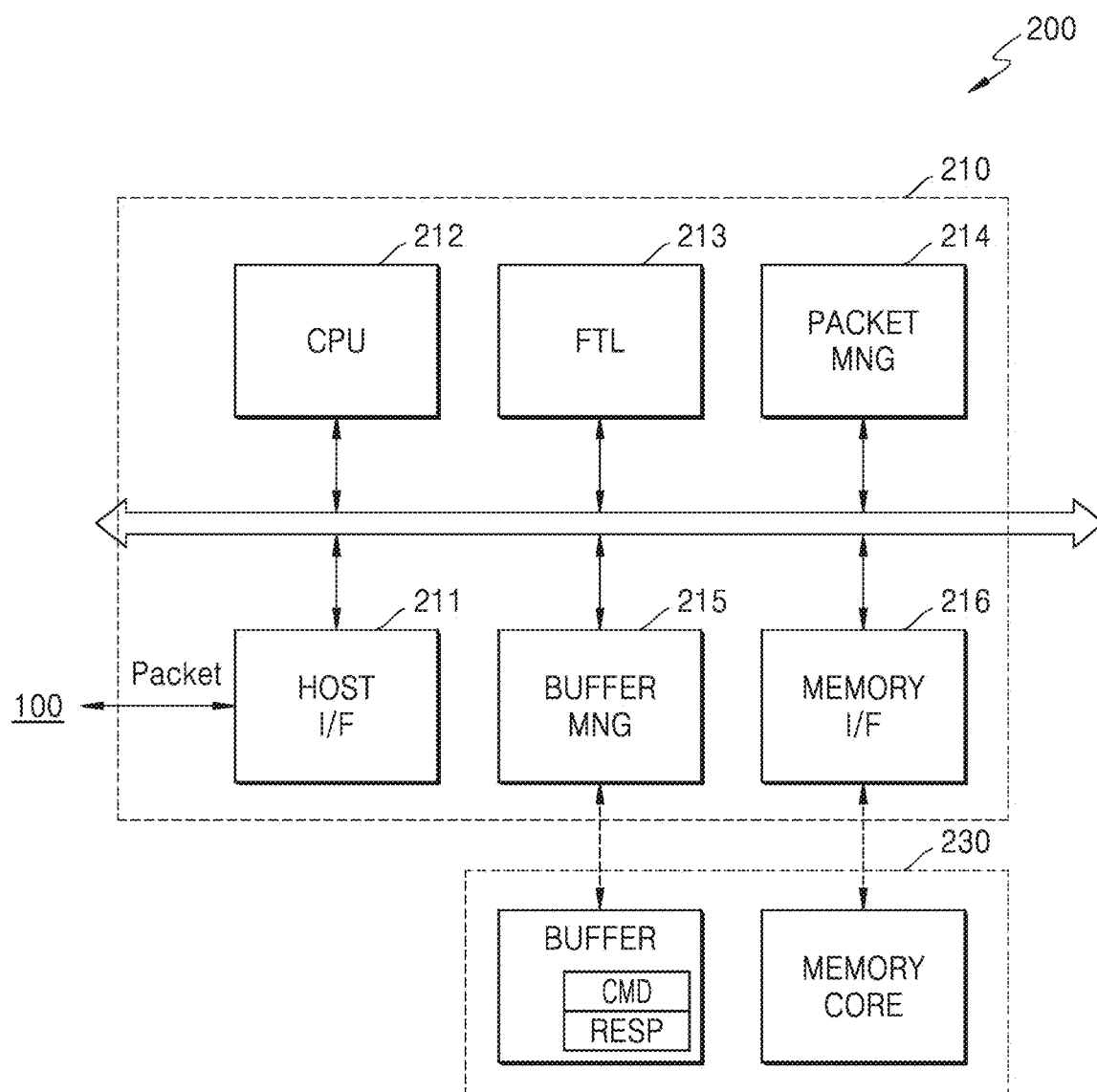
FIG. 3 is a block diagram of an embodiment of a storage controller shown in FIG. 1.

FIG. 3 is a block diagram of an embodiment of the storage controller 210 shown in FIG. 1.

Referring to FIGS. 1 and 3, the storage controller 210 may include a host interface 211, a CPU 212 as a processor, and a memory interface 216. In addition, the storage controller 210 may further include a flash translation layer (FTL) 213, a packet manager 214, and a buffer manager 215. The storage controller 210 may further include a working memory (not shown) in which the FTL 213 is loaded. According to execution of the FTL 213 by the CPU 212, data write and read operations with respect to the memory core may be controlled.

The host interface 211 may transfer/receive the packet PACKET to/from the host device 100, and according to the above-described embodiment, the packet PACKET transferred from/received by the host interface 211 may include a buffer address indicating a location of the data buffer in a buffer region in the host device 100. In addition, the memory interface 216 may perform an operation of writing or reading data by interfacing with the memory core.

The packet manager 214 may generate a packet PACKET according to a protocol of an interface negotiated with the host device 100 or parse various information from the received packet PACKET. In addition, the buffer manager 215 may manage an operation of storing the various information, which is parsed from the packet PACKET, into the buffer; for example, the buffer manager 215 may manage a storage operation of the command CMD or the response RESP parsed from the packet PACKET.

The buffer manager 215 may manage an operation of storing the write data, which is parsed from the packet PACKET, into the buffer, and may manage an operation of storing data, which is read from the memory core, into the buffer. According to an embodiment, the buffer manager 215 may be the buffer manager 215 provided in the storage controller 210. According to an embodiment, the buffer manager 215 may manage a buffer provided outside the storage controller 210.

For example, in the data write operation, the write command CMD and a first buffer address corresponding thereto may be parsed from the packet PACKET that is received from the host device 100, and the first buffer address may be stored in the buffer of the storage device 200. As a response to the write command, the storage device 200 may generate a packet PACKET including a response RESP that requests transmission of write data having a certain size unit. In this case, the first buffer address corresponding to the first write command may be included in the packet PACKET, and the host device 100 may transfer the write data, which is stored in a data buffer at a location indicated by the first buffer address, to the storage device 200, with reference to the response RESP and the first buffer address included in the packet PACKET.

Similarly, according to an example of a data read operation, the read command CMD and a second buffer address corresponding thereto are parsed from the packet PACKET received from the host device 100, and the second buffer address may be stored in the buffer of the storage device 200. The storage device 200 generates a packet including data that is read in response to the read command CMD, and the second buffer address corresponding to the read command CMD may be included in the packet PACKET with the response RESP. In addition, the host device 100 may store the read data in a data buffer at a location indicated by the second buffer address, with reference to the response RESP and the second buffer address included in the packet PACKET.

The host interface 211, the CPU 212, the FTL 213, the packet manager 214, the buffer manager 215, and the memory interface 216 shown in FIG. 3 will be described again with reference to FIG. 18A.

Figure 4:
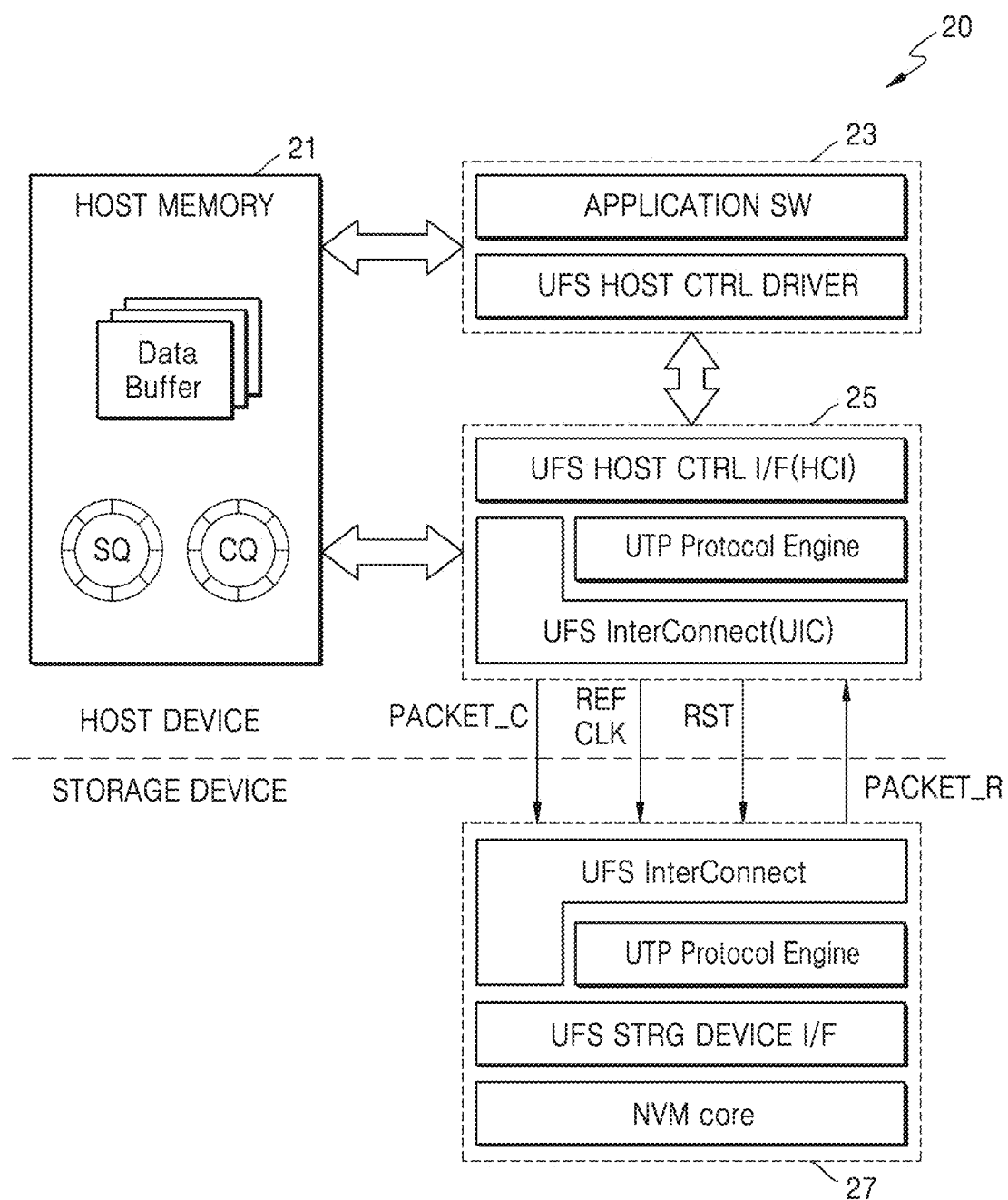
FIG. 4 is a block diagram of an embodiment of a storage system to which a Universal Flash Storage (UFS) interface is applied.

FIG. 4 is a block diagram of an embodiment of a storage system 20 to which a UFS interface is applied. The storage system 10 in FIG. 1 may be applied to the storage system 20 in FIG. 4.

Referring to FIG. 4 in conjunction with FIG. 1, a UFS host and a UFS storage system of the storage system 20 may perform communication according to the UFS interface, and the UFS host may include, as components, a host memory 21, a software module 23, and a UFS host controller 25 corresponding to a hardware module. As the host memory 21 may provide functions similar to those of the host memory 130 described with reference to FIGS. 1 and 2, repeated description will be omitted. In FIG. 4, the host device (see FIG. 1) interfaced by adopting a UFS protocol is shortly referred to as a UFS host, and the storage device 200 (see FIG. 1) interfaced by adopting the UFS protocol is shortly referred to as a UFS device.

The software module 23 may include software (for example, an application) and a UFS host controller driver. Software may include various applications executed by the UFS host, the UFS host controller driver may be configured to manage driving of peripheral devices that are connected to the UFS host for use, and data management operations such as write and read data with respect to the storage device 200 may be performed by executing the UFS host controller driver. Application software and the UFS host controller driver may be loaded in the host memory 21 or another operation memory in the UFS host and may be executed by the processor.

The UFS host controller 25 may be an embodiment of the host controller 110 shown in FIG. 2. The UFS host controller 25 may include a UFS host controller interface (UFS HCI), a UTP protocol engine, and a UFS interconnect layer (UIC).

The UFS HCI may receive a generated request through the UFS host controller driver and provide the request to the UTP protocol engine, or may provide a data access result, which is provided from the UTP protocol engine, to the UFS host controller driver.

The UTP protocol engine may provide services for upper layers (or an application layer); for example, the UTP protocol engine may generate a packet or release a packet and parse information therein.

The UFS interconnect layer may communicate with the UFS storage device 27, and for example, the UFS interconnect layer may include a link layer and a physical layer (PHY layer). The link layer may include a mobile industry processor interface (MIPI) UniPro, and the PHY layer may include MIPI M-PHY. In addition, according to the UFS interface, the UFS host may provide a reference clock signal and a reset signal to the UFS storage device 27.

The UFS storage device 27 may include a storage controller and a memory core. According to an embodiment, in FIG. 4, the storage controller may include a UFS interconnect layer, a UTP protocol engine, and a UFS storage device interface. In addition, the memory core may be a core including a nonvolatile memory (NVM) core.

In a structure in which the UFS host controller 25 and the UFS storage device 27 communicate with each other, data transmission and reception in response to a request from the UFS host controller driver may be performed through the UFS host controller interface. For example, in a data write operation, the write data may be stored in the data buffer of the host memory 21 by the software module 23, the UFS host controller interface may access the data buffer of the host memory 21, and the accessed write data may be provided to the UFS storage device 27. The command CMD for data transmission and reception operations may be stored in a queue. In an example embodiment, when a circular queue is used, the head pointer HP and the tail pointer TP, into which the command CMD is stored, may be stored in the host memory 21. For example, the head pointer HP and the tail pointer TP may be stored in the doorbell register of the host memory 21.

According to at least some example embodiments of the inventive concepts, the command packet PACKET_C and/or the response packet PACKET_R transferred to the host device 100 by the storage device 200 may include a buffer address indicating a location of the data buffer in the host memory 21. The buffer address may correspond to a physical address indicating the location of the data buffer. For example, table information including buffer addresses (for example, a physical region description table (PRDT)) may be stored in a region of the host memory 21, the UTP protocol engine of the UFS host may confirm the buffer addresses through the PRDT, and may generate the command packet PACKET_C including the confirmed buffer address. In addition, the UTP protocol engine of the storage device 200 may generate the response packet PACKET_R that includes a buffer address, which is stored and managed in the storage device 200.

In addition, the UFS host controller 25 and the UFS storage device 27 are connected in a port-mapped input/output type, and write and read operations may be processed in a multi-task method. Accordingly, the UFS storage device 27 may store and manage a plurality of commands derived from a plurality of packets and buffer addresses corresponding to the plurality of commands.

According to the application of the UFS interface, various kinds of packets may be defined, and at least some example embodiments of the inventive concepts may be applied to at least some of the various kinds of packets.

In an example embodiment, a packet according to the UFS interface may be defined as a UFS protocol information unit (UPIU), and as kinds thereof, packets such as a command UPIU for request of write and read, a response UPIU, a Data_In UPIU including the read data, a Data_Out UPIU including the write data, a task management (TM) request UPIU, and a ready to transfer (RTT) UPIU may be defined.

In addition, according to at least some example embodiments of the inventive concepts, at least some kinds of packets among the packets defined in the UFS interface may include the above-described buffer address. For example, a packet which requests access to the data buffer of the host memory 21 may include the above-described buffer address. According to at least one example embodiment of the inventive concept, among the packets exchanged between the host device 100 and the storage device 200, the command packet PACKET_C may include the command CMD, an SQ identification SQ_ID, a CQ identification CQ_ID, and the response packet PACKET_R may include the response RESP, an SQ identification SQ_ID, and a CQ identification CQ_ID. Configurations of the packets will be described with reference to FIGS. 14A and 14B.

Hereinafter, detailed operation examples of the interface between the host and the storage device according to at least some example embodiments of the inventive concepts will be described. The host and the storage device adopting the UFS interface will be described in the following embodiments. However, as described above, at least some example embodiments of the inventive concepts may be applied to other various kinds of interfaces in addition to the UFS interface.

Figure 5:
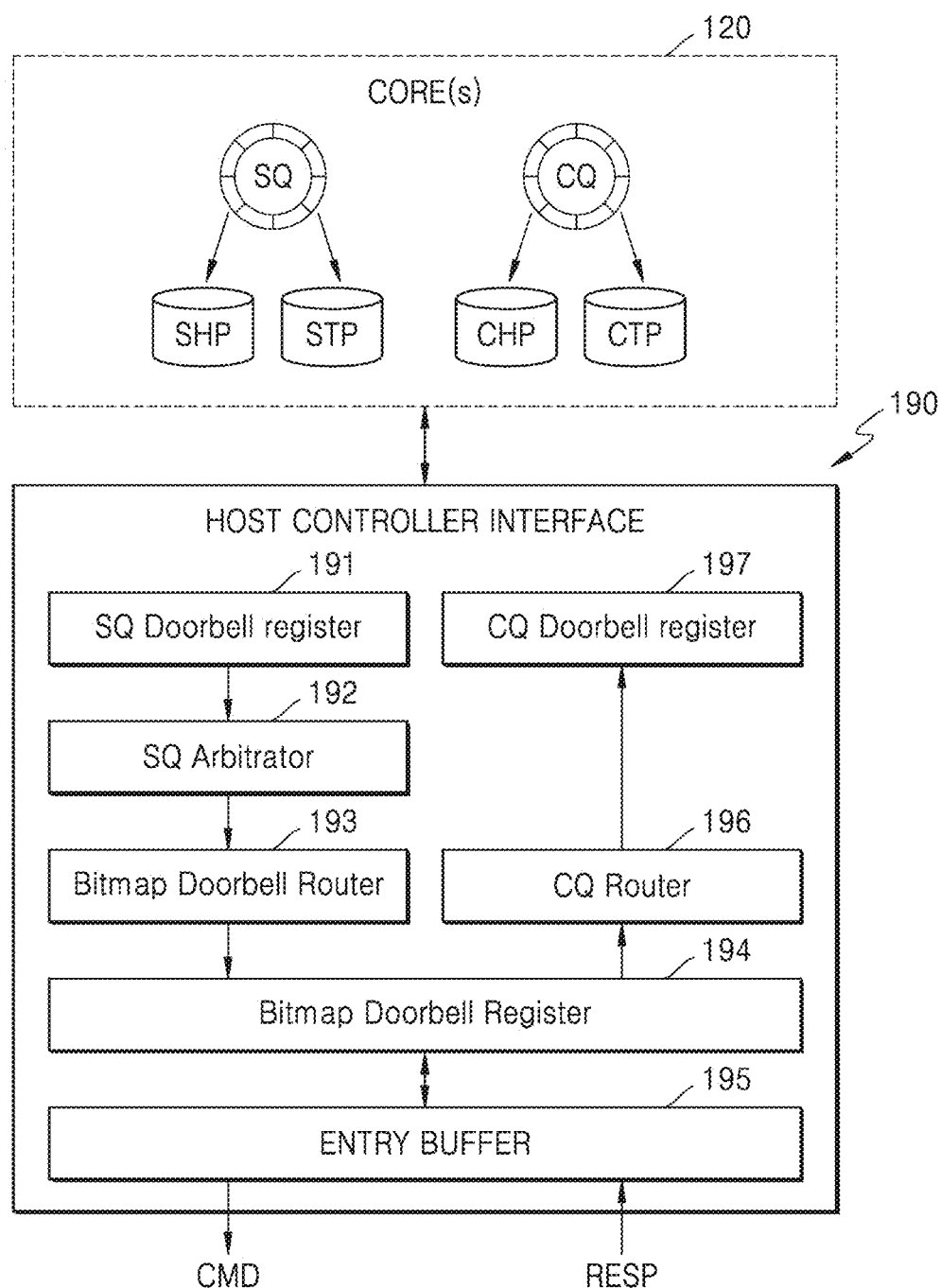
FIG. 5 is a diagram of an operation of a storage system according to at least some example embodiments of the inventive concepts.

FIG. 5 is a diagram of an operation of the storage system 10 according to at least some example embodiments of the inventive concepts. Refer to FIG. 5 in conjunction with FIGS. 1 and 2.

The host device 100 may include a plurality of processors or may include a plurality of cores 120 in one processor. For convenience of explanation, it is assumed that one or more processors include the plurality of cores 120. In addition, it is further assumed that a UFS protocol is applied for interfacing between the host device 100 and the storage device 200.

At least one core 120 may perform an interfacing operation with the storage device 200 based on at least one SQ and at least one CQ. The interfacing operation may be performed in a queue pair unit including the SQ to input a requested command and the CQ to write a processing unit of the command CMD.

According to at least some example embodiments of the inventive concepts, the at least one core 120 may process a memory operation by using the SQ and the CQ. In addition, the SQ may store a processing address of the command CMD or the response RESP in an SQ head pointer SHP and an SQ tail pointer STP, and the CQ may store the processing address of the command CMD or the response RESP in a CQ head pointer CHP and a CQ tail pointer CTP.

The HCI 190 may include an SQ doorbell register 191, an SQ arbitrator 192, a bitmap doorbell router 193, a bitmap doorbell register 194, an entry buffer 195, a CQ router 196, and a CQ doorbell register 197.

The SQ doorbell register 191 may be a pointer storage space to store an order or a location of the SQ. The SQ doorbell register 191 may store a pointer indicating a tail or a head. According to an example embodiment, the SQ doorbell register 191 may include a register indicating a base address of an SQ entry space and a register indicating a size of an SQ entry. According to an example embodiment, the SQ doorbell register 191 may store the SQ head pointer SHP and the SQ tail pointer STP.

An address at which an entry of the SQ is stored in the HCI 190 (refer to as SQ entry address SQ ENTRY ADDR) may be calculated as in Equation 1.

$$(SQ\ \text{ENTRY ADDR}) = (SQ\ \text{ENTRY BASE ADDR}) + (SHP) \times (SQ\ \text{ENTRY SIZE}) \qquad [\text{Equation 1}]$$

That is, the SQ entry address SQ ENTRY ADDR may be a location obtained by adding, to an SQ entry base address SQ ENTRY BASE ADDR, a size of multiplying a size of the SQ entry to the SQ head pointer SHP.

Pointers stored in the SQ doorbell register 191 may be updated at each doorbell notification occurring according to input of the command CMD or input/output of the data. According to at least some example embodiments of the inventive concepts, the core 120 may write the command CMD to the SQ. After the command CMD is written to the SQ, the SQ tail pointer STP may be changed. The command CMD may be sequentially or simultaneously transferred to the storage device 200 by being fetched by the core 120. For example, the core 120 may fetch the SQ and transfer the command CMD, which is stored in the SQ, to the storage device 200. After the command CMD written to the SQ is transferred to the HCI 190, the SQ head pointer SHP may be changed.

Based on the SQ head pointer SHP and the SQ tail pointer STP stored in the SQ doorbell register 191, the command CMD written to the SQ may be transferred to the SQ arbitrator 192. As the SQ may be used on the host memory 130 (see FIG. 1), it may be understood that a command or signal is provided from the SQ doorbell register into which the SQ head pointer SHP or the SQ tail pointer STP is stored. According to at least some example embodiments of the inventive concepts, as there may be the plurality of cores 120, a plurality of SQs may exist, and the SQ arbitrator 192 may receive the plurality of SQs.

The SQ arbitrator 192 may arbitrate processing orders of the SQ (e.g., determine an order in which SQs from among multiple SQs are processed) by selecting any one of the SQs among the plurality of SQs according to a reference. For example, the SQ arbitrator 192 may determine orders of commands CMD among the plurality of SQs, and each of the plurality of SQs may perform a command stored in a circular queue in a first-in-first-out method according to the determined orders. In addition, as a method of selecting any one of the SQs by the SQ arbitrator 192, various algorithms for non-preemptive scheduling or preemptive scheduling according to a time point of a scheduling application, and a static scheduling and a dynamic scheduling according to whether scheduling priorities are changed. For example, the SQ arbitrator 192 may apply the following methods: a round robin method in which processing time periods among SQs are uniform as the SQs are sequentially (or in a cyclic manner) selected; a weighted round robin method in which processing time periods among the SQs are non-uniformly assigned by processing the queues (e.g., SQs) starting from the SQ having a greater weight with a weight on a relatively important SQ among the SQs; and a fixed priority method of giving a fixed priority to the SQ as a part of the static scheduling, but is not limited thereto.

The SQ arbitrator 192 may arbitrate orders of the plurality of SQs by comparing differences among the plurality of SQs. According to at least some example embodiments of the inventive concepts, the SQ arbitrator 192 may compare the tail to the head of the SQ. To acquire information regarding the SQ, the SQ arbitrator 192 may refer to the SQ head pointer SHP and the SQ tail pointer STP stored in the SQ doorbell register 191.

The SQ arbitrator 192 according to at least some example embodiments of the inventive concepts may access the SQ doorbell register 191 in the HCI 190, and by doing so, the SQ arbitrator 192 may refer to the head and the tail of the SQ processed by the at least one core 120, and may arbitrate such that the SQ with an insufficient empty space is processed with priority.

According to at least some example embodiments of the inventive concepts, the SQ arbitrator 192 may arbitrate orders of the SQs such that an SQ attached with a priority process flag requiring priority processing is processed with priority.

According to at least some example embodiments of the inventive concepts, the SQ arbitrator 192 may determine an SQ selected among the plurality of SQs or an SQ that has a priority as a comparison result. The SQ arbitrator 192 may transfer the command CMD, which is written in the determined SQ, to the bitmap doorbell router 193.

The bitmap doorbell router 193 may designate (that is, route) a space of the entry buffer 195, in which the command CMD is to be stored. According to at least some example embodiments of the inventive concepts, the bitmap doorbell router 193 may search for the bitmap doorbell register 194, which includes information regarding an occupied space and an idle space of the entry buffer 195, and may designate a path or provide address information such that the command CMD may be written to the idle space. According to an example embodiment, the bitmap doorbell router 193 may designate a space in the entry buffer 195 in which a command CMD selected by the SQ arbitrator 192 is to be stored.

The bitmap doorbell register 194 may be a bit storage space that may indicate a state of the storage space in the entry buffer 195. A bitmap doorbell is a data structure expressed as a bitmap which is a set of 1-bit data spaces. The bitmap doorbell register 194 uses a bit "0" and a bit "1" to express whether the data space is occupied, and therefore, the bitmap doorbell router 193 may write a selected command CMD (or an operation) to the idle space, in which the data is not stored, by searching for the bit "0".

In an example embodiment, when the command CMD or the response RESP is written to the idle space of the bitmap doorbell register 194, a bitmap for the space may be changed into the bit "1". In an example embodiment, when the command CMD or the response RESP written to the occupied space of the bitmap doorbell register 194 is processed, the bitmap for the space may be changed into the bit "0".

The entry buffer 195 may include SQ entries and CQ entries to exchange with the storage device 200 (see FIG. 1). In addition to the data storage space indicating whether occupied by the data, the entry buffer 195 may further include buffers configured to store a UTP Transfer Request Descriptor (UTRD), a PRDT, the SQ identification SQ_ID, and the CQ identification CQ_ID.

According to an example embodiment, the entry buffer 195 may provide, to the storage controller 210 (see FIG. 1), the SQ identification SQ_ID indicating to which SQ the transferred command CMD is written and the CQ identification CQ_ID indicating to which CQ the transferred command CMD is related. Similarly, the entry buffer 195 may receive, from the storage controller 210, the SQ identification SQ_ID indicating to which SQ the provided response RESP is related and the CQ identification CQ_ID indicating to which CQ the transferred response RESP is related.

The host device 100 may provide, to the storage device 200, the command CMD into which the data is stored (that is, "1" is stored in the bitmap doorbell register 194), with reference to the entry buffer 195. The storage device 200 may perform a certain operation with respect to the command CMD, and may provide the response RESP to the host device 100 as a result of the operation. The response RESP may be stored again into the entry buffer 195. The host device 100 and the storage device 200 may perform data communication in a packet PACKET unit, and the command CMD and the response RESP may be respectively included in the command packet PACKET_C and the response packet PACKET_R.

According to at least some example embodiments of the inventive concepts, the entry buffer 195 may buffer a plurality of SQ entries and/or CQ entries. For example, the entry buffer 195 may buffer the UTRD, the PRDT, the command CMD, the response RESP, the SQ identification SQ_ID, the CQ identification CQ_ID, and the like.

The CQ router 196 may designate (i.e., route) the CQ in which the response RESP stored in the entry buffer 195 is to be processed. The response RESP may be provided by the storage device 200 and then buffered by the entry buffer 195 before processing.

According to at least some example embodiments of the inventive concepts, the CQ router 196 may search for a core in which the response RESP may be processed, and may perform routing such that the response RESP is written to the CQ that is processed by the searched core. According to an example embodiment, as a result of designating the response RESP for the CQ by the CQ router 196, the head pointer (e.g., CHP) or the tail pointer (e.g., CTP) of the CQ in the CQ doorbell register may be updated.

In an example embodiment, the CQ router 196 may refer to the CQ identification CQ_ID provided by the storage device 200, in order to determine a core of the plurality of cores, the core being loaded with the CQ, to which the response RESP is to be written. For example, the CQ router 196 may write the response RESP to the first CQ by receiving a first CQ identification CQ_ID loaded in the first core. Similarly to the above-described SQ selection method, various kinds of selection algorithms may be applied to a method of searching for the CQ by the CQ router 196.

In addition, according to at least some example embodiments of the inventive concepts, the CQ router 196 may control data input/output between the CQ and the entry buffer 195 such that the CQ does not overflow. For example the CQ router 196 may control a data flow between the CQ and the entry buffer 195 to prevent an overflow state in which the CQ is full and is not capable of storing the response RESP.

The CQ doorbell register 197 may include a pointer storage space configured to store an order or a location of the CQ. The CQ doorbell register 197 may store a pointer indicating a tail or a head. According to an example embodiment, the CQ doorbell register 197 may include a register indicating a base address an entry space of the CQ and a size of the CQ entry. According to an example embodiment, the CQ doorbell register 197 may store the CQ head pointer CHP and the CQ tail pointer CTP.

An address at which the CQ entry is stored in the HCI 190 CQ ENTRY ADDR may be calculated as in Equation 2.

$$(CQ\ ENTRY\ ADDR) = (CQ\ ENTRY\ BASE\ ADDR) + (CHP) \times (CQ\ ENTRY\ SIZE)$$ [Equation 2]

That is, the CQ entry address CQ ENTRY ADDR may be a location obtained by adding, to a CQ entry base address CQ ENTRY BASE ADDR, a size of multiplying a size of the CQ entry to the CQ head pointer CHP.

Pointers stored in the CQ doorbell register 197 may be updated at each doorbell notification occurring according to input of the command CMD or input/output of the data. According to at least some example embodiments of the inventive concepts, the core 120 may write, to the CQ, the response RESP received from the HCI 190. After the response RESP is written to the CQ, the CQ tail pointer CTP may be changed. The response RESP may be sequentially or simultaneously processed by being fetched by the core 120. For example, the core 120 may fetch the CQ and perform a processing operation corresponding to the response RESP stored in the CQ. After the response RESP written to the CQ is processed, the CQ head pointer CHP may be changed.

The SQ arbitrator 192, the bitmap doorbell router 193, and the CQ router 196 may be embodied as a processing circuit such as a hardware including a logical circuit, or may be embodied as a combination of a hardware and software such as a processor which executes software performing an arbitration operation and/or a routing operation. In particular, the processing circuit may be embodied as a CPU, an arithmetic logic unit (ALU) configured to perform arithmetic and logical operations, bit shift and the like, a digital signal processor (DSP), a microprocessor, and an application specific integrated circuit (ASIC), but is not limited thereto.

When one bitmap doorbell is shared by a plurality of cores, a resource occupation overhead occurs, and therefore, the performance of the entire system may be degraded. For example, in a UFS protocol, when any one of the plurality of cores approaches the bitmap doorbell, the other cores may not access the bitmap doorbell.

The storage system 10 according to at least one example embodiment of the inventive concept includes the SQ arbitrator 192 and the CQ router 196 to prevent resource occupation of the multiple queue, and by doing so, an interfacing between the host device and the storage device adopting the UFS protocol may be fluently performed even in a multiple queue circumstance.

According to at least one example embodiment of the inventive concept, in the HCI 190, a dedicated SQ and a dedicated CQ suitable for the plurality of cores and queue doorbell (i.e., for an SQ doorbell and a CQ doorbell) of the plurality of cores may be directly used. That is, according to at least one example embodiment of the inventive concept, a bitmap doorbell structure applied to the UFS is maintained while the SQ arbitrator 192, the bitmap doorbell router 193, and the CQ router 196, and by doing so, changes in a structure of the storage system 10 may be reduced as much as possible, and may maintain compatibility with other devices adopting the UFS protocol.

Consequentially, the storage system 10 according to at least one example embodiment of the inventive concept may use the multiple circular queue (for example, the SQ and the CQ) in directly transferring the command CMD to the storage device 200 by the HCI 190, and therefore, overhead due to occupation of shared resources among the plurality of cores, and the performance of the storage system 10 may be significantly improved.

Figure 6:
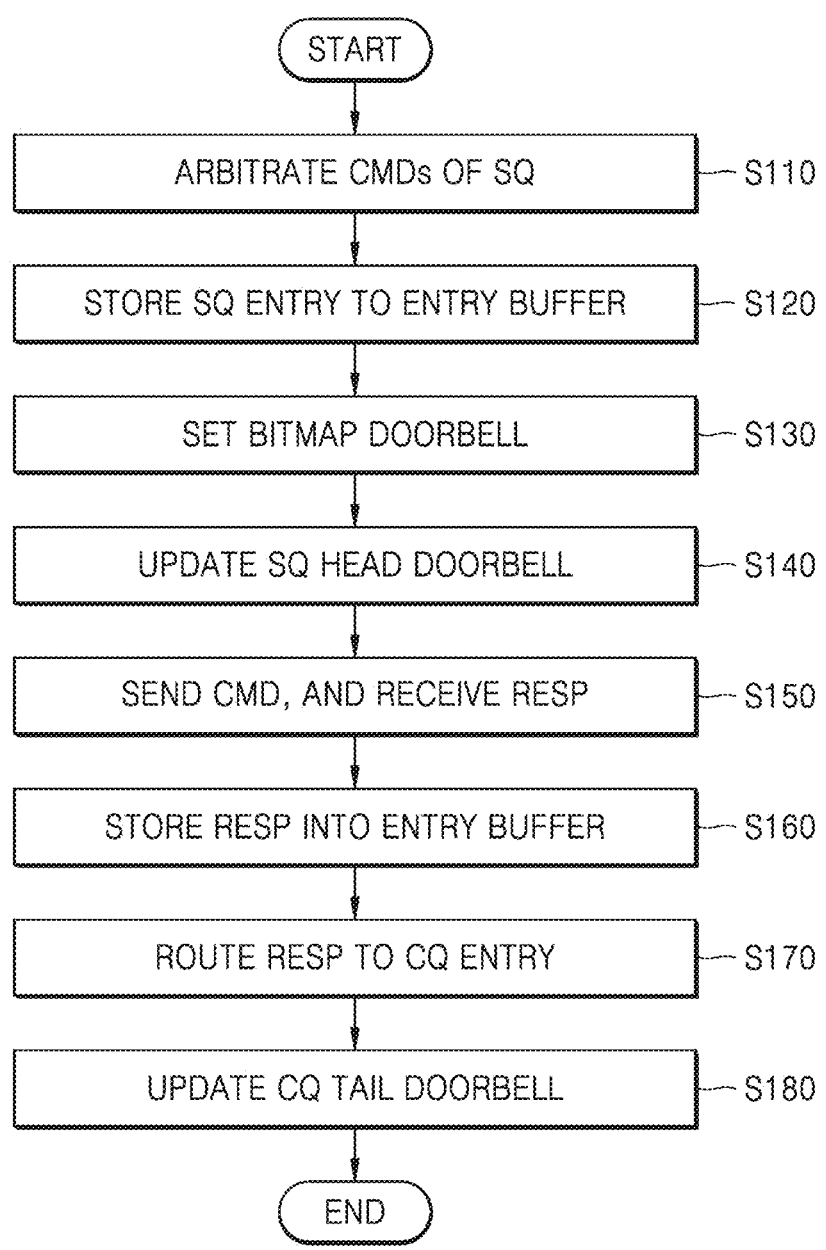
FIG. 6 is a flowchart of an operation method of a host device according to at least some example embodiments of the inventive concepts.

FIG. 6 is a flowchart of an operating method of the host device 100 (see FIG. 1) according to at least some example embodiments of the inventive concepts. Refer to FIGS. 1 and 5 in conjunction with FIG. 6.

In operation S110, the host device 100 may arbitrate a plurality of commands CMDs written to the plurality of SQs. According to an example embodiment, there may be the plurality of cores, and one core may process the command CMD and/or the response RESP by using at least one SQ and at least one CQ. For example, the SQ arbitrator 192 may arbitrate priorities among the commands CMDs with reference to the SQ head pointer SHP and the SQ tail pointer STP of the SQ entry stored in the SQ doorbell register 191.

In operation S120, the host device 100 may write the SQ entry to the entry buffer 195. In an example embodiment, the host device 100 may store only the commands CMDs included in the SQ in the entry buffer 195, not the entire SQ entry.

In operation S130, the host device 100 may set a bitmap doorbell. In an example embodiment, the command CMD may be stored in the entry buffer 195, and a specific value of the bitmap doorbell may be set.

For example, the SQ arbitrator 192 may transfer any one selected command CMD to the bitmap doorbell router 193, and the bitmap doorbell router 193 may store the command CMD into the entry buffer 195 by designating the idle space of the bitmap doorbell register 194 to which the command CMD is written. As the command CMD is written to the entry buffer 195, a data region of the bitmap doorbell register 194 corresponding to the entry buffer 195 may be changed from the bit "0" to the bit "1".

In operation S140, the host device 100 may update the SQ doorbell. According to an example embodiment, as the command CMD is written to the entry buffer 195, the host device 100 may update the SQ head pointer SHP in the SQ doorbell register 191.

According to at least some example embodiments of the inventive concepts, once the command CMD to be processed is written to the entry buffer 195, the command CMD is to be transferred to the storage device 200 (see FIG. 1), and is not to be processed in the host device 100. Accordingly, the host device 100 may increase the efficiency of the space of the SQ by updating the SQ head pointer SHP.

In operation S150, the host device 100 may transfer the command CMD and receive the response RESP. According to an example embodiment, the host device 100 may transfer the command CMD to the storage device 200. The storage device 200 may perform a specific memory operation based on the command CMD, and may provide the response RESP, which is meta data regarding a result of the performance, back to the host device 100. In operation S160, the host device 100 may store the received response RESP into the entry buffer 195. According to at least some example embodiments of the inventive concepts, the entry buffer 195 may buffer the command CMD and the response RESP.

In operation S170, the host device 100 may designate (route) the response RESP to be stored in any one CQ among the plurality of CQs. For example, with reference to the bitmap doorbell register 194, the CQ router 196 may refer to the written plurality of responses RESP, select any one response RESP among the plurality of responses RESPs according to a certain reference (for example, a priority), and may store the response RESP into the CQ doorbell register 197.

In operation S180, the host device 100 may update the CQ doorbell. According to an example embodiment, as a result of designating the response RESP for the CQ by the CQ router 196, the tail pointer (e.g., the QC tail pointer CTP) of the CQ in the CQ doorbell register 197 may be updated.

According to at least some example embodiments of the inventive concepts, the HCI 190 may arbitrate orders of the plurality of SQs. The HCI 190 may determine a priority, and may store the command included in the selected SQ entry into the entry buffer 195. For example, a first command stored in the first SQ may be stored in the entry buffer 195. After the first command is stored in the entry buffer 195, the HCI 190 may update a head pointer of the first SQ.

The HCI 190 may select a next order among the plurality of SQs. The HCI 190 may store a second command, which is stored in the second SQ, into the entry buffer 195. After the second command is stored in the entry buffer 195, the HCI 190 may update a head pointer of the second SQ. The processes are sequentially repeated. The first command and the second command stored in the entry buffer 195 may be transferred to the storage device 200 according to input orders.

Figure 7:
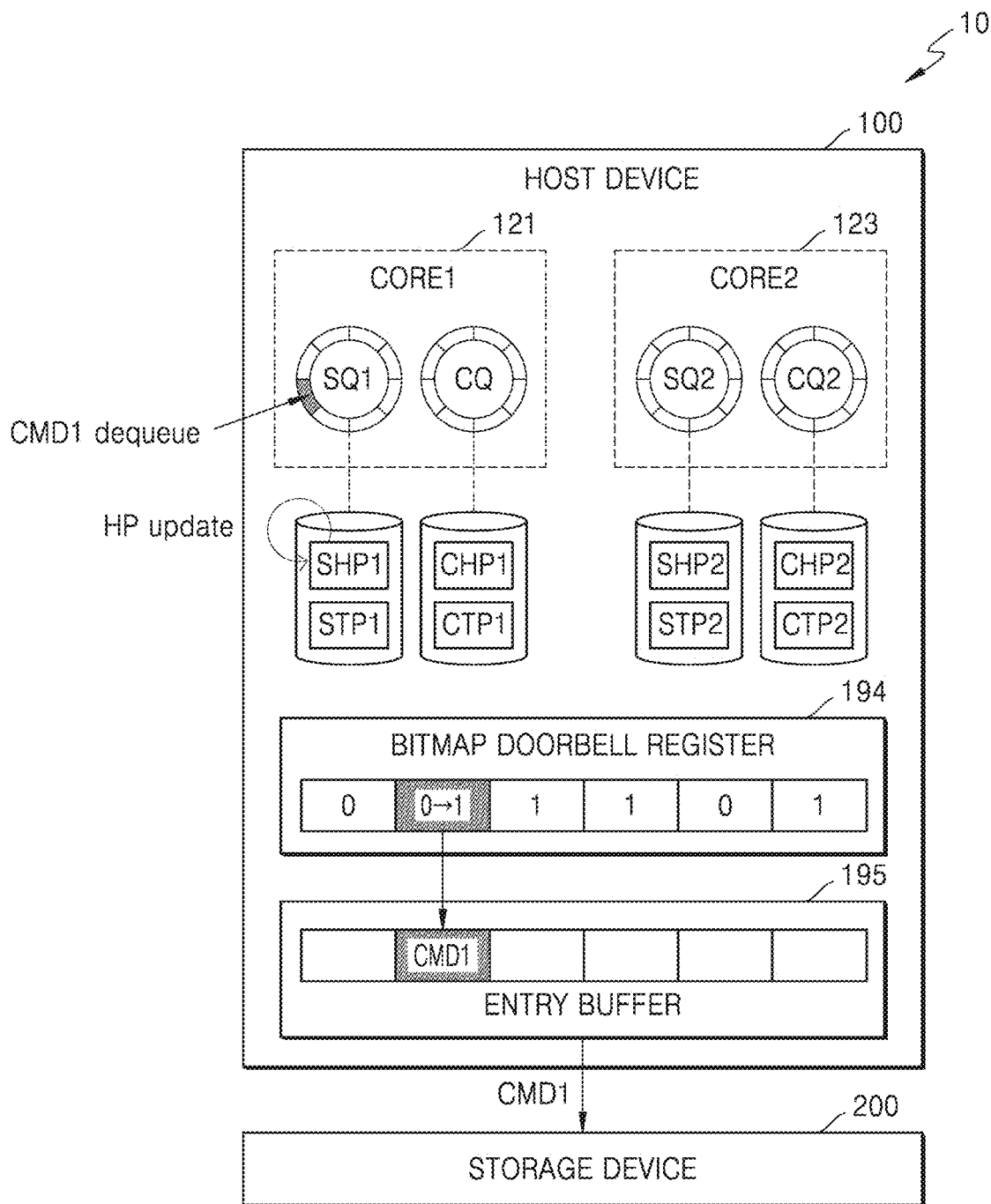
FIG. 7 is a block diagram of a storage system to which a command is written according to at least some example embodiments of the inventive concepts.

FIG. 7 is a block diagram of the storage system 10 to which the command CMD is written, according to at least some example embodiments of the inventive concepts. Refer to FIGS. 5 and 6 in conjunction with FIG. 7.

The storage system 10 may include the host device 100 and the storage device 200. As the host device 100 and the storage device 200 in FIG. 1 may be respectively applied to the host device 100 and the storage device 200, detailed descriptions in a non-conflicting scope are omitted.

The host device 100 may include a first core 121 and a second core 123.

The first core 121 may write the command CMD to the first SQ SQ1, and may refer to a first SQ head pointer SHP1 and a first SQ tail pointer STP1. The first SQ head pointer SHP1 and the first SQ tail pointer STP1 may be included in the first SQ doorbell. In addition, the first core 121 may process the response RESP written to the first CQ CQ1 by referring to the first CQ head pointer CHP1 and the first CQ tail pointer CTP1.

The second core 123 may write the command CMD to the second SQ SQ2, and may refer to a second SQ head pointer SHP2 and a second SQ tail pointer STP2. In addition, the second core 123 may include the second CQ head pointer CHP2 and the second CQ tail pointer CTP2 of the second CQ CQ2.

According to at least some example embodiments of the inventive concepts, the host device 100 may provide the first command CMD1 to the entry buffer 195 as a result of fetching the first SQ SQ1 executed in the first core 112. For example, the bitmap doorbell router 193 may search for an empty space by referring to bits stored in the bitmap doorbell register 135. The entry buffer 195 may write the first command CMD1 to a data space for buffering, and a value of a bitmap corresponding to the space to which the first command CMD1 in the bitmap doorbell register 194 may be changed from bit "0" to bit "1".

According to an example embodiment, with the transfer of the first command CMD, an SQ identification SQ_ID indicating the command CMD written to which SQ between the first SQ and the second SQ may be stored in the entry buffer 195. In addition, a CQ identification CQ_ID, which indicates a CQ with a sufficient computing resource or an empty data space of the queue between the first CQ CQ1 and the second CQ CQ2, may be transferred to the entry buffer 195. The first command CMD1, the SQ identification SQ_ID, and the CQ identification CQ_ID may be transferred in the form of a packet PACKET.

According to at least some example embodiments of the inventive concepts, after the first command CMD1 is transfer red, the first SQ head pointer SHP1 of the first SQ SQ1 may be updated. For example, as a head of the first SQ head pointer SHP1 increases by one (++HEAD), a write space indicated by the head of the first SQ1 may be changed. As the first SQ head pointer SHP1 increases by 1, the command CMD1 written to the first SQ SQ1 may be erased. That is, the first command CMD may be dequeued.

According to at least some example embodiments of the inventive concepts, once the command CMD, which is to be processed, is written to the entry buffer 195, the command CMD is not to be processed in the host device 100. For example, as the storage space of the first command CMD1 is shifted from the first SQ SQ1 to the entry buffer 195, the first SQ SQ1 does not have to store the first command CMD1 anymore. Due to characteristics of a circular queue with a limited write space, a new command may be written only when an unnecessary command is remove.

Accordingly, after the first command CMD1 is stored in the entry buffer 195, the first command CMD1 written to the first SQ SQ1 may be removed from the queue as the SQ head pointer SHP1 of the write space is updated (i.e., as a head value increases by 1). Accordingly, the host device 100 may improve the efficiency in input/output by removing the first command CMD1 from the first SQ SQ1.

The host device 100 may provide the first command CMD1 to the storage device 200 through the entry buffer 195. After the first command CMD1 is transferred, the bitmap doorbell register 194 may change a value of a bitmap, which corresponds to the space to which the first command CMD1 is written, from bit "1" to bit "0".

Figure 8:
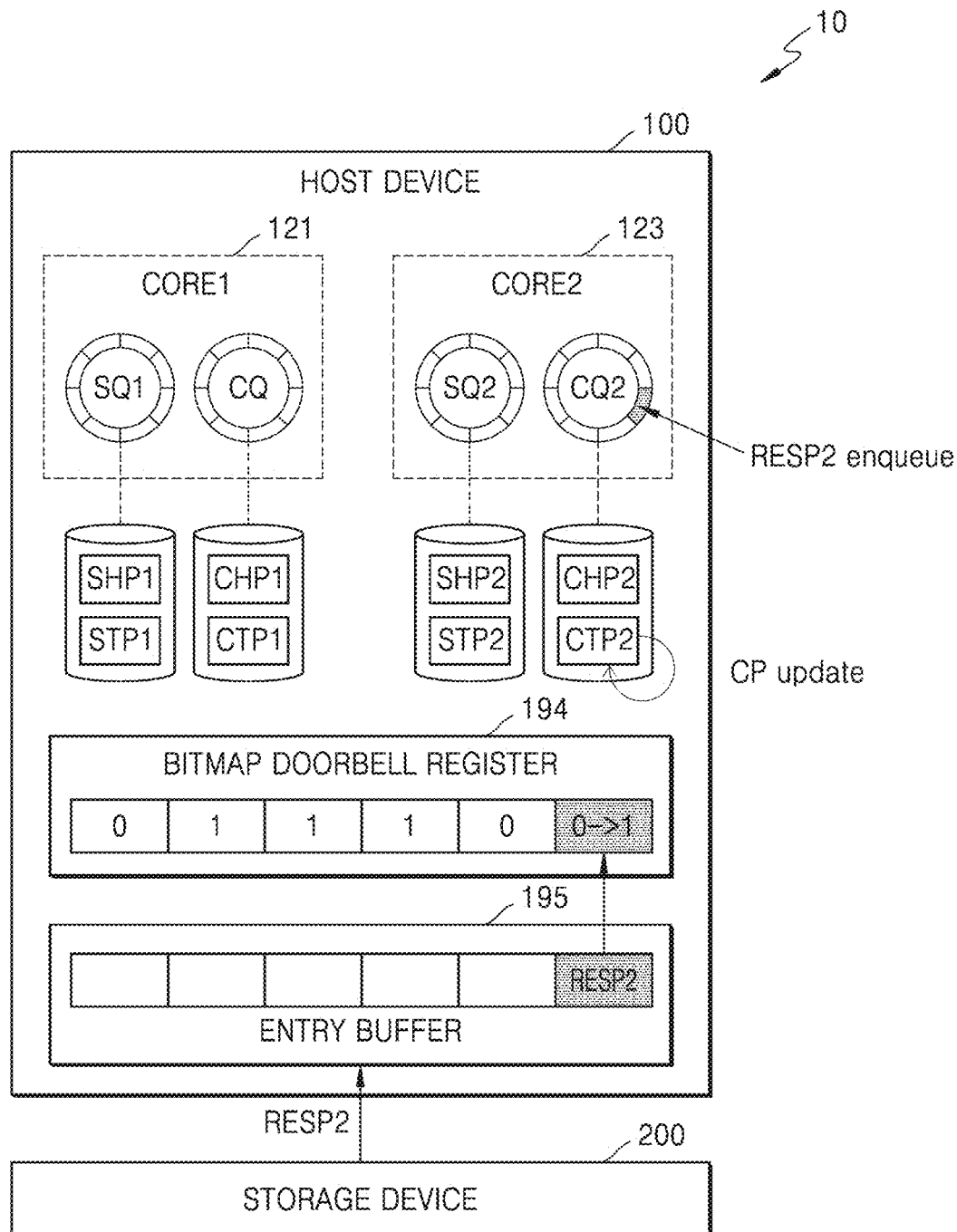
FIG. 8 is a block diagram of a storage system to which a response is written according to at least some example embodiments of the inventive concepts.

FIG. 8 is a block diagram of the storage system 10 to which the response RESP is written according to at least some example embodiments of the inventive concepts. FIG. 8 shows an operation after the first command CM1 according to FIG. 7 is written, and therefore, descriptions that are the same of those of FIG. 7 are omitted. Refer to FIGS. 5 through 7 in conjunction with FIG. 8.

According to at least some example embodiments of the inventive concepts, the storage device 200 may generate a second response RESP2 as a result of performing the first command CMD1, and may transfer the second response RESP2 back to the host device 100.

According to an example embodiment, the entry buffer 195 may store the response RESP. For example, the entry buffer 195 may write the second response RESP2 to a data space for buffering, and a value of bitmap corresponding to a space to which the second response RESP2 is written may be changed from to bit "0" to bit "1".

In addition to transfer of the second response RESP2, an SQ identification SQ_ID, which indicates a command (for example, the first command CMD1) related to which SQ between the first SQ SQ1 and the second SQ Q2 is processed, and the CQ identification CQ_ID, which indicates a command related to which CQ between the first CQ CQ1 and the second CQ CQ2 is processed, may be transferred to the host device 100. The second response RESP2, the SQ identification SQ_ID, and the CQ identification CQ_ID may be transferred in the form of a packet PACKET.

According to an example embodiment, based on the CQ identification CQ_ID provided by the storage device 200, the response RESP may be written to a CQ corresponding to a CQ identification CQ_ID referred to between the first core 121 and the second core 123. For example, the response RESP may be written to the second CQ CQ2, according to the CQ id CQ_ID indicating the second CQ CQ2 loaded in the second core 113.

According to an example embodiment, the CQ router 196 may designate (i.e., route) the response RESP to the CQ. According to an example embodiment, the second response RESP2 may be temporarily stored in the entry buffer 195 until it is determined whether the host device 100 may access the second CQ CQ2.

In an example embodiment, after the second response RESP2 is written, the second CQ tail pointer CTP2 of the second CQ CQ2 may be updated. For example, as a value of a tail of the second CQ tail pointer CTP2 increases by 1 (++TAIL), a write space indicated by the tail of the second CQ2 may be changed. That is, as the tail pointer increases by 1, the second response RESP2 may be enqueued to the second SQ SQ2.

After the second response RESP2 is written to the second CQ CQ2, the bitmap doorbell register 194 may change a state of the space, to which the second response RESP is written, from bit "1" to bit "0".

Figure 9:
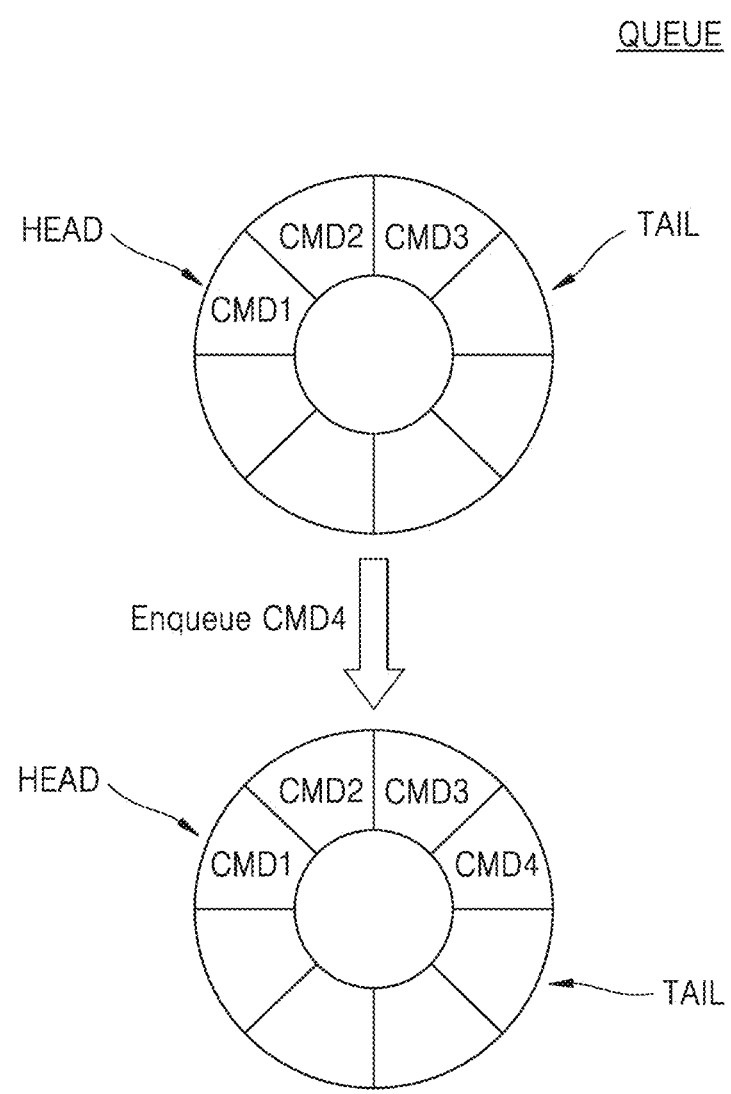
FIG. 9 is a diagram of a process in which a command is written to a circular queue, according to at least some example embodiments of the inventive concepts.

FIG. 9 is a diagram of a process in which the command CMD is written to a circular queue, according to at least some example embodiments of the inventive concepts. The circular queue shown in FIG. 9 may be applied to the SQ and/or the CQ shown in FIGS. 1 to 8. Refer to FIGS. 1 and 2 in conjunction with FIG. 9.

A circular queue has an array in which a first address and a last address are connected, and is a data structure which allows insertion and deletion of data. Initial values of a head and a tail of the circular queue is 0, and when a value of the head is identical to a value of the tail, it is understood that the circular queue is empty. In an initial state in which the values of the head and the tail are respectively 0, new data (for example, a command) may be written. The new data (e.g., the command) may be written to a space indicated by the tail.

Referring to FIG. 9, it is assumed that there are eight writable spaces in the circular queue, and the first command CMD1, the second command CMD2, and the third command CMD3 are written thereto.

A command CMD may be written to a space indicated by a tail, and each time one command is written, a value of a pointer may increase by 1. For example, an initial value of the head may be 0, and after the first command CMD1 through the third command CMD3 are written, the value of the tail may be 3. That is, the tail indicates a space to which the command is to be written, and after the data written, the value of the tail may increase to indicate the next space right after the space to which the data is written. According to an example embodiment, as the first command CMD1, the second command CMD2, and the third command CMD3 are sequentially written, the tail may increase 1 by 1, and as the third command CMD3 is written, the tail may indicate a next space right after the space to which the third command CMD3 is written.

In an example embodiment, the fourth command CMD4 may be enqueued to the circular queue. The head may maintain an initial value 0, and the value of the tail may increase as a new command is written (++TAIL). Accordingly, the tail may indicate a next space right after the fourth command CMD4.

As the commands are sequentially written to the circular queue as described above, the value of the head is maintained the same while the value of the tail increase 1 by 1 (++TAIL). When the value of the tail +1 is equal to the value of the head, it is understood that the circular queue is full. In an example embodiment, as a queue depth that is a data capacitance of the circular queue is limited, the value of the tail may be assigned in a wrap round method of reusing an existing address. For example, when the queue depth of the circular queue is N, as an increased value of the tail is N, the tail may again have 0 as a value corresponding to an address. As described above, the circular queue, in which a next address of the last address is the first address, is advantageous for a limited data space allocation environment, and may be easily embodied.

According to at least some example embodiments of the inventive concepts, the SQ and/or the CQ in FIGS. 1 through 8 may be implemented as the circular queue. When a circular queue structure is used, by simply increasing a tail pointer, which is an address of a write space indicated by the tail, by 1 (++TAIL), a command (or a response) may be easily written to the SQ and/or the CQ. Similarly, by increasing the head pointer by 1 (++HEAD), the command (or the response) written to the SQ and/or the CQ may be easily cleared.

Figure 10:
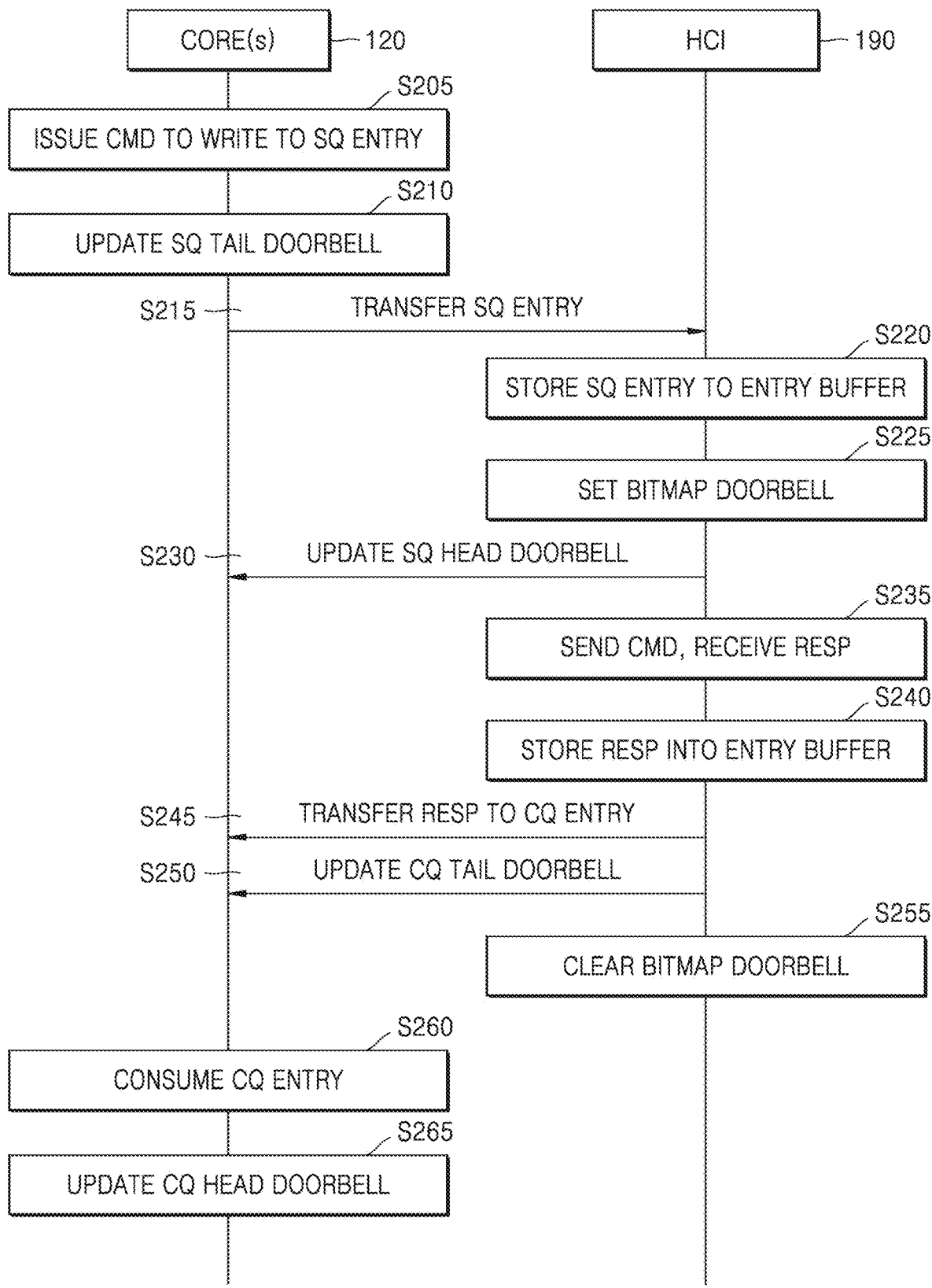
FIG. 10 is a flowchart of an operation method of a storage system according to at least some example embodiments of the inventive concepts.

FIG. 10 is a flowchart of an operation method of the storage system 10 according to at least some example embodiments of the inventive concepts. Refer to FIG. 10 in conjunction with FIGS. 1 and 5.

In operation S205, the core 120 may issue the command CMD. The command CMD may be written to the SQ entry.

In operation S210, the core 120 may write the issued command to the SQ and update the SQ doorbell. For example, the core 120 may perform processing according to writing of the data by updating the SQ tail pointer STP of the SQ doorbell.

In operation S215, the core 120 may transfer the SQ entry to the HCI 190. The SQ itself is substantially stored in the host memory 130 (see FIG. 1) and may be managed by the core 120. Therefore, the core 120 may transfer entry information of the SQ to the HCI 190.

In operation S220, the HCI 190 may store the SQ entry into the entry buffer 195. According to an example embodiment, the HCI 190 may arbitrate the plurality of commands CMDs written to the plurality of SQs, and the SQ arbitrator 192 may arbitrate priorities among the commands CMDs with reference to the SQ head pointer SHP and the SQ tail pointer STP of the SQ entry stored in the SQ doorbell register 191. As an arbitration result, the HCI 190 may store the command CMD, which is included in the SQ, into the entry buffer 195.

In operation S225, the HCI 190 may set the bitmap doorbell. For example, the entry buffer 195 may write the command CMD into a data space for buffering, and a value of bitmap corresponding to a space to which the command CMD of the bitmap doorbell register 194 may be changed from bit "0" to bit "1".

In operation S230, the HCI 190 may update the SQ doorbell. According to an example embodiment, as the command CMD is written to the entry buffer 195, the HCI 190 may update the SQ head pointer SHP in the SQ doorbell register 191.

According to an example embodiment, when the command CMD that is to be processed is written to the entry buffer 195, the HCI 190 may increase the efficiency of a space of the SQ by updating the SQ head pointer SHP.

In operation S235, the HCI 190 may transfer the command CMD and receive the response RESP. According to an example embodiment, the HCI 190 may transfer the command CMD to the storage device 200. The storage device 200 may perform a specific memory operation based on the command CMD, and may provide the response RESP, which is meta data of a result of the performance, back to the host controller interface 190.

In operation S240, the HCI 190 may store the received response RESP into the entry buffer 195. According to an example embodiment, the entry buffer 195 may buffer the response RESP before a path for the response RESP is set.

In operation S245, the HCI 190 may transfer the response RESP to the CQ entry. According to at least some example embodiments of the inventive concepts, the CQ router 196 may designate (route) the response RESP to be stored in any one QC among the plurality of CQs. For example, by referring to the bitmap doorbell register 194, the CQ router 196 may select any one response RESP among the plurality of response RESP according to a certain reference (for example, a priority) and store a pointer of the response RESP into the CQ doorbell register 197. After that, the response RESP may be written to the CQ. The CQ itself is substantially stored in the host memory 130, and the HCI 190 may transfer entry information of the CQ to the core 120.

In operation S250, the HCI 190 may update the QC doorbell. According to an example embodiment, the HCI 190 may update the CQ tail pointer CTP of the CQ doorbell register 197 as the response RESP is written to the CQ.

In operation S255, the HCI 190 may clear the bitmap doorbell. According to an example embodiment, the HCI 190 may store the response RESP according to the command CMD into the CQ doorbell register 197 to be designated to a specific completion queue, and then may secure an idle space of the bitmap doorbell by removing bitmaps related to SQs related to the command CMD and bitmaps related to CQs related to the response RESP.

For example, referring to processes in FIGS. 7 and 8, the first command CMD1, the SQ identification SQ_ID, and the CQ identification CQ_ID written to the first SQ SQ1 are stored in the entry buffer 195, and may change a memory region state of the bitmap doorbell register 194 (bit "0"→bit "1"). The first command CMD1 may be provided to the storage device 200, and the second response RESP2 according to the first command CMD1 may be stored back into the entry buffer 195 together with the SQ identification SQ_ID and the CQ identification CQ_ID. The second response RESP2 may be designated as the second CQ CQ2 and stored in the CQ doorbell register 197. Data generated or stored in a first command CMD1 and second response RESP2 process (the first command CMD1, the second response RESP2, and the SQ identification SQ_ID and the CQ identification CQ_ID stored in the entry buffer 195) may be cleared as the second response RESP2 is processed. As a result, the bitmap doorbell register 194 and the entry buffer 195 may be initialized.

In operation S260, the CQ entry may be consumed. According to an example embodiment, the CQ may access a location into which the response RESP is stored by referring to a pointer of the CQ doorbell register 197. For example, the second core 123 (see FIG. 8) may write the second response RESP2 to the second completion queue CQ2 by referring to the second CQ tail pointer CTP2, and the second response RESP2 may be processed by the second core 123.

In operation S265, the CQ doorbell may be updated. According to an example embodiment, after the second response RESP2 is processed by the second core 123, an idle space is generated again in the second CQ CQ2. The CQ doorbell register 197 may increase an input/output efficiency of the second CQ CQ2 by updating the CQ head pointer CHP2.

Figure 11:
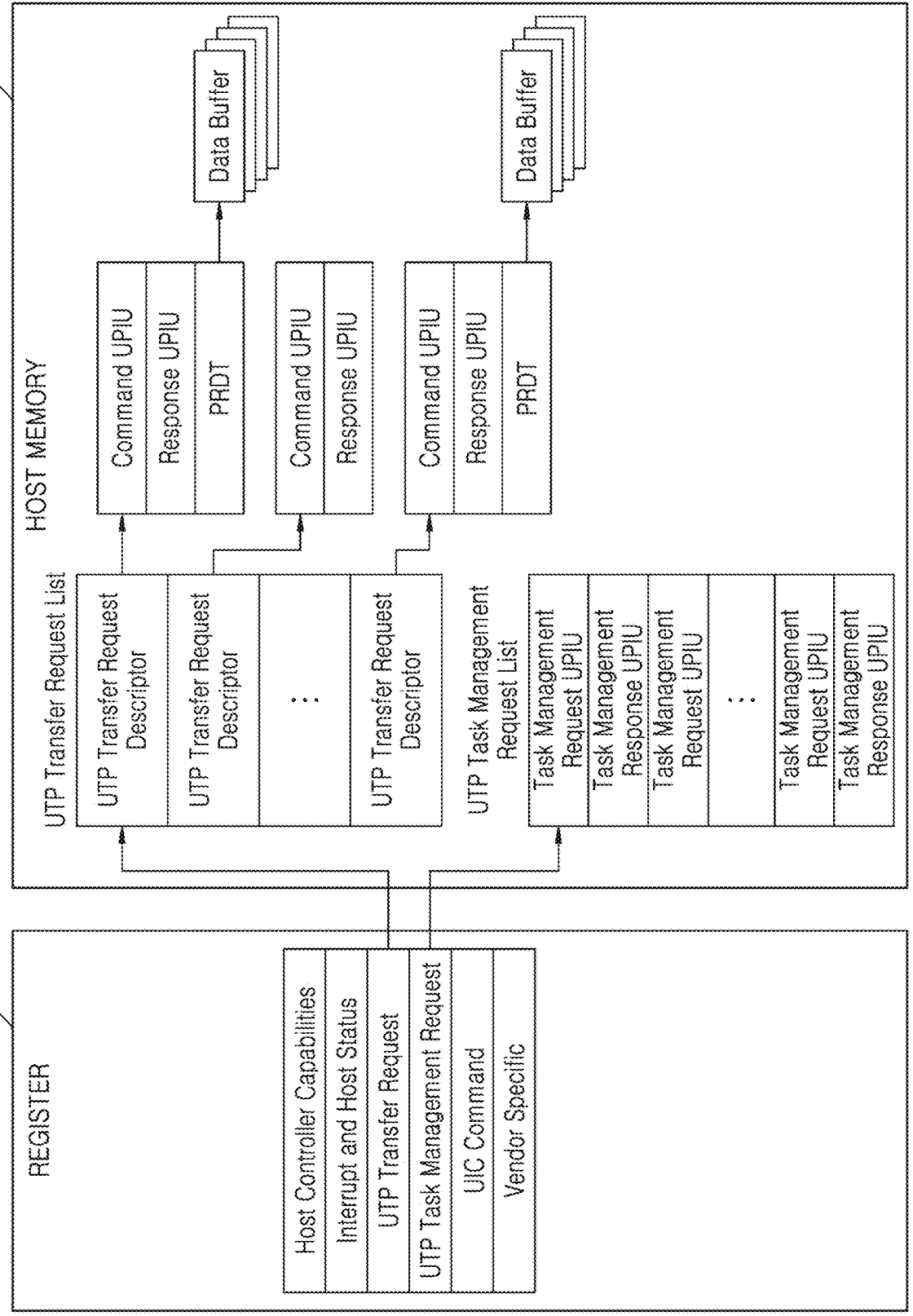
FIGS. 11 and 12 are block diagrams of examples of various kinds of information stored in a host memory and a register in a host controller.
Figure 12:
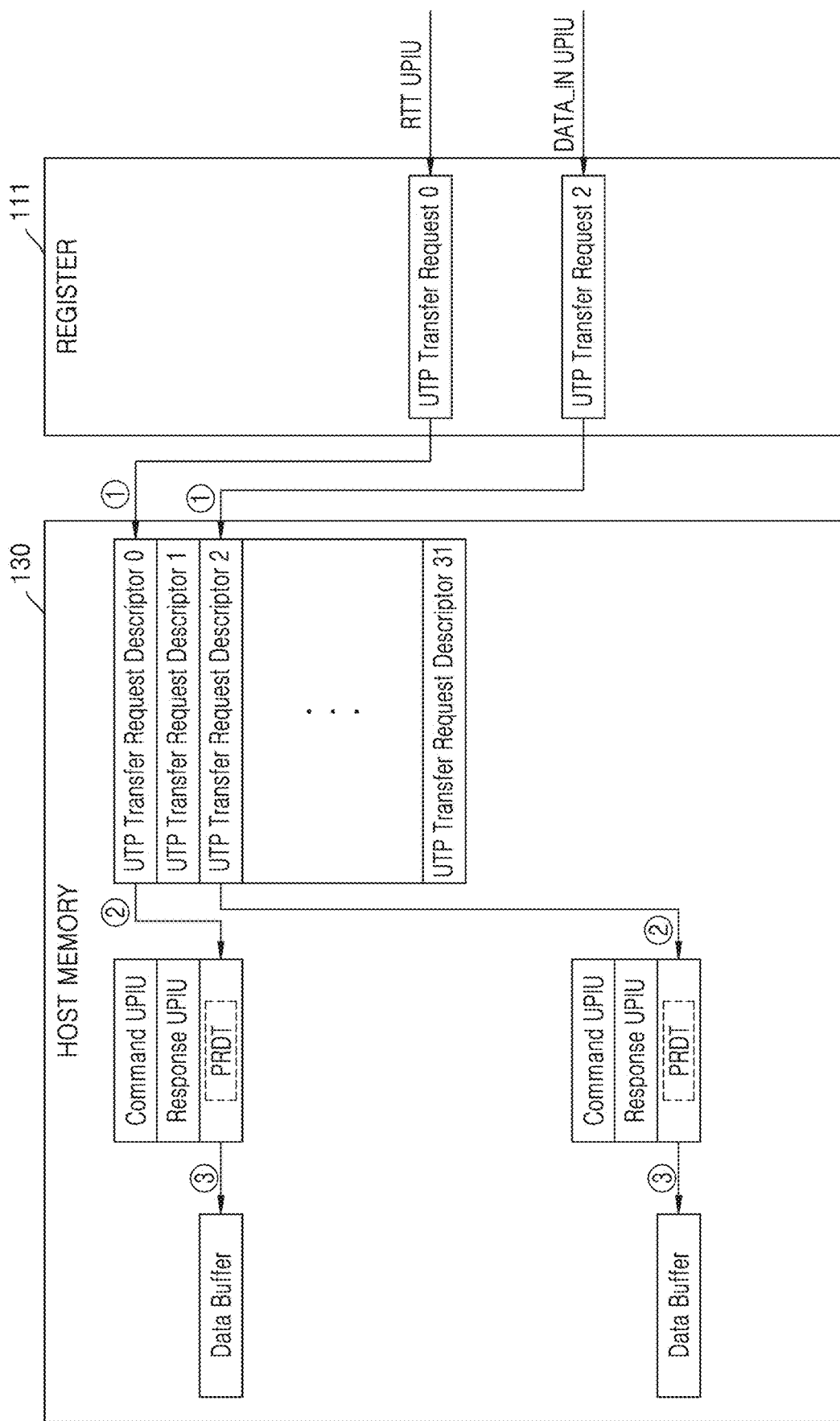

FIGS. 11 and 12 are each a diagram of an example of various information stored in the host memory 130 (see FIG. 1) and the register 111 in the host controller 110 (see FIG. 1). Refer to FIGS. 1 and 2 in conjunction with FIGS. 11 and 12.

Referring to FIG. 11, the host device 100 includes the host memory 130 and the register 111, which is a component provided in the host controller 110, and the host memory 130 may be at the outside of the host controller 110. For data management of the storage system 10, various kinds of commands and parameters defined according to the JEDEC UFS standard may be stored in the host memory 130 and the register 111.

The UTF transfer request descriptor is stored in a descriptor region of the host memory 130, and UPIU information and PRDT information corresponding thereto may be stored in another region of the host memory 130. In addition, the UTF transfer request descriptors may be stored in the host memory 130 or confirmed in the host memory 130 by the UTF transfer request stored in the register 111.

Furthermore, the write data and the read data are stored in the plurality of data buffers included in the buffer region of the host memory 130, and the PRDT information may include the buffer address as a physical address of the data buffer. In addition, the PRDT information may be not stored for some of command UPIUs, for example, the PRDT information may be not stored for the command UPIU that is not related to the access of the data buffer.

In addition, FIG. 11 further shows various kinds of information defined by the JEDEC UFS standards. For example, a UTF task management request list may be further stored in a region of the host memory 130, and for example, the task management UPIU and a task management response UPIU may be stored in a region of the host memory 130. In addition, the task management request list may be stored in the host memory 130 through the UPT task management request stored in the register 111. Furthermore, other components defined by the JEDEC UFS standards are further shown in the register 111, for example, Host Controller Capabilities, Interrupt and host status, UFS interconnect (UIC) command (UIC command), and Vendor Specifics may be stored in the register 111.

In an operation system, to store the data, which is stored in the data buffer of the host memory 130, into the storage device 200 see FIG. 1), the HCI 190 (see FIG. 2) may be initiated by creating the UTP Transfer Request Descriptor and creating a UTP transfer request.

The HCI 190 may access a space of the host memory 130 corresponding to the UTP transfer request, and may read the UTP Transfer Request Descriptor and send the corresponding command UPIU to the storage device 200.

The storage device 200 that received the command UPIU may send a Ready To Transfer UPIU with a size and offset information to receive to the HCI 190, and HCI 190 may access a corresponding location of the UTP Transfer Request Descriptor with reference to a logical unit number (LUN) and tag (identifier) in header (transfer information) of the RTT UPIU and finally find an address of the data buffer and initiate data transfer.

FIG. 12 is a block diagram showing a result of comparing access frequencies to the host memory 130 according to at least some example embodiments of the inventive concepts. FIG. 12 shows an example in which the host performs an operation according to a packet received from the storage device.

FIG. 12 shows an example of processing a packet according to general formats. Referring to FIG. 12, one or more UTP transfer requests are stored in the register 111 in the host controller 110 (see FIG. 2), for example, a first transfer request UTP Transfer Request 0 may correspond to a data write request and a third Transfer Request UTP Transfer Request 2 may correspond to a data read request. The host controller 110 may receive the RTT UPIU from the storage device 200 (see FIG. 1) in response to the first transfer request Transfer Request 0. In addition, the host controller 110 may receive DATA_IN UPIU from the storage device 200 in response to the third transfer request Transfer Request 2.

The packet PACKET transferred from the storage device 200 may include a header region into which header information is stored, and header information of the RTT UPIU may include a size and offset information of the data to receive for the data write operation. The host controller 110 may perform a process operation by using at least some data values in the header information of the RTT UPIU. For example, the host controller 110 accesses the host memory 130 to identify a corresponding UTP Transfer Request Descriptor by referring to the LUN and tag information in the head information of the RTT UPIU In addition, the host controller 110 identifies PRDT information by accessing the host memory 130 at a location determined through the UTP Transfer Request Descriptor. Furthermore, the host controller 110 may access the data buffer through the identified PRDT information (for example, a buffer address) and transfer the data, which is stored in the data buffer, to the storage device 200.

When the DATA_IN UPIU is received, the host controller 110 may access the host memory 130 to identify a corresponding UTP Transfer Request Descriptor from the head information of the DATA_IN UPIU, and may access the host memory 130 to identify PRDT information corresponding thereto. In addition, the read data included in the DATA_IN UPIU may be stored in a data buffer corresponding to the identified PRDT information.

Figure 13:
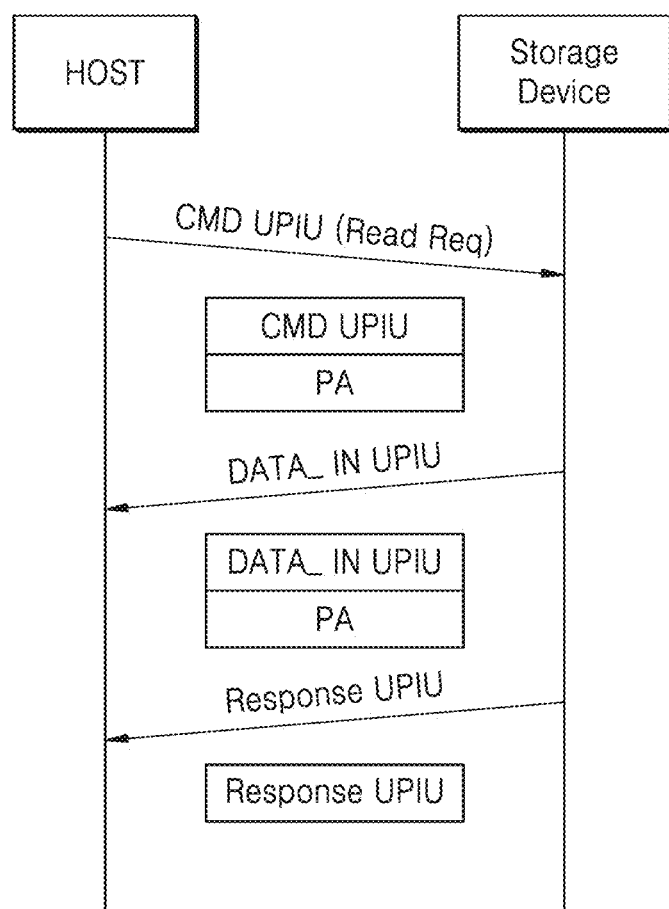
FIG. 13 is a diagram of a data read operation and an embodiment of a packet according to a UFS interface.

FIG. 13 is a diagram of a data read operation according to a UFS interface and an implementation example of a packet.

Referring to FIG. 13, a command UPIU CMD UPIU for a data read request may be transferred from the host device 100 to the storage device 200, and the buffer address (or a physical address (PA) of the data buffer) may be included in the command UPIU CMD UPIU for the data read request. The storage device 200 may read the data from the memory core in response to the command UPIU for the data read request, and may transfer the DATA_IN UPIU including the read data, together with the physical address (PA) parsed from the command UPIU, to the host. In addition, the storage device 200 may transfer, to the host device 100, a response UPIU that indicates an operation corresponding to the command UPIU is finished. According to the above-described embodiments, the host device 100 may store the read data into a data buffer of a location indicated by the physical address PA parsed from the DATA_IN UPIU. Packet structures of the above-stated command UPIU and DATA_IN UPIU may be embodied as shown in FIGS. 14A and 14B below.

FIGS. 14A and 14B are a diagram of a structure of a packet according to at least some example embodiments of the inventive concepts.

FIGS. 14A and 14B show an example in which the buffer address is included in an existing header region; FIG. 14 shows a structure of the command UPIU, and FIG. 14B shows a structure of the DATA_IN UPIU.

Referring to FIG. 14A, the header region of the command UPIU includes a reserved region, and the buffer address according to at least some example embodiments of the inventive concepts and information thereof may be included in some of the reversed region. For example, in addition to a host memory buffer address included in the reversed region, information CWA indicating the buffer address is included in the CMD UPIU and information indicating a size of a region into which the buffer address is stored (or a size of a region into which the buffer address and information thereof) may be further included in the reversed region.

A configuration of the command packet PACKET_C which is transferred from the host device 100 adopting the UFS protocol to the storage device 200 may include the SQ identification SQ_ID, the CQ identification CQ_ID, and a response credit CR RESP.

The SQ identification SQ_ID, which indicates a command related to which SQ of the plurality of SQs is transferred, and the CQ identification CQ_ID, which indicates a command related to which CQ of the plurality of CQs is transferred, are transferred from the host device 100 to the storage device 200.

In an example embodiment, initialization of the host device 100 may be performed by using a reserved command.

Referring to FIG. 14, DATA_IN UPIU may include a payload region, which includes a header region and a data region, and the header region may include a reserved region. In addition, the buffer address of the host memory 130 and information thereof may be included in at least some of the reversed region.

A configuration of the response packet PACKET_R that is transferred from the storage device 200 adopting the UFS protocol to the host device 100 may include the SQ identification SQ_ID, the CQ identification CQ_ID, and a command credit CR_CMD.

Information included in the reserved region shown in FIG. 14B is identical to or similar to illustration in FIG. 14A, therefore, detailed description thereof will be omitted.

Figure 15:
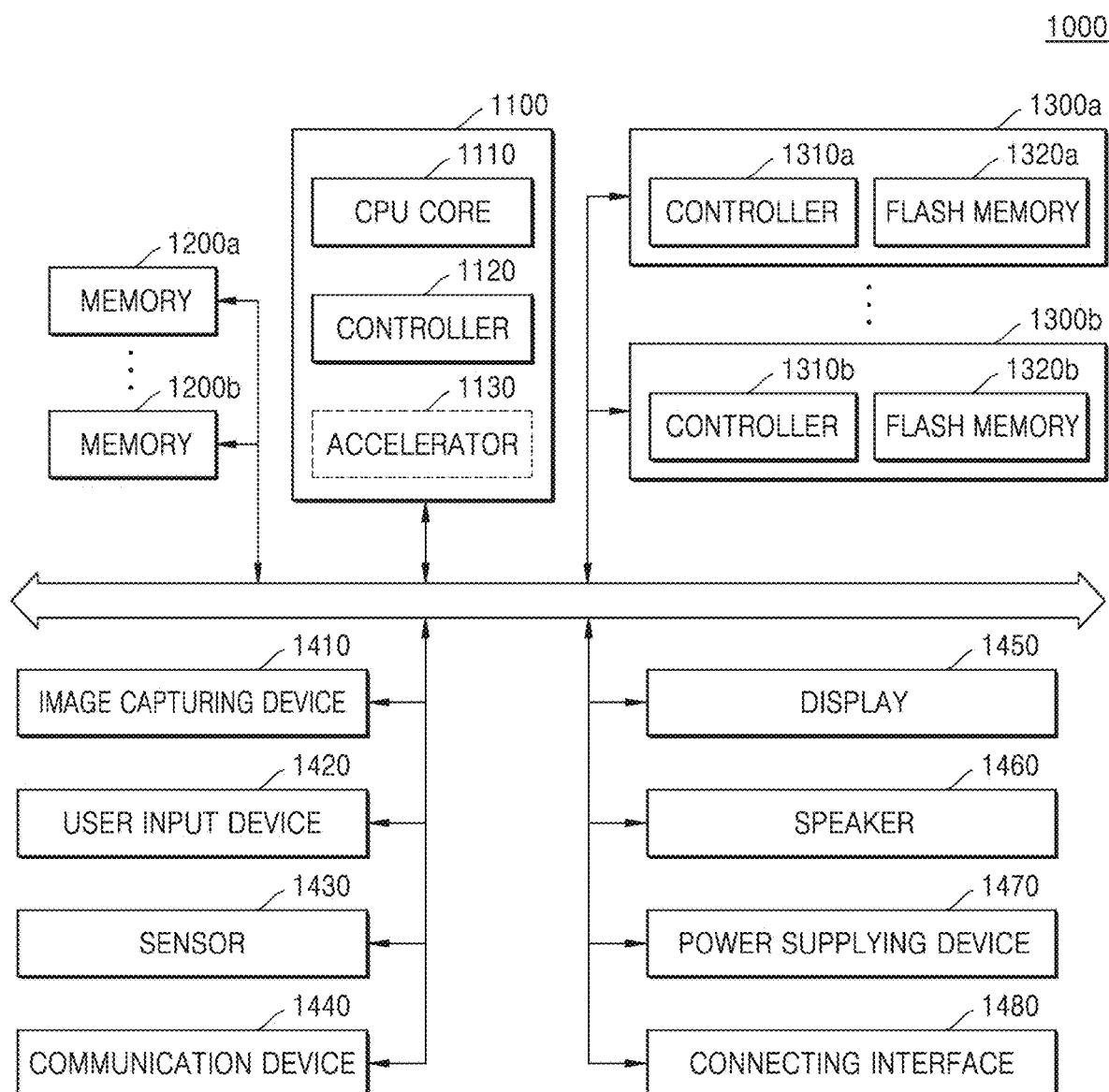
FIG. 15 is a diagram of a system to which a storage device is applied, according to at least some example embodiments of the inventive concepts.

FIG. 15 is a diagram of a system 1000 to which a storage device is applied, according to at least one example embodiment of the inventive concepts. The system 1000 of FIG. 15 may basically be a mobile system, such as a portable communication terminal (e.g., a mobile phone), a smartphone, a tablet personal computer (PC), a wearable device, a healthcare device, or an Internet of things (JOT) device. However, the system 1000 of FIG. 15 is not necessarily limited to the mobile system and may be a PC, a laptop computer, a server, a media player, or an automotive device (e.g., a navigation device).

Referring to FIG. 15, the system 1000 may include a main processor 1100, memories (e.g., 1200a and 1200b), and storage devices (e.g., 1300a and 1300b). In addition, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the system 1000, more specifically, operations of other components included in the system 1000. The main processor 1100 may be embodied as a general-purpose processor, a dedicated processor, or an application processor.

The main processor 1100 may include at least one CPU core 1110 and further include a controller 1120 configured to control the memories 1200a and 1200b and/or the storage devices 1300a and 1300b. In some embodiments, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be embodied as a chip that is physically separate from the other components of the main processor 1100.

The memories 1200a and 1200b may be used as main memory devices of the system 1000. Although each of the memories 1200a and 1200b may include a volatile memory, such as static random access memory (SRAM) and/or dynamic RAM (DRAM), each of the memories 1200a and 1200b may include non-volatile memory, such as a flash memory, phase-change RAM (PRAM) and/or resistive RAM (RRAM). The memories 1200a and 1200b may be embodied in the same package as the main processor 1100.

The storage devices 1300a and 1300b may serve as non-volatile storage devices configured to store data regardless of whether power is supplied thereto, and have larger storage capacity than the memories 1200a and 1200b. The storage devices 1300a and 1300b may respectively include storage controllers (STRG CTRL) 1310a and 1310b and NVM (Non-Volatile Memory)s 1320a and 1320b configured to store data via the control of the storage controllers 1310a and 1310b. Although the NVMs 1320a and 1320b may include flash memories having a two-dimensional (2D) structure or a three-dimensional (3D) V-NAND structure, the NVMs 1320a and 1320b may include other types of NVMs, such as PRAM and/or RRAM.

The storage devices 1300a and 1300b may be physically separated from the main processor 1100 and included in the system 1000 or embodied in the same package as the main processor 1100. In addition, the storage devices 1300a and 1300b may have types of solid-state devices (SSDs) or memory cards and be removably combined with other components of the system 100 through an interface, such as the connecting interface 1480 that will be described below. The storage devices 1300a and 1300b may be devices to which a standard protocol, such as a universal flash storage (UFS), an embedded multi-media card (eMMC), or a non-volatile memory express (NVMe), is applied, without being limited thereto.

The image capturing device 1410 may capture still images or moving images. The image capturing device 1410 may include a camera, a camcorder, and/or a webcam.

The user input device 1420 may receive various types of data input by a user of the system 1000 and include a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include a temperature sensor, a pressure sensor, an illuminance sensor, a location sensor, an acceleration sensor, a biosensor, and/or a gyroscope sensor.

The communication device 1440 may transfer and receive signals between other devices outside the system 1000 according to various communication protocols. The communication device 1440 may include an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery (not shown) embedded in the system 1000 and/or an external power source, and supply the converted power to each of components of the system 1000.

The connecting interface 1480 may provide connection between the system 1000 and an external device, which is connected to the system 1000 and capable of transferring and receiving data to and from the system 1000. The connecting interface 1480 may be embodied by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

Figure 16:
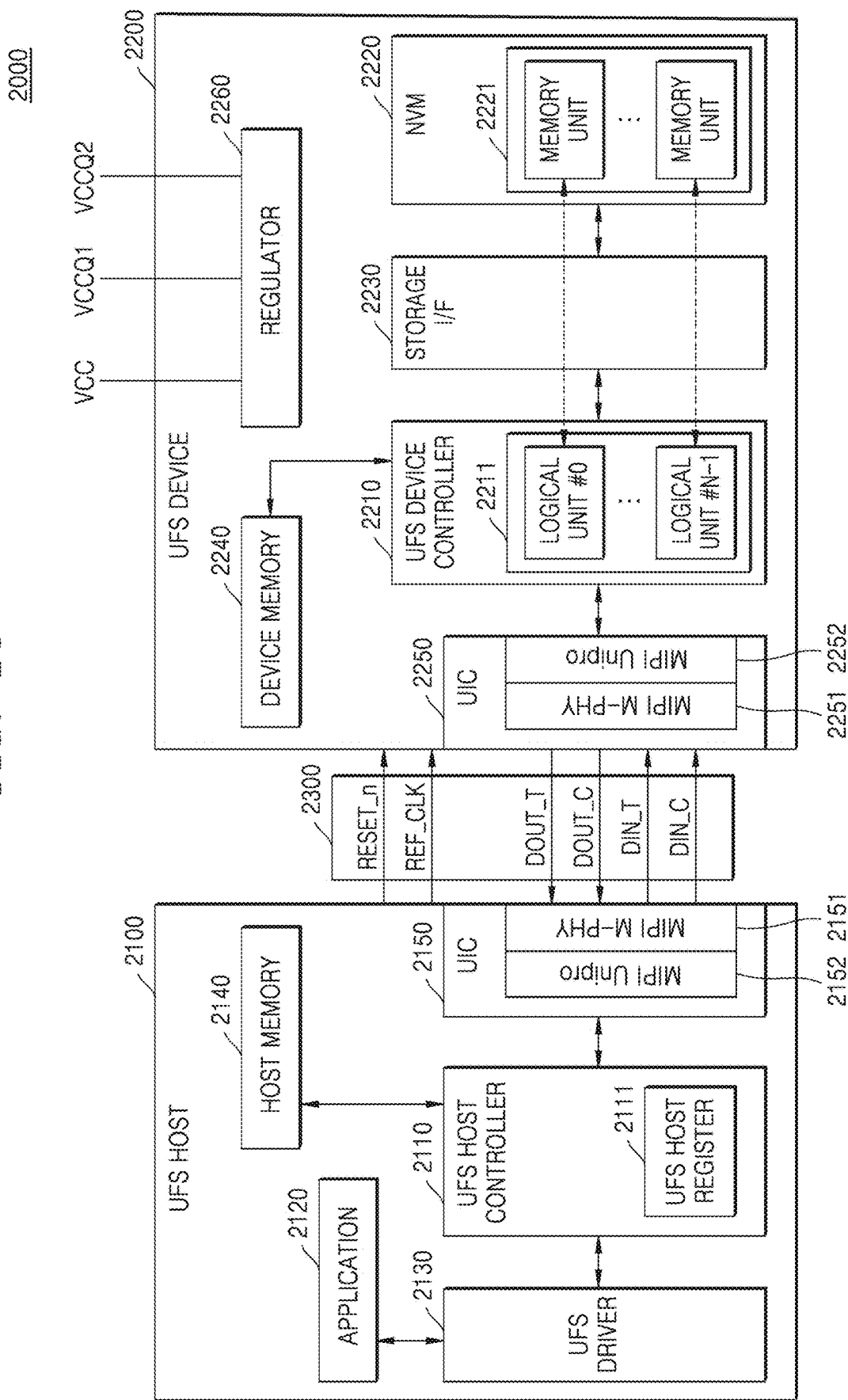
FIG. 16 is a diagram for describing a UFS system according to at least some example embodiments of the inventive concepts.

FIG. 16 is a diagram of a UFS system 2000 according to an embodiment. The UFS system 2000 may be a system conforming to a UFS standard announced by Joint Electron Device Engineering Council (JEDEC) and include a UFS host 2100, a UFS device 2200, and a UFS interface 2300. The above description of the system 1000 of FIG. 1 may also be applied to the UFS system 2000 of FIG. 16 within a range that does not conflict with the following description of FIG. 16.

Referring to FIG. 16, the UFS host 2100 may be connected to the UFS device 2200 through the UFS interface 2300. When the main processor 1100 of FIG. 1 is an AP, the UFS host 2100 may be embodied as a portion of the AP. The UFS host controller 2110 and the host memory 2140 may respectively correspond to the controller 1120 of the main processor 1100 and the memories 1200a and 1200b of FIG. 1. The UFS device 2200 may correspond to the storage device 1300a and 1300b of FIG. 1, and a UFS device controller 2210 and an NVM 2220 may respectively correspond to the storage controllers 1310a and 1310b and the NVMs 1320a and 1320b of FIG. 1.

The UFS host 2100 may include a UFS host controller 2110, an application 2120, a UFS driver 2130, a host memory 2140, and a UFS interconnect (UIC) layer 2150. The UFS device 2200 may include the UFS device controller 2210, the NVM 2220, a storage interface 2230, a device memory 2240, a UIC layer 2250, and a regulator 2260. The NVM 2220 may include a plurality of memory units 2221. Although each of the memory units 2221 may include a V-NAND flash memory having a 2D structure or a 3D structure, each of the memory units 2221 may include another kind of NVM, such as PRAM and/or RRAM. The UFS device controller 2210 may be connected to the NVM 2220 through the storage interface 2230. The storage interface 2230 may be configured to comply with a standard protocol, such as Toggle or ONFI.

The application 2120 may refer to a program that wants to communicate with the UFS device 2200 to use functions of the UFS device 2200. The application 2120 may transfer input-output requests (IORs) to the UFS driver 2130 for input/output (I/O) operations on the UFS device 2200. The IORs may refer to a data read request, a data storage (or write) request, and/or a data erase (or discard) request, without being limited thereto.

The UFS driver 2130 may manage the UFS host controller 2110 through a UFS-host controller interface (UFS-HCI). The UFS driver 2130 may convert the IOR generated by the application 2120 into a UFS command defined by the UFS standard and transfer the UFS command to the UFS host controller 2110. One IOR may be converted into a plurality of UFS commands. Although the UFS command may basically be defined by an SCSI standard, the UFS command may be a command dedicated to the UFS standard.

The UFS host controller 2110 may transfer the UFS command converted by the UFS driver 2130 to the UIC layer 2250 of the UFS device 2200 through the UIC layer 2150 and the UFS interface 2300. During the transmission of the UFS command, a UFS host register 2111 of the UFS host controller 2110 may serve as a command queue (CQ).

The UIC layer 2150 on the side of the UFS host 2100 may include a mobile industry processor interface (MIPI) M-PHY 2151 and an MIPI UniPro 2152, and the UIC layer 2250 on the side of the UFS device 2200 may also include an MIPI M-PHY 2251 and an MIPI UniPro 2252.

The UFS interface 2300 may include a line configured to transfer a reference clock signal REF_CLK, a line configured to transfer a hardware reset signal RESET_n for the UFS device 2200, a pair of lines configured to transfer a pair of differential input signals DIN_t and DIN_c, and a pair of lines configured to transfer a pair of differential output signals DOUT_t and DOUT_c.

A frequency of a reference clock signal REF_CLK provided from the UFS host 2100 to the UFS device 2200 may be one of 19.2 MHz, 26 MHz, 38.4 MHz, and 52 MHz, without being limited thereto. The UFS host 2100 may change the frequency of the reference clock signal REF_CLK during an operation, that is, during data transmission/receiving operations between the UFS host 2100 and the UFS device 2200. The UFS device 2200 may generate cock signals having various frequencies from the reference clock signal REF_CLK provided from the UFS host 2100, by using a phase-locked loop (PLL). Also, the UFS host 2100 may set a data rate between the UFS host 2100 and the UFS device 2200 by using the frequency of the reference clock signal REF_CLK. That is, the data rate may be determined depending on the frequency of the reference clock signal REF_CLK.

The UFS interface 2300 may support a plurality of lanes, each of which may be embodied as a pair of differential lines. For example, the UFS interface 2300 may include at least one receiving lane and at least one transmission lane. In FIG. 16, a pair of lines configured to transfer a pair of differential input signals DIN_T and DIN_C may constitute a receiving lane, and a pair of lines configured to transfer a pair of differential output signals DOUT_T and DOUT_C may constitute a transmission lane. Although one transmission lane and one receiving lane are illustrated in FIG. 16, the number of transmission lanes and the number of receiving lanes may be changed.

The receiving lane and the transmission lane may transfer data based on a serial communication scheme. Full-duplex communications between the UFS host 2100 and the UFS device 2200 may be enabled due to a structure in which the receiving lane is separated from the transmission lane. That is, while receiving data from the UFS host 2100 through the receiving lane, the UFS device 2200 may transfer data to the UFS host 2100 through the transmission lane. In addition, control data (e.g., a command) from the UFS host 2100 to the UFS device 2200 and user data to be stored in or read from the NVM 2220 of the UFS device 2200 by the UFS host 2100 may be transferred through the same lane. Accordingly, between the UFS host 2100 and the UFS device 2200, there may be no need to further provide a separate lane for data transmission in addition to a pair of receiving lanes and a pair of transmission lanes.

The UFS device controller 2210 of the UFS device 2200 may control all operations of the UFS device 2200. The UFS device controller 2210 may manage the NVM 2220 by using a logical unit (LU) 2211, which is a logical data storage unit. The number of LUs 2211 may be 8, without being limited thereto. The UFS device controller 2210 may include an FTL and convert a logical data address (e.g., a logical block address (LBA)) received from the UFS host 2100 into a physical data address (e.g., a physical block address (PBA)) by using address mapping information of the FTL. A logical block configured to store user data in the UFS system 2000 may have a size in a desired, or alternatively, predetermined range. For example, according to at least some example embodiments of the inventive concepts, a minimum size of the logical block may be set to 4 Kbyte. However, at least some example embodiments are not limited to this example. For example, a minimum size of the logical block may be set to a value other the 4 Kbyte, for example, in accordance with the preferences of a user or designer of the UFS system 2000 or an element thereof.

When a command from the UFS host 2100 is applied through the UIC layer 2250 to the UFS device 2200, the UFS device controller 2210 may perform an operation in response to the command and transfer a completion response to the UFS host 2100 when the operation is completed.

As an example, when the UFS host 2100 intends to store user data in the UFS device 2200, the UFS host 2100 may transfer a data storage command to the UFS device 2200. When a response (a 'ready-to-transfer' response) indicating that the UFS host 2100 is ready to receive user data (ready-to-transfer) is received from the UFS device 2200, the UFS host 2100 may transfer user data to the UFS device 2200. The UFS device controller 2210 may temporarily store the received user data in the device memory 2240 and store the user data, which is temporarily stored in the device memory 2240, at a selected location of the NVM 2220 based on the address mapping information of the FTL.

As another example, when the UFS host 2100 intends to read the user data stored in the UFS device 2200, the UFS host 2100 may transfer a data read command to the UFS device 2200. The UFS device controller 2210, which has received the command, may read the user data from the NVM 2220 based on the data read command and temporarily store the read user data in the device memory 2240. During the read operation, the UFS device controller 2210 may detect and correct an error in the read user data by using an ECC engine (not shown) embedded therein. More specifically, the ECC engine may generate parity bits for write data to be written to the NVM 2220, and the generated parity bits may be stored in the NVM 2220 along with the write data. During the reading of data from the NVM 2220, the ECC engine may correct an error in read data by using the parity bits read from the NVM 2220 along with the read data, and output error-corrected read data.

In addition, the UFS device controller 2210 may transfer user data, which is temporarily stored in the device memory 2240, to the UFS host 2100. In addition, the UFS device controller 2210 may further include an AES engine (not shown). The AES engine may perform at least of an encryption operation and a decryption operation on data transferred to the UFS device controller 2210 by using a symmetric-key algorithm.

The UFS host 2100 may sequentially store commands, which are to be transferred to the UFS device 2200, in the UFS host register 2111, which may serve as a common queue, and sequentially transfer the commands to the UFS device 2200. In this case, even while a previously transferred command is still being processed by the UFS device 2200, that is, even before receiving a notification that the previously transferred command has been processed by the UFS device 2200, the UFS host 2100 may transfer a next command, which is on standby in the CQ, to the UFS device 2200. Thus, the UFS device 2200 may also receive a next command from the UFS host 2100 during the processing of the previously transferred command. According to at least some example embodiments of the inventive concepts, a maximum number (or queue depth) of commands that may be stored in the CQ may be, for example, 32. However, at least some example embodiments are not limited to this example. For example, a maximum number (or queue depth) of commands that may be stored in the CQ may be a number other than 32, for example, in accordance with the preferences of a user or designer of the UFS system 2000 or an element thereof. Also, the CQ may be embodied as a circular queue in which a start and an end of a command line stored in a queue are indicated by a head pointer and a tail pointer.

Each of the plurality of memory units 2221 may include a memory cell array (not shown) and a control circuit (not shown) configured to control an operation of the memory cell array. The memory cell array may include a 2D memory cell array or a 3D memory cell array. The memory cell array may include a plurality of memory cells. Although each of the memory cells is a single-level cell (SLC) configured to store 1-bit information, each of the memory cells may be a cell configured to store information of 2 bits or more, such as a multi-level cell (MLC), a triple-level cell (TLC), and a quadruple-level cell (QLC). The 3D memory cell array may include a vertical NAND string in which at least one memory cell is vertically oriented and located on another memory cell.

Voltages VCC, VCCQ, and VCCQ2 may be applied as power supply voltages to the UFS device 2200. The voltage VCC may be a main power supply voltage for the UFS device 2200 and be in a range of 2.4 V to 3.6 V. The voltage VCCQ may be a power supply voltage for supplying a low voltage mainly to the UFS device controller 2210 and be in a range of 1.14 V to 1.26 V. The voltage VCCQ2 may be a power supply voltage for supplying a voltage, which is lower than the voltage VCC and higher than the voltage VCCQ, mainly to an I/O interface, such as the MIPI M-PHY 2251, and be in a range of 1.7 V to 1.95 V. The power supply voltages may be supplied through the regulator 2260 to respective components of the UFS device 2200. The regulator 2260 may be embodied as a set of unit regulators respectively connected to different ones of the power supply voltages described above.

Figure 17A:
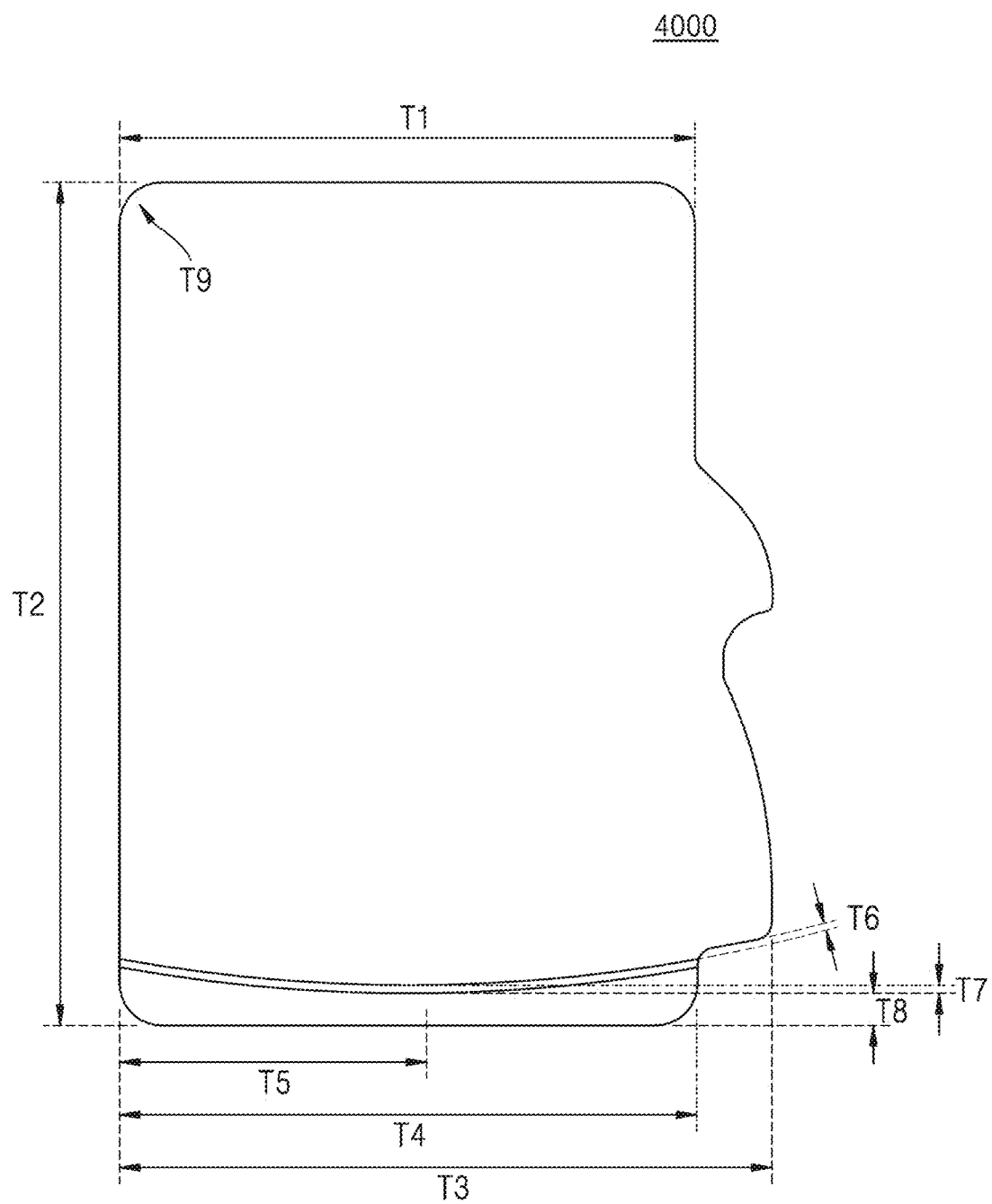
FIGS. 17A through 17C are diagrams of form factors of a UFS card according to example embodiments of the inventive concept.
Figure 17B:
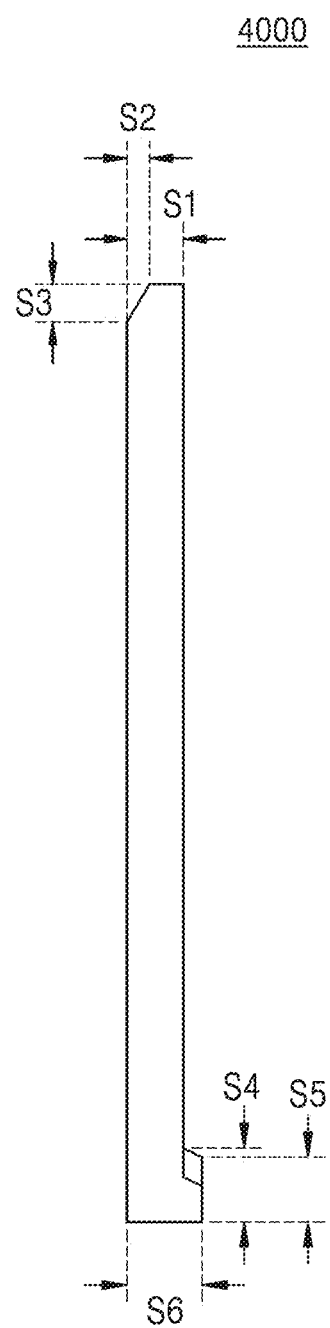
Figure 17C:
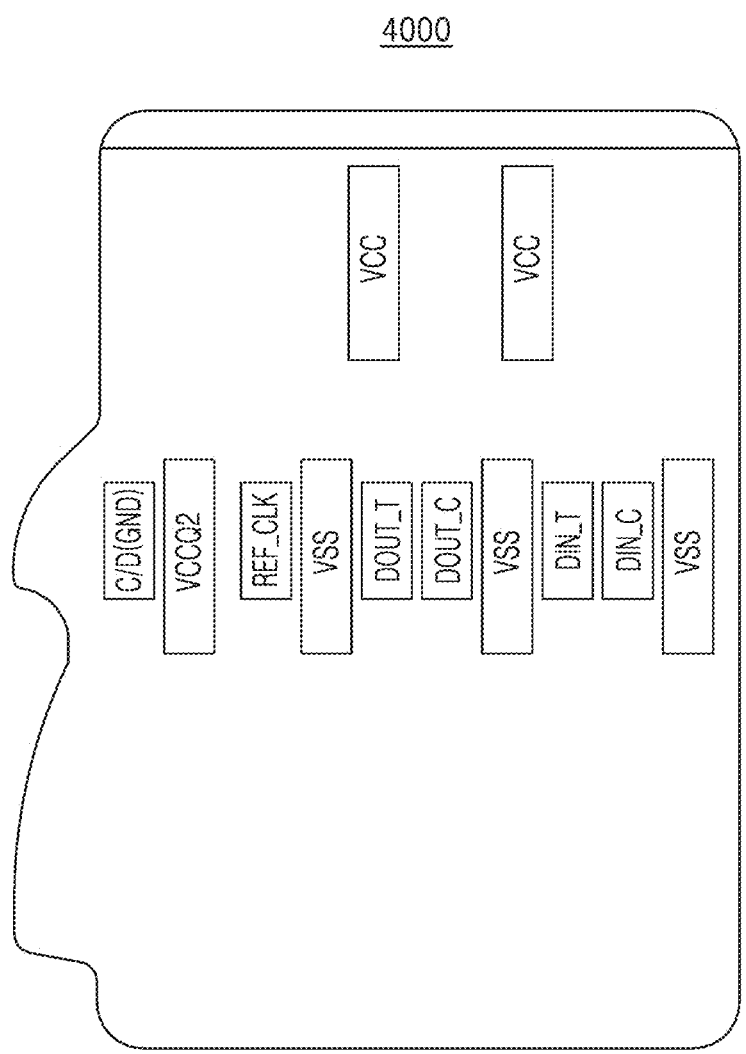

FIGS. 17A to 17C are diagrams of a form factor of a UFS car. When the UFS device 2200 described with reference to FIG. 16 is embodied as the UFS card 4000, an outer appearance of the UFS card 4000 may be as shown in FIGS. 17A to 17C.

FIG. 17A is a top view of the UFS card 4000, according to an example embodiment. Referring to FIG. 17A, it can be seen that the UFS card 4000 entirely follows a shark-shaped design. In FIG. 17A, the UFS card 4000 may have dimensions shown in Table 1 below as an example.

TABLE 1

| Item | Dimension (mm) |
|------|----------------|
| T1   | 9.70           |
| T2   | 15.00          |
| T3   | 11.00          |
| T4   | 9.70           |
| T5   | 5.15           |
| T6   | 0.25           |
| T7   | 0.60           |
| T8   | 0.75           |
| T9   | R0.80          |

FIG. 17B is a side view of the UFS card 4000, according to an example embodiment. In FIG. 17B, the UFS card 4000 may have dimensions shown in Table 2 below as an example.

TABLE 2

| Item | Dimension (mm) |
|------|----------------|
| S1   | 0.74 ± 0.06    |
| S2   | 0.30           |
| S3   | 0.52           |
| S4   | 1.20           |
| S5   | 1.05           |
| S6   | 1.00           |

FIG. 17C is a bottom view of the UFS card 4000, according to an example embodiment. Referring to FIG. 17C, a plurality of pins for electrical contact with a UFS slot may be formed on a bottom surface of the UFS card 4000. Functions of each of the pins will be described below. Based on symmetry between a top surface and the bottom surface of the UFS card 4000, some pieces (e.g., T1 to T5 and T9) of information about the dimensions described with reference to FIG. 17A and Table 1 may also be applied to the bottom view of the UFS card 4000, which is shown in FIG. 17C.

A plurality of pins for an electrical connection with a UFS host may be formed on the bottom surface of the UFS card 4000. Referring to FIG. 17C, a total number of pins may be 12. Each of the pins may have a rectangular shape, and signal names corresponding to the pins may be as shown in FIG. 17C. Specific information about each of the pins will be understood with reference to Table 3 below and the above description presented with reference to FIG. 16.

TABLE 3

| Signal No. | Name | Description | Dimension (mm) |
|---|---|---|---|
| 1 | Vss | Ground (GND) | 3.00 × 0.72 ± 0.05 |
| 2 | DIN_C | Differential input signals input from a host to the UFS card 4000 (DIN_C is a negative node, and DIN_T is a positive node) | 1.50 × 0.72 ± 0.05 |
| 3 | DIN_T | | |
| 4 | Vss | Ground (GND) | 3.00 × 0.72 ± 0.05 |
| 5 | DOUT_C | Differential output signals output from the UFS card 4000 to the host (DOUT_C is a negative node, and DOUT_T is a positive node) | 1.50 × 0.72 ± 0.05 |
| 6 | DOUT_T | | |
| 7 | Vss | Ground (GND) | 3.00 × 0.72 ± 0.05 |
| 8 | REF_CLK | Reference clock signal provided from the host to the UFS card 4000 | 1.50 × 0.72 ± 0.05 |
| 9 | VCCQ2 | Power supply voltage provided mainly to a PHY interface or a controller and having a lower value than voltage Vcc | 3.00 × 0.72 ± 0.05 |
| 10 | C/D(GND) | Card detection signal | 1.50 × 0.72 ± 0.05 |
| 11 | Vss | Ground (GND) | 3.00 × 0.80 ± 0.05 |
| 12 | Vcc | Main power supply voltage | |

Figure 18A:
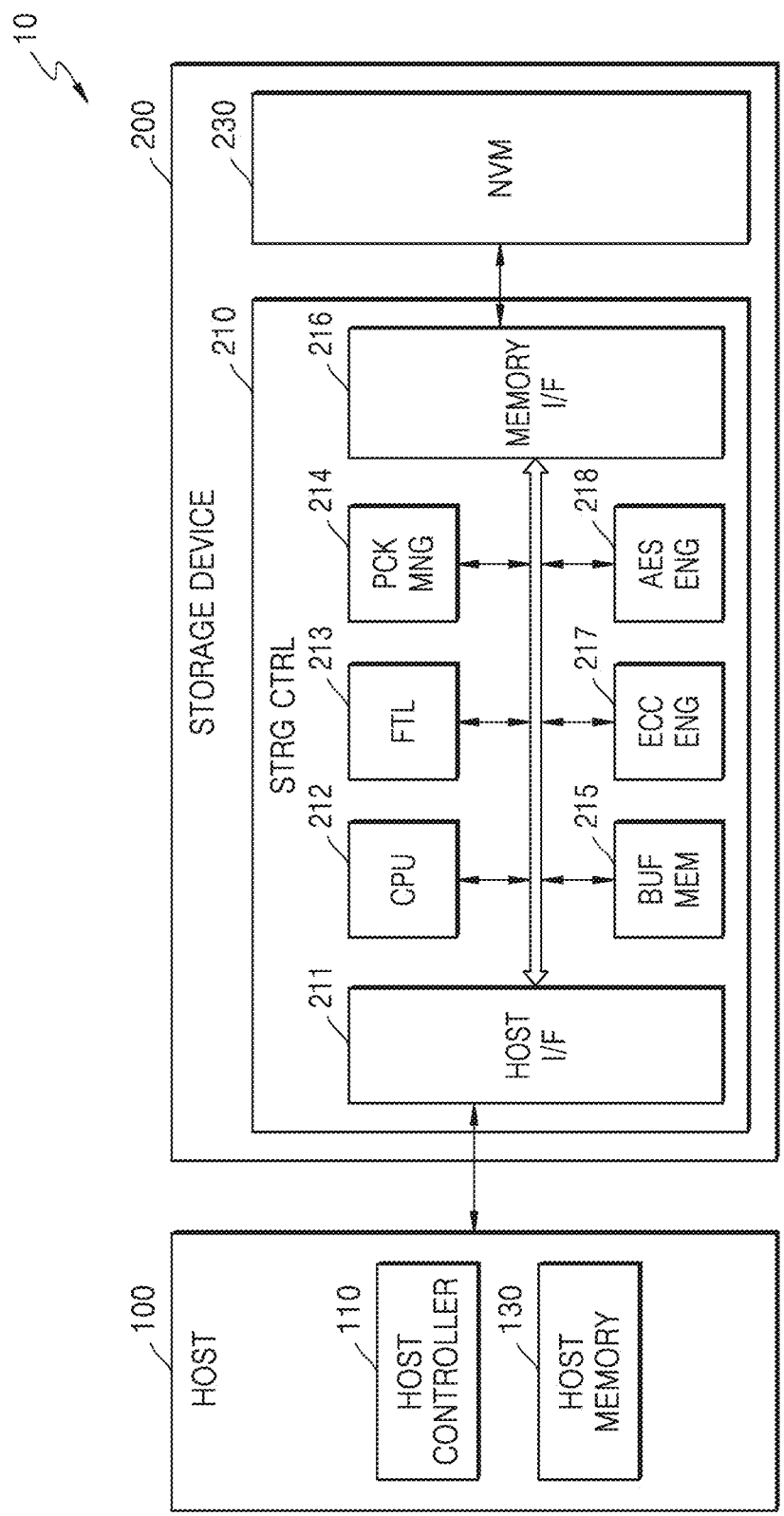
FIG. 18A is a block diagram of a host-storage system according to at least some example embodiments of the inventive concepts.

FIG. 18A is a block diagram of a host storage system 10 according to an example embodiment, and FIGS. 18B to 18E is a detailed block diagram of the elements of the FIG. 18A.

The host storage system 10 may include a host 100 and a storage device 200. Further, the storage device 200 may include a storage controller 210 and an NVM 220. According to an example embodiment, the host 100 may include a host controller 110 and a host memory 130. The host memory 130 may serve as a buffer memory configured to temporarily store data to be transferred to the storage device 200 or data received from the storage device 200.

The storage device 200 may include storage media configured to store data in response to requests from the host 100. As an example, the storage device 200 may include at least one of an SSD, an embedded memory, and a removable external memory. When the storage device 200 is an SSD, the storage device 200 may be a device that conforms to an NVMe standard. When the storage device 200 is an embedded memory or an external memory, the storage device 200 may be a device that conforms to a UFS standard or an eMMC standard. Each of the host 100 and the storage device 200 may generate a packet according to an adopted standard protocol and transfer the packet.

When the NVM 220 of the storage device 200 includes a flash memory, the flash memory may include a 18D NAND memory array or a 3D (or vertical) NAND (VNAND) memory array. As another example, the storage device 200 may include various other kinds of NVMs. For example, the storage device 200 may include magnetic RAM (MRAM), spin-transfer torque MRAM, conductive bridging RAM (CBRAM), ferroelectric RAM (FRAM), PRAM, RRAM, and various other kinds of memories.

According to an embodiment, the host controller 110 and the host memory 130 may be embodied as separate semiconductor chips. Alternatively, in some embodiments, the host controller 110 and the host memory 130 may be integrated in the same semiconductor chip. As an example, the host controller 110 may be any one of a plurality of modules included in an application processor (AP). The AP may be embodied as a System on Chip (SoC). Further, the host memory 130 may be an embedded memory included in the AP or an NVM or memory module located outside the AP.

The host controller 110 may manage an operation of storing data (e.g., write data) of a buffer region of the host memory 130 in the NVM 220 or an operation of storing data (e.g., read data) of the NVM 220 in the buffer region.

The storage controller 210 may include a host interface 211, a memory interface 216, and a CPU 212. Further, the storage controllers 210 may further include a flash translation layer (FTL) 213, a packet manager 214, a buffer memory 216, an error correction code (ECC) engine 217, and an advanced encryption standard (AES) engine 218. The storage controllers 210 may further include a working memory (not shown) in which the FTL 213 is loaded. The CPU 212 may execute the FTL 213 to control data write and read operations on the NVM 220.

The host interface 211 may transfer and receive packets to and from the host 100. A packet transferred from the host 100 to the host interface 211 may include a command or data to be written to the NVM 220. A packet transferred from the host interface 211 to the host 100 may include a response to the command or data read from the NVM 220. The memory interface 216 may transfer data to be written to the NVM 220 to the NVM 220 or receive data read from the NVM 220. The memory interface 216 may be configured to comply with a standard protocol, such as Toggle or open NAND flash interface (ONFI).

The FTL 213 may perform various functions, such as an address mapping operation, a wear-leveling operation, and a garbage collection operation. The address mapping operation may be an operation of converting a logical address received from the host 100 into a physical address used to actually store data in the NVM 220. The wear-leveling operation may be a technique for preventing excessive deterioration of a specific block by allowing blocks of the NVM 220 to be uniformly used. As an example, the wear-leveling operation may be embodied using a firmware technique that balances erase counts of physical blocks. The garbage collection operation may be a technique for ensuring usable capacity in the NVM 220 by erasing an existing block after copying valid data of the existing block to a new block.

The packet manager 215 may generate a packet according to a protocol of an interface, which consents to the host 100, or parse various types of information from the packet received from the host 100. In addition, the buffer memory 216 may temporarily store data to be written to the NVM 220 or data to be read from the NVM 220. Although the buffer memory 216 may be a component included in the storage controllers 210, the buffer memory 216 may be outside the storage controllers 210.

The ECC engine 217 may perform error detection and correction operations on read data read from the NVM 220. More specifically, the ECC engine 217 may generate parity bits for write data to be written to the NVM 220, and the generated parity bits may be stored in the NVM 220 together with write data. During the reading of data from the NVM 220, the ECC engine 217 may correct an error in the read data by using the parity bits read from the NVM 220 along with the read data, and output error-corrected read data.

The AES engine 218 may perform at least one of an encryption operation and a decryption operation on data input to the storage controllers 210 by using a symmetric-key algorithm.

Figure 18B:
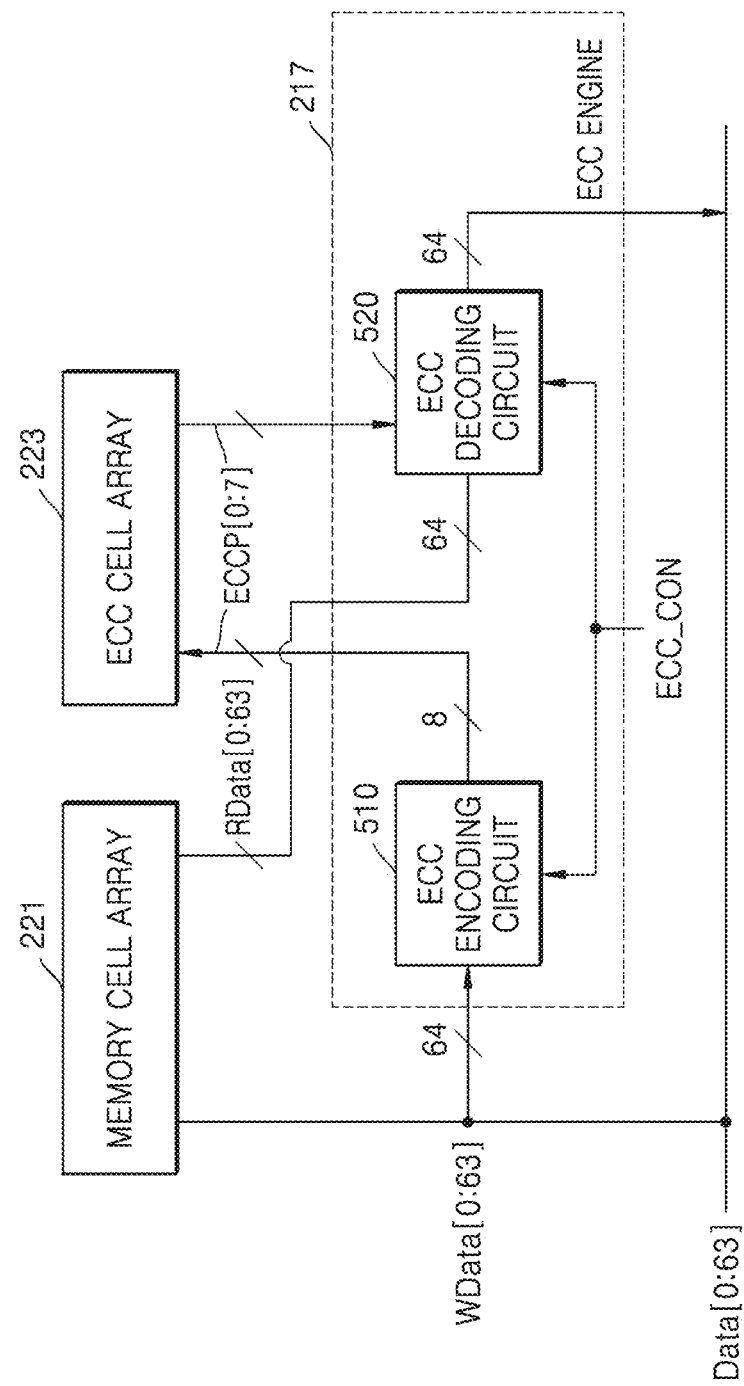
FIGS. 18B through 18E are detailed block diagrams of configurations shown in FIG. 18A.

FIG. 18B is a detailed diagram of the ECC engine 217 of FIG. 18A. Referring to FIG. 18B, the ECC engine 217 may include an ECC encoding circuit 510 and an ECC decoding circuit 520. In response to an ECC control signal ECC_CON, the ECC encoding circuit 510 may generate parity bits ECCP[0:7] for write data WData[0:63] to be written to memory cells of a memory cell array 221. The parity bits ECCP[0:7] may be stored in an ECC cell array 223. According to embodiments, in response to the ECC control signal ECC_CON, the ECC encoding circuit 510 may generate parity bits ECCP[0:7] for write data WData[0:63] to be written to memory cells including a defective cell of the memory cell array 221.

In response to the ECC control signal ECC_CON, the ECC decoding circuit 520 may correct error bit data by using read data RData[0:63] read from the memory cells of the memory cell array 221 and parity bits ECCP[0:7] read from the ECC cell array 223 and output error-corrected data Data[0:63]. According to embodiments, in response to the ECC control signal ECC_CON, the ECC decoding circuit 520 may correct error bit data by using read data RData[0:63] read from memory cells including a defective cell of the memory cell array 221 and parity bits ECCP[0:7] read from the ECC cell array 223, and output error-corrected data Data[0:63].

Figure 18C:
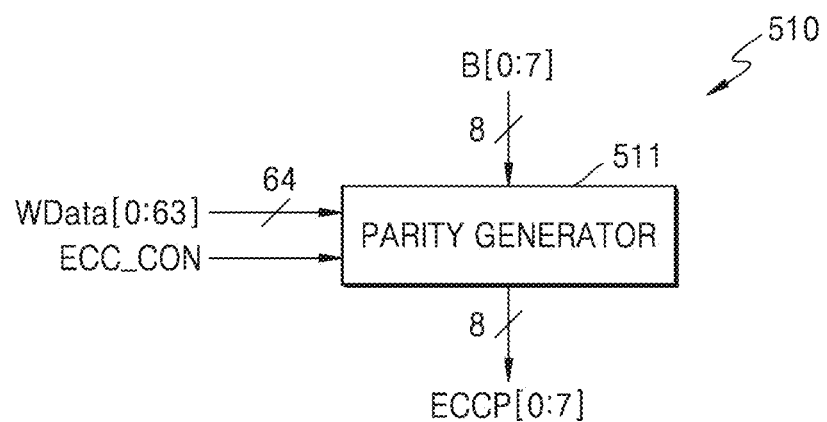

FIG. 18C is a diagram of the ECC encoding circuit 510 of FIG. 18B.

Referring to FIG. 18C, the ECC encoding circuit 510 may include a parity generator 511, which receives 64-bit write data WData[0:63] and basis bits B[0:7] in response to an ECC control signal ECC_CON and generates parity bits ECCP[0:7] by using an XOR array operation. The basis bits B[0:7] may be bits for generating parity bits ECCP[0:7] for 64-bit write data WData[0:63], for example, b'00000000 bits. The basis bits B[0:7] may use other specific bits instead of b'00000000 bits.

Figure 18D:
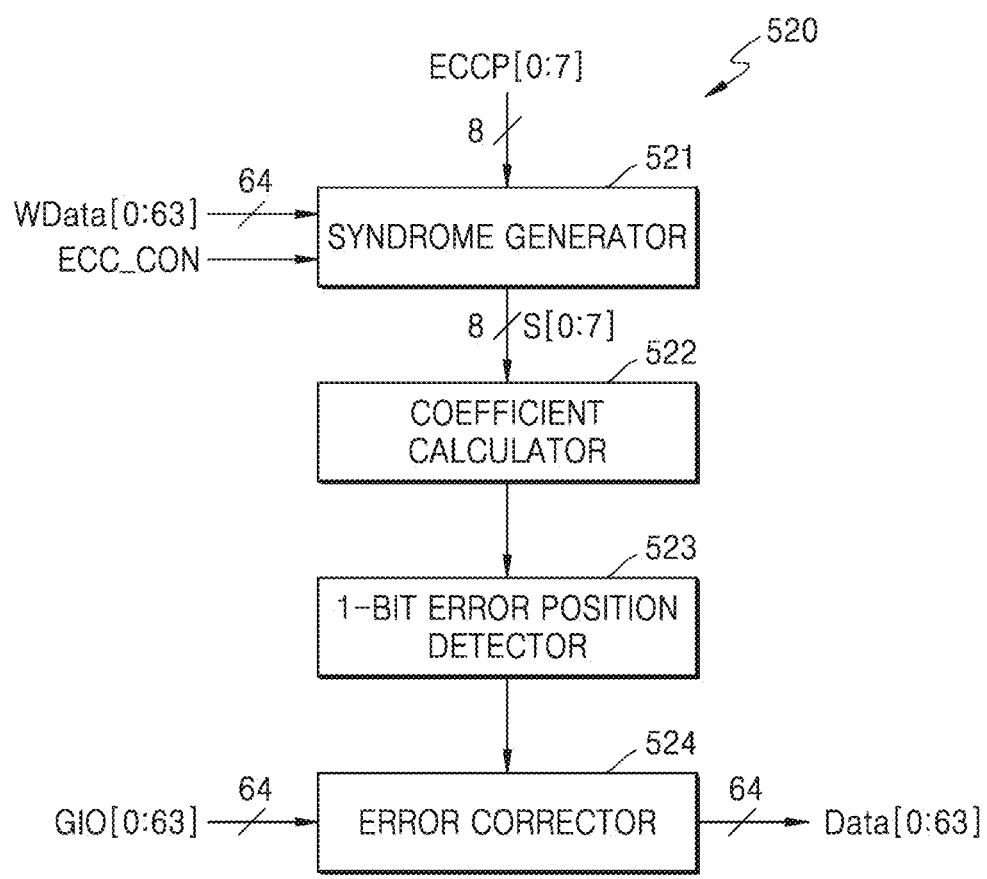

FIG. 18D is a diagram of an ECC decoding circuit 520 of FIG. 18B.

Referring to FIG. 18D, the ECC decoding circuit 520 may include a syndrome generator 521, a coefficient calculator 522, a 1-bit error location detector 523, and an error corrector 524. The syndrome generator 521 may receive 64-bit read data and an 8-bit parity bit ECCP[0:7] in response to an ECC control signal ECC_CON and generate syndrome data S[0:7] by using an XOR array operation. The coefficient calculator 522 may calculate a coefficient of an error location equation by using the syndrome data S[0:7]. The error location equation may be an equation that takes a reciprocal of an error bit as a root. The 1-bit error location detector 523 may calculate a location of a 1-bit error by using the calculated error location equation. The error corrector 524 may determine the location of the 1-bit error based on a detection result of the 1-bit error location detector 523. The error corrector 524 may correct an error by inverting a logic value of a bit of which an error occurs, from among 64-bit read data RData[0:63], based on determined 1-bit error location information, and output error-corrected 64-bit data Data[0:63].

Figure 18E:
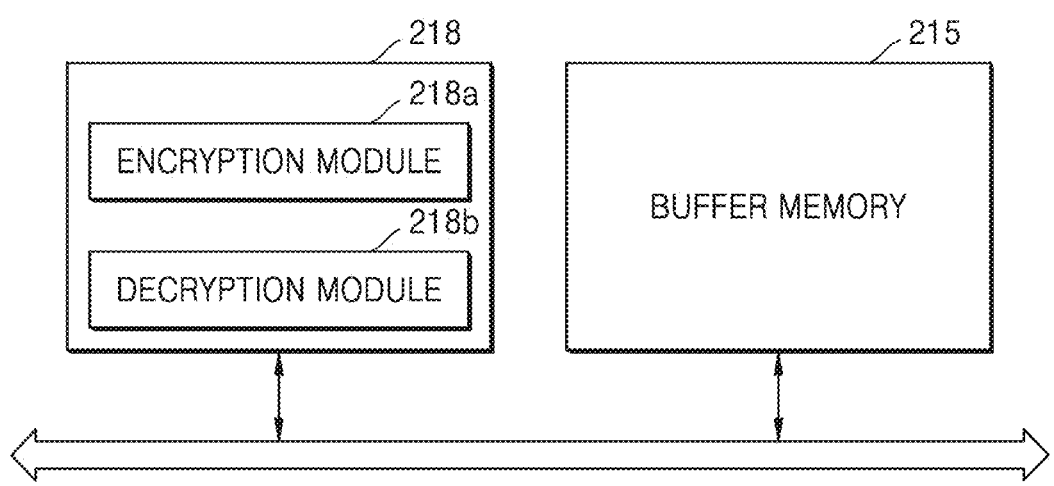

FIG. 18E is a detailed diagram of the AES engine 218 of FIG. 18A. The AES engine 218 may encrypt and decrypt data by using an AES algorithm and include an encryption module 218a and a decryption module 218b. Although FIG. 18E illustrates a case in which the encryption module 218a and the decryption module 218b are embodied as separate modules, in another case, one module capable of performing both encryption and decryption operations may be embodied in the AES engine 218. A buffer memory 216 may be a volatile memory serving as a buffer or be an NVM.

The AES engine 218 may receive first data transferred from the buffer memory 216. The encryption module 218a may encrypt the first data, which is transferred from the buffer memory 216, by using an encryption key and generate second data. The second data may be transferred from the AES engine 218 to the buffer memory 216, and be stored in the buffer memory 216.

In addition, the AES engine 218 may receive third data transferred from the buffer memory 216. The third data may be data that is encrypted with the same encryption key as an encryption key used to encrypt the first data. The decryption module 218b may decrypt the third data, which is transferred from the buffer memory 216, with the same encryption key as the encryption key used to encrypt the first data and generate fourth data. The fourth data may be transferred from the AES engine 218 to the buffer memory 216, and be stored in the buffer memory 216.

Figure 19:
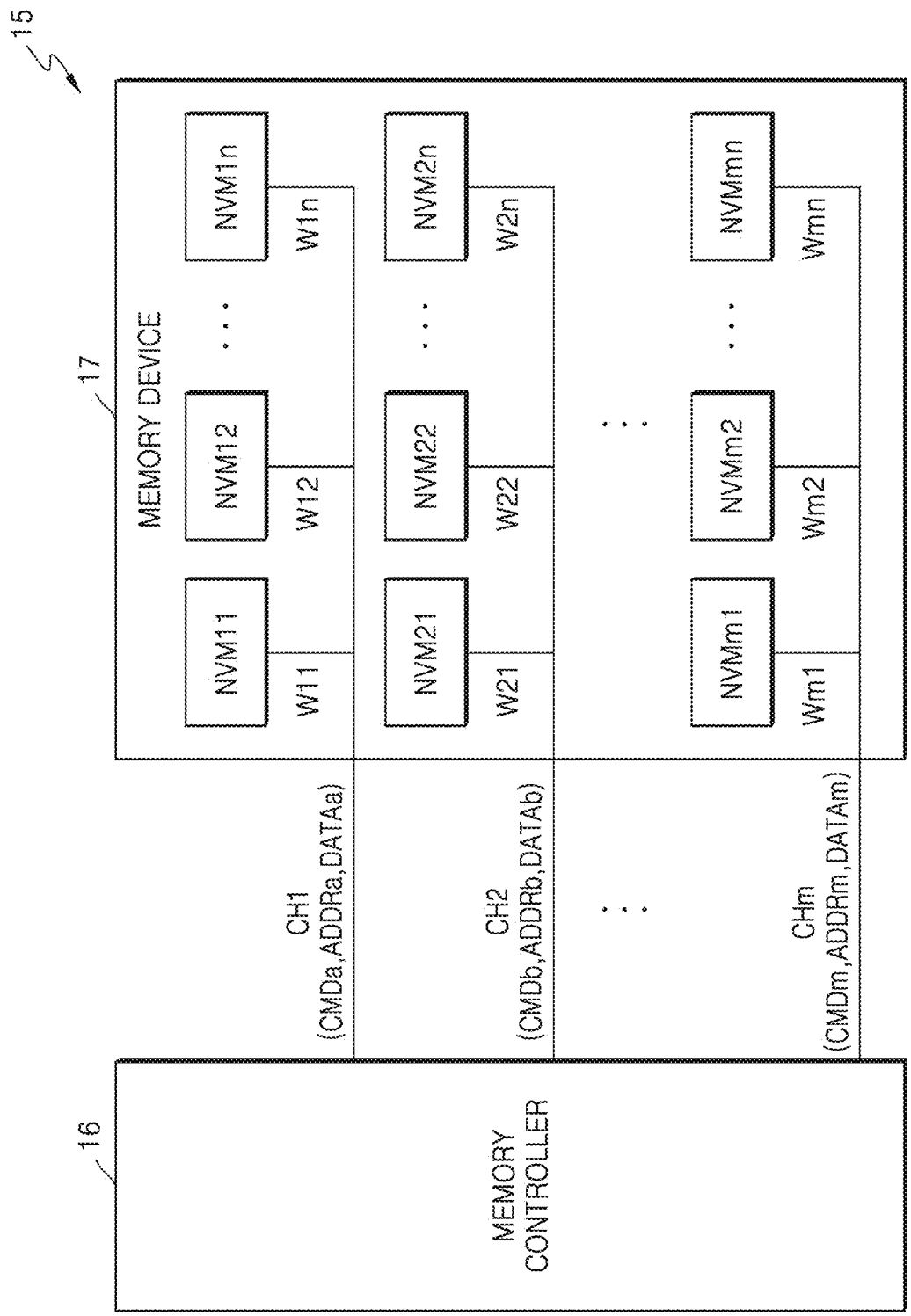
FIG. 19 is a block diagram of a memory system according to at least some example embodiments of the inventive concepts.

FIG. 19 is a block diagram of a memory system 15 according to an embodiment. Referring to FIG. 19, the memory system 15 may include a memory device 17 and a memory controller 16. The memory system 15 may support a plurality of channels CH1 to CHm, and the memory device 17 may be connected to the memory controller 16 through the plurality of channels CH1 to CHm. For example, the memory system 15 may be embodied as a storage device, such as an SSD.

The memory device 17 may include a plurality of NVM devices NVM11 to NVMmn. Each of the NVM devices NVM11 to NVMmn may be connected to one of the plurality of channels CH1 to CHm through a way corresponding thereto. For instance, the NVM devices NVM11 to NVM1n may be connected to a first channel CH1 through ways W11 to W1n, and the NVM devices NVM21 to NVM2n may be connected to a second channel CH2 through ways W21 to W2n. In an example embodiment, each of the NVM devices NVM11 to NVMmn may be embodied as an arbitrary memory unit that may operate according to an individual command from the memory controller 16. For example, each of the NVM devices NVM11 to NVMmn may be embodied as a chip or a die, but at least some example embodiments of the inventive concepts are not limited thereto.

The memory controller 16 may transfer and receive signals to and from the memory device 17 through the plurality of channels CH1 to CHm. For example, the memory controller 16 may transfer commands CMDa to CMDm, addresses ADDRa to ADDRm, and data DATAa to DATAm to the memory device 17 through the channels CH1 to CHm or receive the data DATAa to DATAm from the memory device 17.

The memory controller 16 may select one of the NVM devices NVM11 to NVMmn, which is connected to each of the channels CH1 to CHm, by using a corresponding one of the channels CH1 to CHm, and transfer and receive signals to and from the selected NVM device. For example, the memory controller 16 may select the NVM device NVM11 from the NVM devices NVM11 to NVM1n connected to the first channel CH1. The memory controller 16 may transfer the command CMDa, the address ADDRa, and the data DATAa to the selected NVM device NVM11 through the first channel CH1 or receive the data DATAa from the selected NVM device NVM11.

The memory controller 16 may transfer and receive signals to and from the memory device 17 in parallel through different channels. For example, the memory controller 16 may transfer a command CMDb to the memory device 17 through the second channel CH2 while transferring a command CMDa to the memory device 17 through the first channel CH1. For example, the memory controller 16 may receive data DATAb from the memory device 17 through the second channel CH2 while receiving data DATAa from the memory device 17 through the first channel CH1.

The memory controller 16 may control all operations of the memory device 17. The memory controller 16 may transfer a signal to the channels CH1 to CHm and control each of the NVM devices NVM11 to NVMmn connected to the channels CH1 to CHm. For instance, the memory controller 16 may transfer the command CMDa and the address ADDRa to the first channel CH1 and control one selected from the NVM devices NVM11 to NVM1n.

Each of the NVM devices NVM11 to NVMmn may operate via the control of the memory controller 16. For example, the NVM device NVM11 may program the data DATAa based on the command CMDa, the address ADDRa, and the data DATAa provided to the first channel CH1. For example, the NVM device NVM21 may read the data DATAb based on the command CMDb and the address ADDb provided to the second channel CH2 and transfer the read data DATAb to the memory controller 16.

Although FIG. 19 illustrates an example in which the memory device 17 communicates with the memory controller 16 through m channels and includes n NVM devices corresponding to each of the channels, the number of channels and the number of NVM devices connected to one channel may be variously changed.

Figure 20:
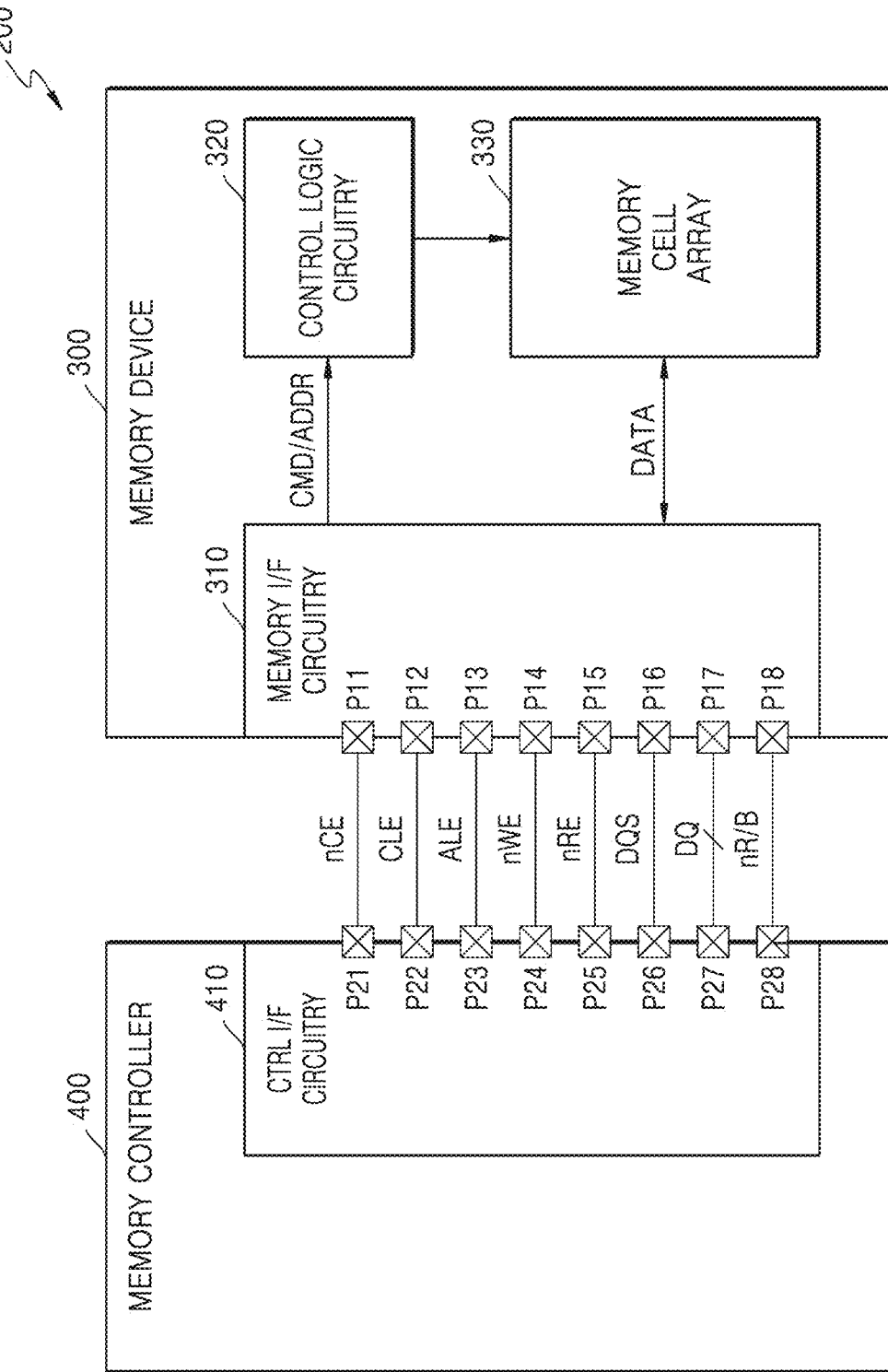
FIG. 20 is a block diagram of a memory system according to at least some example embodiments of the inventive concepts.

FIG. 20 is a block diagram of a memory system according to an embodiment. Referring to FIG. 20, the memory system may include a memory device 300 and a memory controller 400. The above description of the storage device 200 of FIG. 1 may be applied to the memory system of FIG. 20. The memory device 300 may correspond to one of NVM devices NVM11 to NVMmn, which communicate with a memory controller 400 based on one of the plurality of channels CH1 to CHm of FIG. 19. The memory controller 400 may correspond to the memory controller 16 of FIG. 19.

The memory device 300 may include first to eighth pins P11 to P18, a memory interface circuitry 310, a control logic circuitry 320, and a memory cell array 330.

The memory interface circuitry 310 may receive a chip enable signal nCE from the memory controller 400 through the first pin P11. The memory interface circuitry 310 may transfer and receive signals to and from the memory controller 400 through the second to eighth pins P12 to P18 in response to the chip enable signal nCE. For example, when the chip enable signal nCE is in an enable state (e.g., a low level), the memory interface circuitry 310 may transfer and receive signals to and from the memory controller 400 through the second to eighth pins P12 to P18.

The memory interface circuitry 310 may receive a command latch enable signal CLE, an address latch enable signal ALE, and a write enable signal nWE from the memory controller 400 through the second to fourth pins P12 to P14. The memory interface circuitry 310 may receive a data signal DQ from the memory controller 400 through the seventh pin P17 or transfer the data signal DQ to the memory controller 400. A command CMD, an address ADDR, and data may be transferred via the data signal DQ. For example, the data signal DQ may be transferred through a plurality of data signal lines. In this case, the seventh pin P17 may include a plurality of pins respectively corresponding to a plurality of data signals DQ(s).

The memory interface circuitry 310 may obtain the command CMD from the data signal DQ, which is received in an enable section (e.g., a high-level state) of the command latch enable signal CLE based on toggle time points of the write enable signal nWE. The memory interface circuitry 310 may obtain the address ADDR from the data signal DQ, which is received in an enable section (e.g., a high-level state) of the address latch enable signal ALE based on the toggle time points of the write enable signal nWE.

In an example embodiment, the write enable signal nWE may be maintained at a static state (e.g., a high level or a low level) and toggle between the high level and the low level. For example, the write enable signal nWE may toggle in a section in which the command CMD or the address ADDR is transferred. Thus, the memory interface circuitry 310 may obtain the command CMD or the address ADDR based on toggle time points of the write enable signal nWE.

The memory interface circuitry 310 may receive a read enable signal nRE from the memory controller 400 through the fifth pin P15. The memory interface circuitry 310 may receive a data strobe signal DQS from the memory controller 400 through the sixth pin P16 or transfer the data strobe signal DQS to the memory controller 400.

In a data (DATA) output operation of the memory device 300, the memory interface circuitry 310 may receive the read enable signal nRE, which toggles through the fifth pin P15, before outputting the data DATA. The memory interface circuitry 310 may generate the data strobe signal DQS, which toggles based on the toggling of the read enable signal nRE. For example, the memory interface circuitry 310 may generate a data strobe signal DQS, which starts toggling after a desired, or alternatively, predetermined delay (e.g., tDQSRE), based on a toggling start time of the read enable signal nRE. The memory interface circuitry 310 may transfer the data signal DQ including the data DATA based on a toggle time point of the data strobe signal DQS. Thus, the data DATA may be aligned with the toggle time point of the data strobe signal DQS and transferred to the memory controller 400.

In a data (DATA) input operation of the memory device 300, when the data signal DQ including the data DATA is received from the memory controller 400, the memory interface circuitry 310 may receive the data strobe signal DQS, which toggles, along with the data DATA from the memory controller 400. The memory interface circuitry 310 may obtain the data DATA from the data signal DQ based on toggle time points of the data strobe signal DQS. For example, the memory interface circuitry 310 may sample the data signal DQ at rising and falling edges of the data strobe signal DQS and obtain the data DATA.

The memory interface circuitry 310 may transfer a ready/busy output signal nR/B to the memory controller 400 through the eighth pin P18. The memory interface circuitry 310 may transfer state information of the memory device 300 through the ready/busy output signal nR/B to the memory controller 400. When the memory device 300 is in a busy state (i.e., when operations are being performed in the memory device 300), the memory interface circuitry 310 may transfer a ready/busy output signal nR/B indicating the busy state to the memory controller 400. When the memory device 300 is in a ready state (i.e., when operations are not performed or completed in the memory device 300), the memory interface circuitry 310 may transfer a ready/busy output signal nR/B indicating the ready state to the memory controller 400. For example, while the memory device 300 is reading data DATA from the memory cell array 330 in response to a page read command, the memory interface circuitry 310 may transfer a ready/busy output signal nR/B indicating a busy state (e.g., a low level) to the memory controller 400. For example, while the memory device 300 is programming data DATA to the memory cell array 330 in response to a program command, the memory interface circuitry 310 may transfer a ready/busy output signal nR/B indicating the busy state to the memory controller 400.

The control logic circuitry 320 may control all operations of the memory device 300. The control logic circuitry 320 may receive the command/address CMD/ADDR obtained from the memory interface circuitry 310. The control logic circuitry 320 may generate control signals for controlling other components of the memory device 300 in response to the received command/address CMD/ADDR. For example, the control logic circuitry 320 may generate various control signals for programming data DATA to the memory cell array 330 or reading the data DATA from the memory cell array 330.

The memory cell array 330 may store the data DATA obtained from the memory interface circuitry 310, via the control of the control logic circuitry 320. The memory cell array 330 may output the stored data DATA to the memory interface circuitry 310 via the control of the control logic circuitry 320.

The memory cell array 330 may include a plurality of memory cells. For example, the plurality of memory cells may be flash memory cells. However, at least some example embodiments of the inventive concepts are not limited thereto, and the memory cells may be RRAM cells, FRAM cells, PRAM cells, thyristor RAM (TRAM) cells, or MRAM cells. Hereinafter, an embodiment in which the memory cells are NAND flash memory cells will mainly be described.

The memory controller 400 may include first to eighth pins P21 to P28 and a controller interface circuitry 410. The first to eighth pins P21 to P28 may respectively correspond to the first to eighth pins P11 to P18 of the memory device 300.

The controller interface circuitry 410 may transfer a chip enable signal nCE to the memory device 300 through the first pin P21. The controller interface circuitry 410 may transfer and receive signals to and from the memory device 300, which is selected by the chip enable signal nCE, through the second to eighth pins P22 to P28.

The controller interface circuitry 410 may transfer the command latch enable signal CLE, the address latch enable signal ALE, and the write enable signal nWE to the memory device 300 through the second to fourth pins P22 to P24. The controller interface circuitry 410 may transfer or receive the data signal DQ to and from the memory device 300 through the seventh pin P27.

The controller interface circuitry 410 may transfer the data signal DQ including the command CMD or the address ADDR to the memory device 300 along with the write enable signal nWE, which toggles. The controller interface circuitry 410 may transfer the data signal DQ including the command CMD to the memory device 300 by transferring a command latch enable signal CLE having an enable state. Also, the controller interface circuitry 410 may transfer the data signal DQ including the address ADDR to the memory device 300 by transferring an address latch enable signal ALE having an enable state.

The controller interface circuitry 410 may transfer the read enable signal nRE to the memory device 300 through the fifth pin P25. The controller interface circuitry 410 may receive or transfer the data strobe signal DQS from or to the memory device 300 through the sixth pin P26.

In a data (DATA) output operation of the memory device 300, the controller interface circuitry 410 may generate a read enable signal nRE, which toggles, and transfer the read enable signal nRE to the memory device 300. For example, before outputting data DATA, the controller interface circuitry 410 may generate a read enable signal nRE, which is changed from a static state (e.g., a high level or a low level) to a toggling state. Thus, the memory device 300 may generate a data strobe signal DQS, which toggles, based on the read enable signal nRE. The controller interface circuitry 410 may receive the data signal DQ including the data DATA along with the data strobe signal DQS, which toggles, from the memory device 300. The controller interface circuitry 410 may obtain the data DATA from the data signal DQ based on a toggle time point of the data strobe signal DQS.

In a data (DATA) input operation of the memory device 300, the controller interface circuitry 410 may generate a data strobe signal DQS, which toggles. For example, before transferring data DATA, the controller interface circuitry 410 may generate a data strobe signal DQS, which is changed from a static state (e.g., a high level or a low level) to a toggling state. The controller interface circuitry 410 may transfer the data signal DQ including the data DATA to the memory device 300 based on toggle time points of the data strobe signal DQS.

The controller interface circuitry 410 may receive a ready/busy output signal nR/B from the memory device 300 through the eighth pin P28. The controller interface circuitry 410 may determine state information of the memory device 300 based on the ready/busy output signal nR/B.

Figure 21:
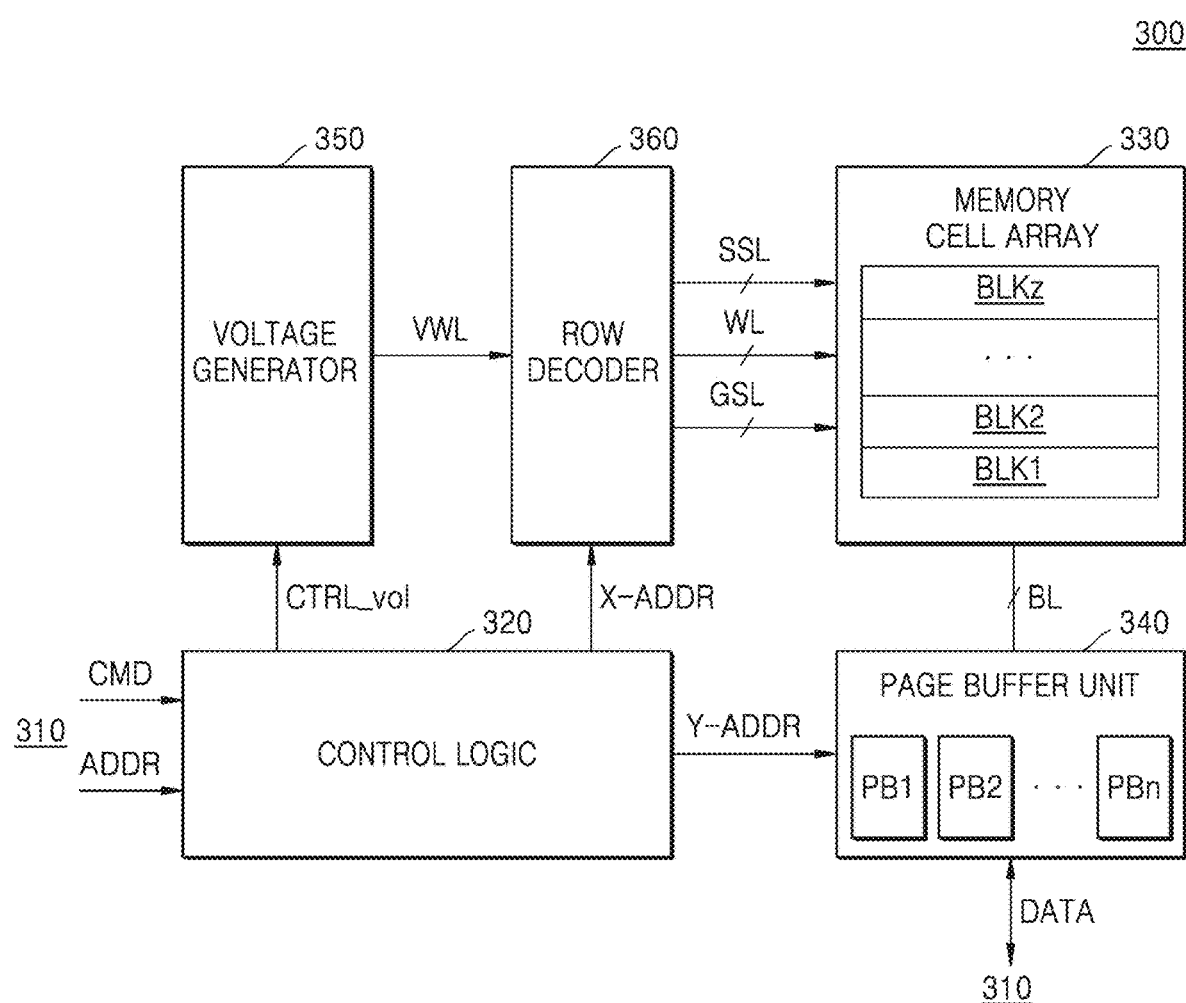
FIG. 21 is a block diagram of a memory device according to at least some example embodiments of the inventive concepts.

FIG. 21 is a block diagram of a memory device 300 according to an example embodiment. Referring to FIG. 21, the memory device 300 may include a control logic circuitry 320, a memory cell array 330, a page buffer 340, a voltage generator 350, and a row decoder 360. Although not shown in FIG. 21, the memory device 300 may further include a memory interface circuitry 310 shown in FIG. 21. In addition, the memory device 300 may further include a column logic, a pre-decoder, a temperature sensor, a command decoder, and/or an address decoder.

The control logic circuitry 320 may control all various operations of the memory device 300. The control logic circuitry 320 may output various control signals in response to commands CMD and/or addresses ADDR from the memory interface circuitry 310. For example, the control logic circuitry 320 may output a voltage control signal CTRL_vol, a row address X-ADDR, and a column address Y-ADDR.

The memory cell array 330 may include a plurality of memory blocks BLK1 to BLKz (here, z is a positive integer), each of which may include a plurality of memory cells. The memory cell array 330 may be connected to the page buffer 340 through bit lines BL and be connected to the row decoder 360 through word lines WL, string selection lines SSL, and ground selection lines GSL.

In an example embodiment, the memory cell array 330 may include a 3D memory cell array, which includes a plurality of NAND strings. Each of the NAND strings may include memory cells respectively connected to word lines vertically stacked on a substrate. The disclosures of U.S. Pat. Nos. 7,679,133; 8,553,466; 8,654,587; 8,559,235; and US Pat. Pub. No. 2011/0233648 are hereby incorporated by reference. In an example embodiment, the memory cell array 330 may include a 2D memory cell array, which includes a plurality of NAND strings arranged in a row direction and a column direction.

The page buffer 340 may include a plurality of page buffers PB1 to PBn (here, n is an integer greater than or equal to 3), which may be respectively connected to the memory cells through a plurality of bit lines BL. The page buffer 340 may select at least one of the bit lines BL in response to the column address Y-ADDR. The page buffer 340 may operate as a write driver or a sense amplifier according to an operation mode. For example, during a program operation, the page buffer 340 may apply a bit line voltage corresponding to data to be programmed, to the selected bit line. During a read operation, the page buffer 340 may sense current or a voltage of the selected bit line BL and sense data stored in the memory cell.

The voltage generator 350 may generate various kinds of voltages for program, read, and erase operations based on the voltage control signal CTRL_vol. For example, the voltage generator 350 may generate a program voltage, a read voltage, a program verification voltage, and an erase voltage as a word line voltage VWL.

The row decoder 360 may select one of a plurality of word lines WL and select one of a plurality of string selection lines SSL in response to the row address X-ADDR. For example, the row decoder 360 may apply the program voltage and the program verification voltage to the selected word line WL during a program operation and apply the read voltage to the selected word line WL during a read operation.

Figure 22:
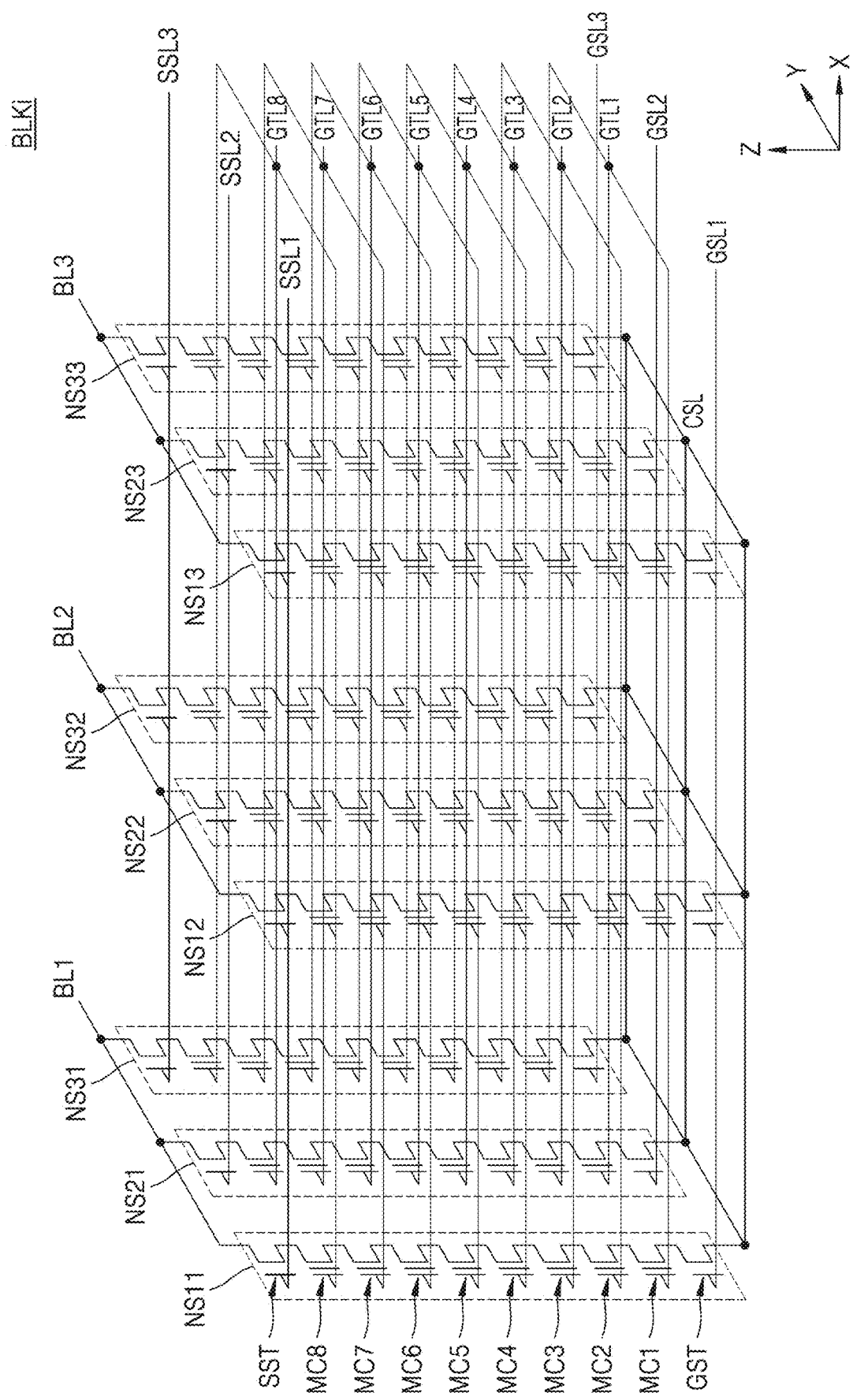
FIG. 22 is a diagram of a three-dimensional (3D) vertical NAND (V-NAND) structure which may be applied to a UFS device according to at least some example embodiments of the inventive concepts.

FIG. 22 is a diagram of a 3D V-NAND structure applicable to a UFS device according to an embodiment. When a storage module of the UFS device is embodied as a 3D V-NAND flash memory, each of a plurality of memory blocks included in the storage module may be represented by an equivalent circuit shown in FIG. 22.

A memory block BLKi shown in FIG. 22 may refer to a 3D memory block having a 3D structure formed on a substrate. For example, a plurality of memory NAND strings included in the memory block BLKi may be formed in a vertical direction to the substrate.

Referring to FIG. 22, the memory block BLKi may include a plurality of memory NAND strings (e.g., NS11 to NS33), which are connected between bit lines BL1, BL2, and BL3 and a common source line CSL. Each of the memory NAND strings NS11 to NS33 may include a string selection transistor SST, a plurality of memory cells (e.g., MC1, MC2, . . . , and MC8), and a ground selection transistor GST. Each of the memory NAND strings NS11 to NS33 is illustrated as including eight memory cells MC1, MC2, . . . , and MC8 in FIG. 22, without being limited thereto.

The string selection transistor SST may be connected to string selection lines SSL1, SSL2, and SSL3 corresponding thereto. Each of the memory cells MC1, MC2, . . . , and MC8 may be connected to a corresponding one of gate lines GTL1, GTL2, . . . , and GTL8. The gate lines GTL1, GTL2, . . . , and GTL8 may respectively correspond to word lines, and some of the gate lines GTL1, GTL2, . . . , and GTL8 may correspond to dummy word lines. The ground selection transistor GST may be connected to ground selection lines GSL1, GSL2, and GSL3 corresponding thereto. The string selection transistor SST may be connected to the bit lines BL1, BL2, and BL3 corresponding thereto, and the ground selection transistor GST may be connected to the common source line CSL.

Word lines (e.g., WL1) at the same level may be connected in common, and the ground selection lines GSL1, GSL2, and GSL3 and the string selection lines SSL1, SSL2, and SSL3 may be separated from each other. FIG. 22 illustrates a case in which a memory block BLK is connected to eight gate lines GTL1, GTL2, . . . , and GTL8 and three bit lines BL1, BL2, and BL3, without being limited thereto.

Figure 23:
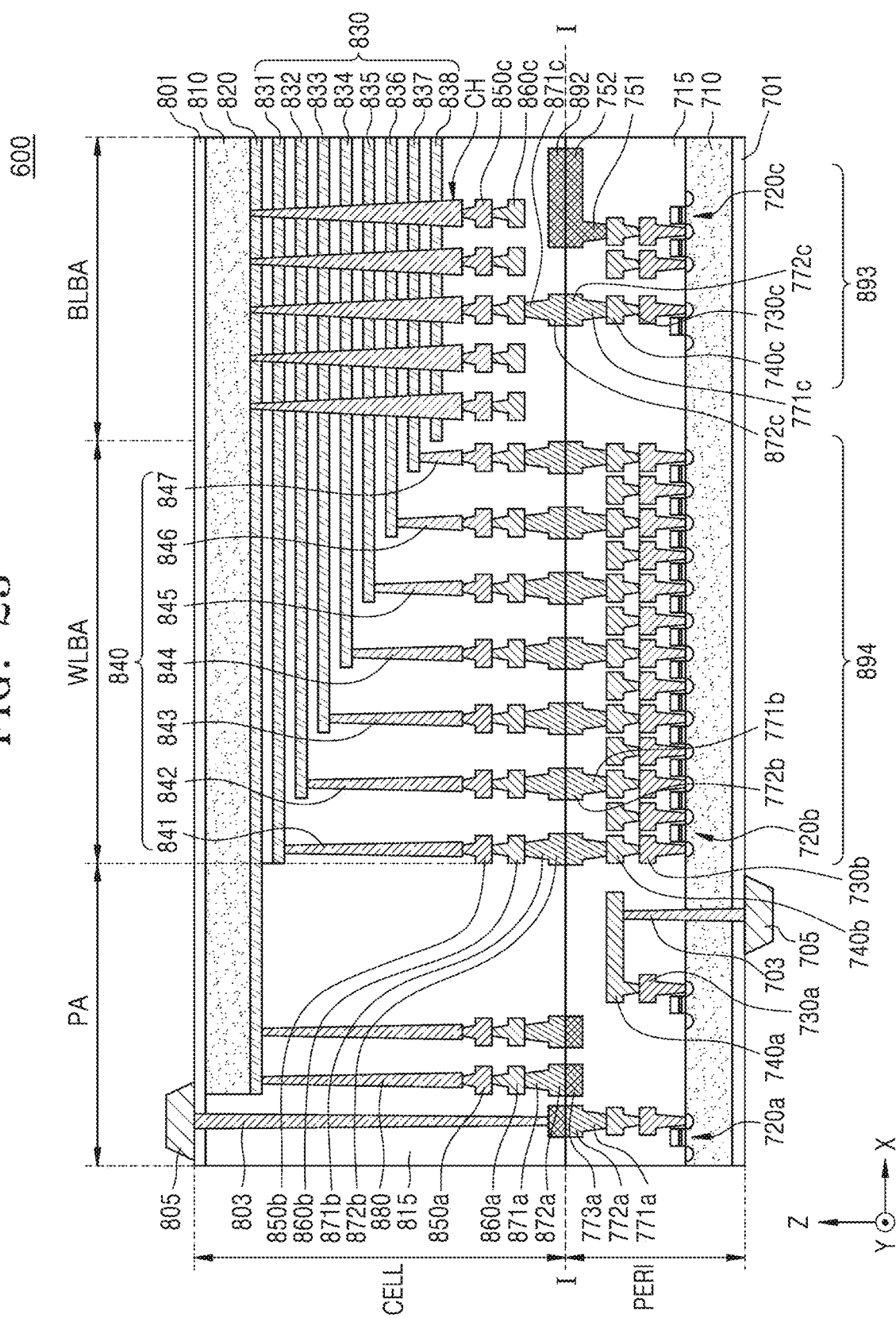
FIG. 23 is a cross-sectional view of a memory device according to at least some example embodiments of the inventive concepts.

FIG. 23 is a diagram illustrating a memory device 600 according to another example embodiment. The above description of the NVM 230 of FIG. 1 may be applied to the memory device 600 of FIG. 23.

Referring to FIG. 23, a memory device 600 may have a chip-to-chip (C2C) structure. The C2C structure may refer to a structure formed by manufacturing an upper chip including a cell region CELL on a first wafer, manufacturing a lower chip including a peripheral circuit region PERI on a second wafer, separate from the first wafer, and then bonding the upper chip and the lower chip to each other. Here, the bonding process may include a method of electrically connecting a bonding metal formed on an uppermost metal layer of the upper chip and a bonding metal formed on an uppermost metal layer of the lower chip. For example, when the bonding metals may include copper (Cu) using a Cu-to-Cu bonding. The example embodiment, however, may not be limited thereto. For example, the bonding metals may also be formed of aluminum (Al) or tungsten (W).

Each of the peripheral circuit region PERI and the cell region CELL of the memory device 600 may include an external pad bonding area PA, a word line bonding area WLBA, and a bit line bonding area BLBA.

The peripheral circuit region PERI may include a first substrate 710, an interlayer insulating layer 715, a plurality of circuit elements 720a, 720b, and 720c formed on the first substrate 710, first metal layers 730a, 730b, and 730c respectively connected to the plurality of circuit elements 720a, 720b, and 720c, and second metal layers 740a, 740b, and 740c formed on the first metal layers 730a, 730b, and 730c. In an example embodiment, the first metal layers 730a, 730b, and 730c may be formed of tungsten having relatively high electrical resistivity, and the second metal layers 740a, 740b, and 740c may be formed of copper having relatively low electrical resistivity.

In an example embodiment illustrate in FIG. 23, although only the first metal layers 730a, 730b, and 730c and the second metal layers 740a, 740b, and 740c are shown and described, the example embodiment is not limited thereto, and one or more additional metal layers may be further formed on the second metal layers 740a, 740b, and 740c. At least a portion of the one or more additional metal layers formed on the second metal layers 740a, 740b, and 740c may be formed of aluminum or the like having a lower electrical resistivity than those of copper forming the second metal layers 740a, 740b, and 740c.

The interlayer insulating layer 715 may be disposed on the first substrate 710 and cover the plurality of circuit elements 720a, 720b, and 720c, the first metal layers 730a, 730b, and 730c, and the second metal layers 740a, 740b, and 740c. The interlayer insulating layer 715 may include an insulating material such as silicon oxide, silicon nitride, or the like.

Lower bonding metals 771b and 772b may be formed on the second metal layer 740b in the word line bonding area WLBA. In the word line bonding area WLBA, the lower bonding metals 771b and 772b in the peripheral circuit region PERI may be electrically bonded to upper bonding metals 871b and 872b of the cell region CELL. The lower bonding metals 771b and 772b and the upper bonding metals 871b and 872b may be formed of aluminum, copper, tungsten, or the like. Further, the upper bonding metals 871b and 872b in the cell region CELL may be referred as first metal pads and the lower bonding metals 771b and 772b in the peripheral circuit region PERI may be referred as second metal pads.

The cell region CELL may include at least one memory block. The cell region CELL may include a second substrate 810 and a common source line 820. On the second substrate 810, a plurality of word lines 831 to 838 (i.e., 830) may be stacked in a direction (a Z-axis direction), perpendicular to an upper surface of the second substrate 810. At least one string select line and at least one ground select line may be arranged on and below the plurality of word lines 830, respectively, and the plurality of word lines 830 may be disposed between the at least one string select line and the at least one ground select line.

In the bit line bonding area BLBA, a channel structure CH may extend in a direction (a Z-axis direction), perpendicular to the upper surface of the second substrate 810, and pass through the plurality of word lines 830, the at least one string select line, and the at least one ground select line. The channel structure CH may include a data storage layer, a channel layer, a buried insulating layer, and the like, and the channel layer may be electrically connected to a first metal layer 850c and a second metal layer 860c. For example, the first metal layer 850c may be a bit line contact, and the second metal layer 860c may be a bit line. In an example embodiment, the bit line 860c may extend in a first direction (a Y-axis direction), parallel to the upper surface of the second substrate 810.

In an example embodiment illustrated in FIG. 23, an area in which the channel structure CH, the bit line 860c, and the like are disposed may be defined as the bit line bonding area BLBA. In the bit line bonding area BLBA, the bit line 860c may be electrically connected to the circuit elements 720c providing a page buffer 893 in the peripheral circuit region PERI. The bit line 860c may be connected to upper bonding metals 871c and 872c in the cell region CELL, and the upper bonding metals 871c and 872c may be connected to lower bonding metals 771c and 772c connected to the circuit elements 720c of the page buffer 893. In an example embodiment, a program operation may be executed based on a page unit as write data of the page-unit is stored in the page buffer 893, and a read operation may be executed based on a sub-page unit as read data of the sub-page unit is stored in the page buffer 893. Also, in the program operation and the read operation, units of data transferred through bit lines may be different from each other.

In the word line bonding area WLBA, the plurality of word lines 830 may extend in a second direction (an X-axis direction), parallel to the upper surface of the second substrate 810 and perpendicular to the first direction, and may be connected to a plurality of cell contact plugs 841 to 847 (i.e., 840). The plurality of word lines 830 and the plurality of cell contact plugs 840 may be connected to each other in pads provided by at least a portion of the plurality of word lines 830 extending in different lengths in the second direction. A first metal layer 850b and a second metal layer 860b may be connected to an upper portion of the plurality of cell contact plugs 840 connected to the plurality of word lines 830, sequentially. The plurality of cell contact plugs 840 may be connected to the peripheral circuit region PERI by the upper bonding metals 871b and 872b of the cell region CELL and the lower bonding metals 771b and 772b of the peripheral circuit region PERI in the word line bonding area WLBA.

The plurality of cell contact plugs 840 may be electrically connected to the circuit elements 720b forming a row decoder 894 in the peripheral circuit region PERI. In an example embodiment, operating voltages of the circuit elements 720b of the row decoder 894 may be different than operating voltages of the circuit elements 720c forming the page buffer 893. For example, operating voltages of the circuit elements 720c forming the page buffer 893 may be greater than operating voltages of the circuit elements 720b forming the row decoder 894.

A common source line contact plug 880 may be disposed in the external pad bonding area PA. The common source line contact plug 880 may be formed of a conductive material such as a metal, a metal compound, polysilicon, or the like, and may be electrically connected to the common source line 820. A first metal layer 850a and a second metal layer 860a may be stacked on an upper portion of the common source line contact plug 880, sequentially. For example, an area in which the common source line contact plug 880, the first metal layer 850a, and the second metal layer 860a are disposed may be defined as the external pad bonding area PA.

Input-output pads 705 and 805 may be disposed in the external pad bonding area PA. Referring to FIG. 23, a lower insulating film 701 covering a lower surface of the first substrate 710 may be formed below the first substrate 710, and a first input-output pad 705 may be formed on the lower insulating film 701. The first input-output pad 705 may be connected to at least one of the plurality of circuit elements 720a, 720b, and 720c disposed in the peripheral circuit region PERI through a first input-output contact plug 703, and may be separated from the first substrate 710 by the lower insulating film 701. In addition, a side insulating film may be disposed between the first input-output contact plug 703 and the first substrate 710 to electrically separate the first input-output contact plug 703 and the first substrate 710.

Referring to FIG. 23, an upper insulating film 801 covering the upper surface of the second substrate 810 may be formed on the second substrate 810, and a second input-output pad 805 may be disposed on the upper insulating layer 801. The second input-output pad 805 may be connected to at least one of the plurality of circuit elements 720a, 720b, and 720c disposed in the peripheral circuit region PERI through a second input-output contact plug 803. In the example embodiment, the second input-output pad 805 is electrically connected to a circuit element 720a.

According to embodiments, the second substrate 810 and the common source line 820 may not be disposed in an area in which the second input-output contact plug 803 is disposed. Also, the second input-output pad 805 may not overlap the word lines 830 in the third direction (the Z-axis direction). Referring to FIG. 23, the second input-output contact plug 303 may be separated from the second substrate 810 in a direction, parallel to the upper surface of the second substrate 810, and may pass through the interlayer insulating layer 815 of the cell region CELL to be connected to the second input-output pad 805.

According to embodiments, the first input-output pad 705 and the second input-output pad 805 may be selectively formed. For example, the memory device 600 may include only the first input-output pad 705 disposed on the first substrate 710 or the second input-output pad 805 disposed on the second substrate 810. Alternatively, the memory device 600 may include both the first input-output pad 705 and the second input-output pad 805.

A metal pattern provided on an uppermost metal layer may be provided as a dummy pattern or the uppermost metal layer may be absent, in each of the external pad bonding area PA and the bit line bonding area BLBA, respectively included in the cell region CELL and the peripheral circuit region PERI.

In the external pad bonding area PA, the memory device 600 may include a lower metal pattern 773a, corresponding to an upper metal pattern 872a formed in an uppermost metal layer of the cell region CELL, and having the same cross-sectional shape as the upper metal pattern 872*a* of the cell region CELL so as to be connected to each other, in an uppermost metal layer of the peripheral circuit region PERI. In the peripheral circuit region PERI, the lower metal pattern 773*a* formed in the uppermost metal layer of the peripheral circuit region PERI may not be connected to a contact. Similarly, in the external pad bonding area PA, an upper metal pattern 872*a*, corresponding to the lower metal pattern 773*a* formed in an uppermost metal layer of the peripheral circuit region PERI, and having the same shape as a lower metal pattern 773*a* of the peripheral circuit region PERI, may be formed in an uppermost metal layer of the cell region CELL.

The lower bonding metals 771*b* and 772*b* may be formed on the second metal layer 740*b* in the word line bonding area WLBA. In the word line bonding area WLBA, the lower bonding metals 771*b* and 772*b* of the peripheral circuit region PERI may be electrically connected to the upper bonding metals 871*b* and 872*b* of the cell region CELL by a Cu-to-Cu bonding.

Further, in the bit line bonding area BLBA, an upper metal pattern 892, corresponding to a lower metal pattern 752 formed in the uppermost metal layer of the peripheral circuit region PERI, and having the same cross-sectional shape as the lower metal pattern 752 of the peripheral circuit region PERI, may be formed in an uppermost metal layer of the cell region CELL. A contact may not be formed on the upper metal pattern 892 formed in the uppermost metal layer of the cell region CELL.

In an example embodiment, corresponding to a metal pattern formed in an uppermost metal layer in one of the cell region CELL and the peripheral circuit region PERI, a reinforcement metal pattern having the same cross-sectional shape as the metal pattern may be formed in an uppermost metal layer in the other one of the cell region CELL and the peripheral circuit region PERI. A contact may not be formed on the reinforcement metal pattern.

Figure 24:
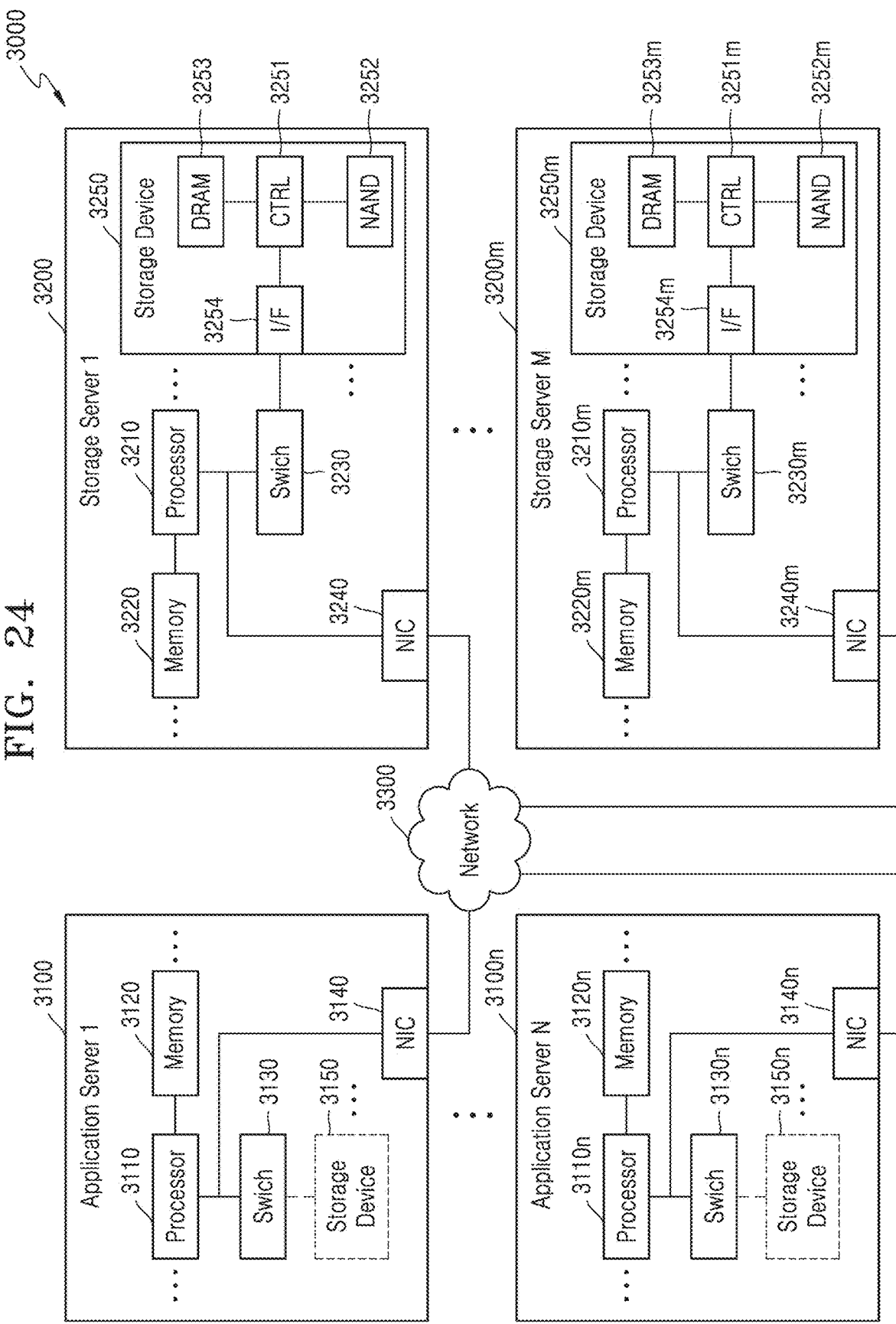
FIG. 24 is a diagram of a data center to which a storage system according to at least some example embodiments of the inventive concepts is applied.

FIG. 24 is a diagram of a data center 3000 to which the host storage system 10 is applied, according to an embodiment.

Referring to FIG. 24, the data center 3000 may be a facility that collects various types of pieces of data and provides services and be referred to as a data storage center. The data center 3000 may be a system for operating a search engine and a database, and may be a computing system used by companies, such as banks, or government agencies. The data center 3000 may include application servers 3100 to 3100*n* and storage servers 3200 to 3200*m*. The number of application servers 3100 to 3100*n* and the number of storage servers 3200 to 3200*m* may be variously selected according to embodiments. The number of application servers 3100 to 3100*n* may be different from the number of storage servers 3200 to 3200*m*.

The application server 3100 or the storage server 3200 may include at least one of processors 3110 and 3210 and memories 3120 and 3220. The storage server 3200 will now be described as an example. The processor 3210 may control all operations of the storage server 3200, access the memory 3220, and execute instructions and/or data loaded in the memory 3220. The memory 3220 may be a double-data-rate synchronous DRAM (DDR SDRAM), a high-bandwidth memory (HBM), a hybrid memory cube (HMC), a dual in-line memory module (DIMM), Optane DIMM, and/or a non-volatile DIMM (NVMDIMM). In some embodiments, the numbers of processors 3210 and memories 3220 included in the storage server 3200 may be variously selected. In an embodiment, the processor 3210 and the memory 3220 may provide a processor-memory pair. In an embodiment, the number of processors 3210 may be different from the number of memories 3220. The processor 3210 may include a single-core processor or a multi-core processor. The above description of the storage server 3200 may be similarly applied to the application server 3100. In some embodiments, the application server 3100 may not include a storage device 3150. The storage server 3200 may include at least one storage device 3250. The number of storage devices 3250 included in the storage server 3200 may be variously selected according to embodiments.

The application servers 3100 to 3100*n* may communicate with the storage servers 3200 to 3200*m* through a network 3300. The network 3300 may be embodied by using a fiber channel (FC) or Ethernet. In this case, the FC may be a medium used for relatively high-speed data transmission and use an optical switch with high performance and high availability. The storage servers 3200 to 3200*m* may be provided as file storages, block storages, or object storages according to an access method of the network 3300.

In an embodiment, the network 3300 may be a storage-dedicated network, such as a storage area network (SAN). For example, the SAN may be an FC-SAN, which uses an FC network and is embodied according to an FC protocol (FCP). As another example, the SAN may be an Internet protocol (IP)-SAN, which uses a transmission control protocol (TCP)/IP network and is embodied according to a SCSI over TCP/IP or Internet SCSI (iSCSI) protocol. In another embodiment, the network 3300 may be a general network, such as a TCP/IP network. For example, the network 3300 may be embodied according to a protocol, such as FC over Ethernet (FCoE), network attached storage (NAS), and NVMe over Fabrics (NVMe-oF).

Hereinafter, the application server 3100 and the storage server 3200 will mainly be described. A description of the application server 3100 may be applied to another application server 3100*n*, and a description of the storage server 3200 may be applied to another storage server 3200*m*.

The application server 3100 may store data, which is requested by a user or a client to be stored, in one of the storage servers 3200 to 3200*m* through the network 3300. Also, the application server 3100 may obtain data, which is requested by the user or the client to be read, from one of the storage servers 3200 to 3200*m* through the network 3300. For example, the application server 3100 may be embodied as a web server or a database management system (DBMS).

The application server 3100 may access a memory 3120*n* or a storage device 3150*n*, which is included in another application server 3100*n*, through the network 3300. Alternatively, the application server 3100 may access memories 3220 to 3220*m* or storage devices 3250 to 3250*m*, which are included in the storage servers 3200 to 3200*m*, through the network 3300. Thus, the application server 3100 may perform various operations on data stored in application servers 3100 to 3100*n* and/or the storage servers 3200 to 3200*m*. For example, the application server 3100 may execute an instruction for moving or copying data between the application servers 3100 to 3100*n* and/or the storage servers 3200 to 3200*m*. In this case, the data may be moved from the storage devices 3250 to 3250*m* of the storage servers 3200 to 3200*m* to the memories 3120 to 3120*n* of the application servers 3100 to 3100*n* directly or through the memories 3220 to 3220*m* of the storage servers 3200 to 3200*m*. The data moved through the network 3300 may be data encrypted for security or privacy.

The storage server 3200 will now be described as an example. An interface 3254 may provide physical connection between a processor 3210 and a controller 3251 and a physical connection between a network interface card (NIC) 3240 and the controller 3251. For example, the interface 3254 may be embodied using a direct attached storage (DAS) scheme in which the storage device 3250 is directly connected with a dedicated cable. For example, the interface 3254 may be embodied by using various interface schemes, such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface.

The storage server 3200 may further include a switch 3230 and the NIC (Network InterConnect) 3240. The switch 3230 may selectively connect the processor 3210 to the storage device 3250 or selectively connect the NIC 3240 to the storage device 3250 via the control of the processor 3210.

In an embodiment, the NIC 3240 may include a network interface card and a network adaptor. The NIC 3240 may be connected to the network 3300 by a wired interface, a wireless interface, a Bluetooth interface, or an optical interface. The NIC 3240 may include an internal memory, a digital signal processor (DSP), and a host bus interface and be connected to the processor 3210 and/or the switch 3230 through the host bus interface. The host bus interface may be embodied as one of the above-described examples of the interface 3254. In an embodiment, the NIC 3240 may be integrated with at least one of the processor 3210, the switch 3230, and the storage device 3250.

In the storage servers 3200 to 3200m or the application servers 3100 to 3100n, a processor may transfer a command to storage devices 3150 to 3150n and 3250 to 3250m or the memories 3120 to 3120n and 3220 to 3220m and program or read data. In this case, the data may be data of which an error is corrected by an ECC engine. The data may be data on which a data bus inversion (DBI) operation or a data masking (DM) operation is performed, and may include cyclic redundancy code (CRC) information. The data may be data encrypted for security or privacy.

Storage devices 3150 to 3150n and 3250 to 3250m may transfer a control signal and a command/address signal to NAND flash memory devices 3252 to 3252m in response to a read command received from the processor. Thus, when data is read from the NAND flash memory devices 3252 to 3252m, a read enable (RE) signal may be input as a data output control signal, and thus, the data may be output to a DQ bus. A data strobe signal DQS may be generated using the RE signal. The command and the address signal may be latched in a page buffer depending on a rising edge or falling edge of a write enable (WE) signal.

The controller 3251 may control all operations of the storage device 3250. In an embodiment, the controller 3251 may include SRAM. The controller 3251 may write data to the NAND flash memory device 3252 in response to a write command or read data from the NAND flash memory device 3252 in response to a read command. For example, the write command and/or the read command may be provided from the processor 3210 of the storage server 3200, the processor 3210m of another storage server 3200m, or the processors 3110 and 3110n of the application servers 3100 and 3100n. DRAM 3253 may temporarily store (or buffer) data to be written to the NAND flash memory device 3252 or data read from the NAND flash memory device 3252. Also, the DRAM 3253 may store metadata. Here, the metadata may be user data or data generated by the controller 3251 to manage the NAND flash memory device 3252. The storage device 3250 may include a secure element (SE) for security or privacy.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A host controller interface configured to provide interfacing between a host device and a storage device, the host controller interface comprising:
    processing circuitry; a doorbell register configured to store a head pointer and a tail pointer of one or more first queues; and
    an entry buffer configured to store a first command from one of the one or more first queues in the entry buffer; and
    a bitmap doorbell register configured to indicate, by using a bitmap, idle spaces and occupied spaces of the entry buffer,
    wherein the processing circuitry is configured to,
        determine an order in which commands of the one or more first queues are to be processed,
        route the first command to be stored in the entry buffer according to the determined order, and
        route a first response to be stored in one of one or more second queues.

2. The host controller interface of claim 1, wherein the one or more first queues include a plurality of circular queues.

3. The host controller interface of claim 1,
    wherein the one or more first queues include one or more submission queues, and the one or more second queues include one or more completion queues,
    wherein the doorbell register stores a first head pointer and a first tail pointer for at least one of the one or more submission queues, and
    wherein the doorbell register stores a second head pointer and a second tail pointer for at least one of the one or more completion queues.

4. The host controller interface of claim 3, wherein the processing circuitry is configured to update the first head pointer in response to the first command being stored in the entry buffer.

5. The host controller interface of claim 3, wherein the processing circuitry is configured to update the second tail pointer in response to the first response being stored in the at least one completion queue.

6. The host controller interface of claim 1, wherein the processing circuitry is configured to change, in response to the first command or the first response being stored in the entry buffer, bit information corresponding to a data region, into which the first command or the first response is stored, from bit 0 to bit 1 in the bitmap.

7. The host controller interface of claim 1, wherein the processing circuitry is configured to assign the first command to an idle space of the entry buffer, by referring to the bitmap doorbell register.

8. The host controller interface of claim 1, wherein the processing circuitry is configured to route the first response, which is written to the entry buffer, to a completion queue from among the one or more second queues, by referring to the bitmap doorbell register.

9. The host controller interface of claim 1,
wherein the host device includes a first core configured to process a first submission queue and a first completion queue, and a second core configured to process a second submission queue and a second completion queue, and
wherein the processing circuitry is configured to,
determine first and second priorities for the first submission queue and the second submission queue, respectively, and
processes a queue, from among the first submission queue and the second submission queue, for which the highest priority was determined, from among the first priority and the second priority.

10. The host controller interface of claim 9, wherein the processing circuitry is configured to determine the first and second priorities based on, at least one of,
whether a priority process flag is attached to the first submission queue,
whether a priority process flag is attached to the second submission queue,
which one of the first and second submission queues was received first,
which one of the first and second submission queues has an insufficient empty space,
which one of the first and second submission has a higher weight, or
whether one of the first and second submission was previously designated as having a higher priority.

11. The host controller interface of claim 1, wherein the first response is a processing result of the storage device with respect to the first command.

12. A storage system comprising:
a host device; and
a storage device,
wherein the host device is configured to transfer a first command to the storage device,
wherein the host device includes,
a host memory configured to store at least one queue,
at least one core configured to process the at least one queue,
a first processing circuitry configured to provide interfacing with the host memory, and
a doorbell register configured to store a head pointer and a tail pointer for the at least one queue, and
wherein the storage device includes second processing circuitry configured to provide, to the host device, a first response which is a result of performing a memory operation based on the first command.

13. The storage system of claim 12,
wherein the at least one queue includes a submission queue and a completion queue, and
wherein doorbell register stores,
a first head pointer and a first tail pointer for the submission queue, and
a second head pointer and a second tail pointer for the completion queue.

14. The storage system of claim 13,
wherein the host device further comprises:
an entry buffer, and
wherein the first processing circuitry is further configured to update the first head pointer based on the first command being stored in the entry buffer.

15. The storage system of claim 13, wherein the first processing circuitry is further configured to update the second tail pointer based on the first response being stored in the completion queue.

16. The storage system of claim 12,
wherein the host device further comprises:
an entry buffer,
wherein the at least one queue includes one or more first queues and one or more second queues, and
wherein the first processing circuitry is further configured to,
store the first command or the first response in the entry buffer;
determine an order in which commands of the one or more first queues are to be processed;
route the first command to be stored in the entry buffer according to the determined order; and
route the first response to be stored in the doorbell register.

17. The storage system of claim 16,
wherein the at least one core includes,
a first core configured to process a first submission queue and a first completion queue, and
a second core configured to process a second submission queue and a second completion queue, and
wherein the first processing circuitry is configured to,
determine first and second priorities for the first submission queue and the second submission queue, respectively, and
processes a queue, from among the first submission queue and the second submission queue, for which the highest priority was determined, from among the first priority and the second priority.

18. The storage system of claim 16, wherein the host device further comprises:
a bitmap doorbell register configured to indicate, by using a bitmap, idle spaces and occupied spaces of the entry buffer.

19. The storage system of claim 18, wherein the first processing circuitry is further configured to assign the first command to an idle space of the entry buffer, by referring to the bitmap doorbell register.

* * * * *